US012804124B2

(12) United States Patent
Makinen et al.

(10) Patent No.: US 12,804,124 B2
(45) Date of Patent: Nov. 17, 2026

(54) METHOD AND SYSTEM FOR CONTINUOUS CALIBRATION OF A 3D DISPLAY BASED ON BEAM STEERING

(71) Applicant: InterDigital Madison Patent Holdings, SAS, Paris (FR)

(72) Inventors: Jukka-Tapani Makinen, Oulu (FI); Markku Alamaki, Espo (FI)

(73) Assignee: InterDigital Madison Patent Holdings, SAS, Paris (FR)

( * ) Notice: Subject to any disclaimer, the term of this patent is extended or adjusted under 35 U.S.C. 154(b) by 228 days.

(21) Appl. No.: 18/892,289

(22) Filed: Sep. 20, 2024

(65) Prior Publication Data

US 2025/0016299 A1 Jan. 9, 2025

Related U.S. Application Data

(63) Continuation of application No. 17/623,107, filed as application No. PCT/US2020/040105 on Jun. 29, 2020, now Pat. No. 12,126,790.

(Continued)

(51) Int. Cl.

*H04N 13/383* (2018.01)
*G02B 27/00* (2006.01)

(Continued)

(52) U.S. Cl.

CPC ........... *H04N 13/383* (2018.05); *G02B 27/00* (2013.01); *G02B 30/33* (2020.01); *H04N 13/317* (2018.05);

(Continued)

(58) Field of Classification Search

CPC .. H04N 13/383; H04N 13/368; H04N 13/317; H04N 13/373; H04N 13/00; G02B 30/33; G02B 27/00

(Continued)

(56) References Cited

U.S. PATENT DOCUMENTS 6,163,336 A 12/2000 Richards
6,369,954 B1 4/2002 Berge et al.

(Continued)

FOREIGN PATENT DOCUMENTS

CA 2905147 A1 9/2014
CN 1476730 A 2/2004

(Continued)

OTHER PUBLICATIONS

Invitation to Pay Additional Fees and Where Applicable, Protest Fee for PCT/US2020/040105, mailed Aug. 24, 2020, 12 pages.

(Continued)

*Primary Examiner* — William Choi
(74) *Attorney, Agent, or Firm* — Smadar Gefen

(57) ABSTRACT

Apparatuses and methods are disclosed including techniques for calibrating a light field display having projector cells. Each of the of projector cells contains light emitting elements and a beam-steering element, and is configured such that an outgoing light from at least one of the light emitting elements exits the projector cell after passing through the beam-steering element in a first direction. Techniques disclosed include projecting a tracking beam onto a calibration spot on a viewer of the light field display; detecting, by at least one of light sensing elements (distributed relative to the light emitting elements), an incoming light of the tracking beam reflected from the calibration spot, where the incoming light enters the projector cell passes through the beam-steering element in a second direction opposite to the first direction; and adjusting the steering of the beam-steering element based on the detection of the incoming light.

11 Claims, 30 Drawing Sheets

Related U.S. Application Data

(60) Provisional application No. 62/869,478, filed on Jul. 1, 2019.

(51) Int. Cl.
*G02B 30/33* (2020.01)
*H04N 13/317* (2018.01)
*H04N 13/368* (2018.01)
*H04N 13/373* (2018.01)
*H04N 13/00* (2018.01)

(52) U.S. Cl.
CPC ......... *H04N 13/368* (2018.05); *H04N 13/373* (2018.05); *H04N 13/00* (2013.01)

(58) Field of Classification Search
USPC ............................................................ 348/51
See application file for complete search history.

(56) References Cited

U.S. PATENT DOCUMENTS

| | | | |
|---|---|---|---|
| 7,408,601 | B1 | 8/2008 | Huang et al. |
| 7,688,509 | B2 | 3/2010 | Vissenberg et al. |
| 9,042,028 | B2 | 5/2015 | Choi et al. |
| 9,207,459 | B2 | 12/2015 | Bae et al. |
| 9,664,914 | B2 | 5/2017 | Gu |
| 9,709,829 | B2 | 7/2017 | Stephen et al. |
| 9,709,851 | B2 | 7/2017 | Seo et al. |
| 9,869,969 | B2 | 1/2018 | Song et al. |
| 10,036,884 | B2 | 7/2018 | Kim et al. |
| 2004/0001139 | A1 | 1/2004 | Kobayashi |
| 2004/0263968 | A1 | 12/2004 | Kobayashi et al. |
| 2007/0159599 | A1 | 7/2007 | Yamada |
| 2007/0188667 | A1 | 8/2007 | Schwerdtner |
| 2007/0242237 | A1 | 10/2007 | Thomas |
| 2011/0216407 | A1 | 9/2011 | Olaya |
| 2011/0285968 | A1 | 11/2011 | Huang |
| 2012/0127320 | A1 | 5/2012 | Balogh |
| 2012/0306726 | A1 | 12/2012 | Song et al. |
| 2014/0035959 | A1 | 2/2014 | Lapstun |
| 2017/0214907 | A1 | 7/2017 | Lapstun |
| 2018/0164535 | A1 | 6/2018 | Brown |
| 2018/0286129 | A1 | 10/2018 | Harviainen |
| 2019/0187482 | A1 | 6/2019 | Lanman |
| 2021/0223568 | A1 | 7/2021 | Makinen et al. |

FOREIGN PATENT DOCUMENTS

| | | | |
|---|---|---|---|
| CN | 101702055 | A | 5/2010 |
| CN | 103119512 | A | 5/2013 |
| CN | 103931179 | A | 7/2014 |
| CN | 104685867 | A | 6/2015 |
| CN | 106164743 | A | 11/2016 |
| EP | 3273302 | A1 | 1/2018 |
| WO | WO2008142156 | A2 | 11/2008 |
| WO | WO2011014743 | A2 | 2/2011 |
| WO | WO2012025786 | A1 | 3/2012 |
| WO | WO2016135434 | A1 | 9/2016 |

OTHER PUBLICATIONS

Matsuda, Nathan, et al. "Focal surface displays", ACM Transactions on Graphics (TOG), 2017, vol. 36, No. 4, pp. 1-14.
Mishra et al., "Recent Developments in Optofluidic Lens Technology", Micromachines, vol. 7, 102, 2016, 24 pages.
Duchowski, "Eye Tracking Methodology", Theory and Practice, 3rd edition; Springer, (2017).
International Search Report and Written Opinion of the international Searching Authority for PCT/US2020/040105 mailed Oct. 15, 2020, 18 pages.
Zhang et al., "A Novel Spatio-Temporal Multiplexing Multi-View 3D Display", Conference on Lasers and Electro-Optics, Pacific Rim, Optical Society of America, 2017 4 pages.
International Preliminary Report on Patentability for PCT/US2020/040105 issued Dec. 28, 2021, 14 pages.
Kim et al. "Electro-wetting lenticular lens with improved diopter for 2D and 3D conversion using lens shaped ETPTA chamber", Optics Express, vol. 26, No. 15, pp. 19614-19626, Jul. 23, 2018.
Takai et al., "Electrowetting fresnel lenticular", Proceedings of the IEEE International Conference on Micro Electro Mechanical Systems (MEMS), pp. 632-635. IEEE, 2012.
Mcmanamon et al., "A review of phased array steering for narrow-band electrooptical systems", Proceedings of the IEEE, vol. 97, No. 6, 2009, pp. 1078-1096.
Zou, "Hand-eye calibration of arc welding robot and laser vision sensor through semidefinite programming", Industrial Robot—The Internatinal Journal of Robotics International Journal of Robotics Research and Application, December, pp. 597-610.
Love et al., "High-Speed Switchable Lens Enables the Development of a Volumetric Stereoscopic Display", Optics Express, vol. 17, No. 18, Aug. 31, 2009, pp. 15716-15725.
Bae, et al., "Arrayed beam steering device for advanced 3D displays", In MOEMS and Miniaturized Systems XII, vol. 8616, SPIE, 2013, 8 pages.
Huang et al., "Autostereoscopic 3D Display with Scanning Multi-electrode Driven Liquid Crystal (MeD-LC) Lens", 3D Research, vol. 1, No. 1, pp. 39-42, 2010.
Wang et al., "Large-aperture transparent beam steering screen based on LCMPA", Applied Optics, vol. 55, No. 28, pp. 7824-7829, Oct. 1, 2016.
Shang, et al., "Fast switching cholesteric liquid crystal optical beam deflector with polarization independence", Scientific Reports, vol. 7, No. 1, 2017 8 pages.
Xia, et al., "Time-multiplexed multi-view three-dimensional display with projector array and steering screen", Optics Express, vol. 26, No., 15528-15538, Jun. 11, 2018.
Smith, et al. "Agile wide-angle beam steering with electrowetting microprisms", Optics Express, vol. 14, No., 6557-6563, Jul. 10, 2006.
Sifvast, "Laser Fundamentals", Cambridge University Press, 1996, ISBN 0-521-55617-1, p. 338.
Terrab et al., "Adaptive electrowetting lens-prism element", Optics Express vol. 23, Issue 20, pp. 25838-25845, 2015.

METHOD AND SYSTEM FOR CONTINUOUS CALIBRATION OF A 3D DISPLAY BASED ON BEAM STEERING

CROSS-REFERENCE TO RELATED APPLICATIONS

The present application is a continuation of U.S. Non-Provisional patent application Ser. No. 17/623,107, filed Dec. 27, 2021, which is a National Phase entry under 35 U.S.C. § 371 of International Application No. PCT/US2020/040105, filed Jun. 29, 2020, which claims the benefit of U.S. Provisional Patent Application No. 62/869,478, filed Jul. 1, 2019, which are incorporated herein by reference in their entirety.

BACKGROUND

The human mind perceives and determines depths of observed objects in part by receiving signals from muscles used to orient each eye. This eye convergence uses simple triangulation method for estimating the object distance. The brain associates the relative angular orientations of the eyes with the determined depths of focus. Eye muscles connected to the single eye lens automatically adjust the lens shape in such a way that the eye is focused to the same distance than where the two eyes are converged. Correct retinal focus cues give rise to a natural image blur on objects outside of an observed focal plane and a natural dynamic parallax effect. In a natural setting both the eye convergence and retinal focus ques are coherent. Correct retinal focus ques require very high angular density light fields making it a big challenge to build a sufficiently accurate 3D display that is capable of emitting the necessary light rays. Also, the rendering of the artificial image may generally need to be performed with high enough fidelity.

SUMMARY

An example apparatus in accordance with some embodiments may include: a matrix of a plurality of projector cells, each of the projector cells may include: a plurality of individually-addressable light emitting elements; a beam-steering element; and a collimating optical element positioned between one or more of the light-emitting elements and the beam-steering element, wherein for each of the projector cells the respective plurality of light emitting elements and the respective beam-steering element may be configured to form a respective synchronous composite beam of light, the synchronous composite beam of light including light emitted from one or more of the plurality of light emitting elements of the projector cell, passing through the collimating optical element of the projector cell, and steered by the beam-steering element of the projector cell.

For some embodiments of the example apparatus, the matrix of projector cells may include a matrix of display pixels, and each display pixel of the matrix of display pixels may include: one of the plurality of individually-addressable light emitting elements; and an illumination sensor configured to detect illumination levels of reflected light beams.

For some embodiments of the example apparatus, at least one of the beam-steering elements may be configured to steer simultaneously a plurality of light beams.

Some embodiments of the example apparatus may further include a sensor configured to track eye position of a viewer.

Some embodiments of the example apparatus may further include a tracking beam generator configured to generate a tracking beam used for adjusting image display parameters.

Some embodiments of the example apparatus may further include a plurality of light sensors, such that the tracking beam generator is configured to reflect the tracking beam off a viewer of the apparatus, and such that the plurality of light sensors are configured to measure the reflected tracking beam.

For some embodiments of an example apparatus, such that at least one of the plurality of light sensors is further configured to measure at least one color, angle, focal depth, or intensity of the reflected tracking beam.

For some embodiments of an example apparatus, such that the tracking beam generator includes: one or more tracking beam light emitting elements; a tracking beam beam-steering element; and a tracking beam collimating optical element positioned between the one or more tracking beam light-emitting elements and the tracking beam beam-steering element.

For some embodiments of an example apparatus, such that the one or more tracking beam light emitting elements and the tracking beam beam-steering element are configured to form a synchronous composite beam of light, the synchronous composite beam of light including light emitted from the one or more tracking beam light emitting elements, passing through the tracking beam collimating optical element and steered by the tracking beam beam-steering element.

For some embodiments of an example apparatus, such that the one or more tracking beam light emitting elements and the tracking beam beam-steering element are configured to form a calibration spot on a viewer, the calibration spot including light emitted from the one or more tracking beam light emitting elements, passing through the tracking beam collimating optical element, and steered by the tracking beam beam-steering element.

An example apparatus in accordance with some embodiments may include: an optical structure; a processor; and a non-transitory computer-readable medium storing instructions that are operative, when executed by the processor, to perform, in cooperation with the optical structure, a portion of any of the processes performed by the example apparatus.

Another example apparatus in accordance with some embodiments may include: a plurality of display pixels; a plurality of beam-steering elements; a collimating layer including one or more collimating elements positioned between one of the light-emitting elements and one of the beam-steering elements; and a tracking beam generator configured to generate a beam spot on a target.

For some embodiments of another example apparatus, each of the plurality of display pixels may include: one or more light emitting elements; and one or more light detectors.

Some embodiments of another example apparatus may further include: an eye tracking sensor configured to track eye positions of a viewer.

Another example apparatus in accordance with some embodiments may include: an optical structure; a processor; and a non-transitory computer-readable medium storing instructions that are operative, when executed by the processor, to perform, in cooperation with the optical structure, a portion of any of the processes performed by another example apparatus.

An example method in accordance with some embodiments may include: projecting a beam spot on a viewer of a light field display; determining an estimated location of the beam spot reflected off the viewer; detecting an actual location of the beam spot reflected off the viewer; and determining an image correction parameter based on a comparison of the estimated location and the actual location of the beam spot reflected off the viewer.

For some embodiments of an example method, determining the image correction parameter may include: determining a spatial offset between the estimated location and the actual location of the beam spot reflected off the viewer; and altering a steering angle of a ray steering element by an angular amount corresponding to the spatial offset.

Some embodiments of an example method may further include: detecting an eye location of the viewer, wherein projecting the beam spot on the viewer may be based on the detected eye location of the viewer.

For some embodiments of an example method, projecting the beam spot on the viewer may include: determining an estimated reflection location to be an offset above the eye location of the viewer; and projecting the beam spot to reflect off the viewer at the estimated reflection location.

Some embodiments of an example method may further include: determining an estimated viewing window of the viewer; rendering a light field image to be seen by the viewer through the estimated viewing window; and displaying the rendered light field image by the light field display.

Some embodiments of an example method may further include: adjusting an intensity level for the light field image using the determined image correction parameters, wherein rendering the light field image uses the adjusted intensity level.

For some embodiments of an example method, wherein the comparison of the estimated location and the actual location of the beam spot reflected off the viewer may include determining a spatial offset between the estimated location and the actual location of the beam spot reflected off the viewer, and wherein rendering the light field image may include adjusting a location for the light field image to be displayed using the spatial offset.

For some embodiments of an example method, determining the estimated viewing window of the viewer may adjust a location of the estimated viewing window using the spatial offset.

Some embodiments of an example method may further include: illuminating the viewer with an illumination beam during an active period for a projector cell; detecting a reflection of the illumination beam during the active period for the projector cell; generating, with the projector cell, a light beam at an intensity level; and adjusting the intensity level based on the detected reflection of the illumination beam.

For some embodiments of an example method, adjusting the intensity level may include: determining an intensity level of the detected reflection of the illumination beam; determining an intensity level offset between the intensity level of the detected reflection of the illumination beam and the intensity level of the illumination beam; and adjusting the intensity level by an amount proportional to the intensity level offset.

Some embodiments of an example method may further include: altering a first control input to a light emitting element array; altering a second control input to a ray steering layer; and coordinating altering of the first control input and altering of the second control input to cause spatial-temporal altering of at least one of color, angle, focal depth, or intensity of a rendered image.

For some embodiments of an example method, projecting the beam spot, determining the estimated location, detecting the actual location, and determining the image correction parameters may be performed for a subframe corresponding to a light emitting device.

An example apparatus in accordance with some embodiments may include: an optical structure; a processor; and a non-transitory computer-readable medium storing instructions that are operative, when executed by the processor, to perform, in cooperation with the optical structure, a portion of the method of any of the processes performed by the example apparatus.

An additional example apparatus in accordance with some embodiments may include: a matrix of projector cells, each of the projector cells including: a controllable light emitting element array configured to generate a light beam including a plurality of sub-beams; and an optical element stack, including: a collimating optical layer; and a controllable ray steering layer configured to change a projection angle of an incoming light ray.

For some embodiments of an additional example apparatus, control inputs to the controllable light emitting element array and to the controllable ray steering layer may be configured to cause spatial-temporal altering of at least one of color, angle, focal depth, or intensity of a rendered image.

A further example method in accordance with some embodiments may include: determining a relative position of an eye of a first user; projecting a calibration beam to intercept within a projection area of the first user, the projection area including an area capable of being targeted and detected by each projector cell of a display apparatus; receiving, for each projector cell, as a reflected calibration image, the calibration beam reflected through a respective optical path used for display illumination; measuring, for each projector cell, a spatial offset of the received calibration image; and responsive to the measured spatial offset of the received calibration image for each projector cell, making a calibration adjustment to a respective projection angle for the respective projector cell.

Another additional example apparatus in accordance with some embodiments may include: a matrix of projector cells, each projector cell including a controllable light emitting element array configured to generate a light beam; and an optical element stack, including: a collimating optical layer; and a controllable ray steering layer configured to change a projection angle of an incoming light ray.

For some embodiments of another additional example apparatus, the apparatus may generate a plurality of light beams via coordinated spatial-temporal altering of control inputs to the light emitting element array of the projector cell and to the controllable ray steering layer based on at least one of color, angle, focal depth, and intensity of a rendered image.

For some embodiments of another additional example apparatus, the ray steering layer may be configured to be calibrated using a calibration beam imaged through display optics of the apparatus and recorded by light sensor elements.

For some embodiments of another additional example apparatus, a steering angle of the ray steering layer may be configured to be calibrated continually using a calibration beam.

Some embodiments of another additional example apparatus may further include: a tracking beam generator configured to generate a tracking beam; and a sensor configured to detect an intensity level of a viewer, wherein at least one of the controllable light emitting element arrays may be configured to alter an intensity level of the light beam generated based on the intensity level detected during an active period for a respective projector cell.

For some embodiments of another additional example apparatus, at least one of the controllable light emitting element arrays may be configured to alter the intensity level of the light beam generated by an amount proportional to the intensity level detected during the active period for the respective projector cell.

For some embodiments of another additional example apparatus, the apparatus may be configured to be calibrated using a calibration beam projected on a target area of a viewer in coordination with movement of an eye location of the viewer relative to a display of the apparatus.

A further example apparatus in accordance with some embodiments may include: a tracking process configured to track viewer movement adjustments; and a light field image display structure configured to display a light field image using the viewer movement adjustments.

For some embodiments of a further example apparatus, the light field image display structure may include a plurality of beam-steering elements corresponding to respective light emitting elements.

Another further additional example apparatus in accordance with some embodiments may include: a plurality of display pixels; a beam collimator layer; a plurality of beam-steering elements; a tracking beam generator configured to generate a tracking beam; and a plurality of sensors configured to detect a reflection of the tracking beam.

An example apparatus in accordance with some embodiments may include: a plurality of individually-addressable light emitting elements; a beam-steering element; and a collimating optical element positioned between one or more of the light-emitting elements and the beam-steering element, wherein the plurality of light emitting elements and the beam-steering element may be configured to form a synchronous composite beam of light, the synchronous composite beam of light including light emitted from one or more of the plurality of light emitting elements, passing through the collimating optical element, and steered by the beam-steering element.

An example method in accordance with some embodiments may include: emitting a respective light beam from each of a plurality of individually-addressable light emitting elements of a projector cell; passing each of the respective light beams through a respective collimating optical element; steering each of the respective light beams with a respective beam-steering element; forming a synchronous composite beam of light, the synchronous composite beam of light including light emitted from one or more of the plurality of light emitting elements of the projector cell, such that the projector cell is part of a matrix including a plurality of projector cells, and such that each of the respective collimating optical elements is positioned between one or more of the plurality of light-emitting elements and the respective beam-steering element.

For some embodiments of the example method, such that the matrix of projector cells may include a matrix of display pixels, and such that each display pixel of the matrix of display pixels may include: one of the plurality of individually-addressable light emitting elements; and an illumination sensor configured to detect illumination levels of reflected light beams.

For some embodiments of the example method, such that steering at least two of the respective light beams may occur simultaneously with the same respective beam steering element.

Some embodiments of the example method may further include tracking an eye position of a viewer.

Some embodiments of the example method may further include generating a tracking beam used for adjusting image display parameters.

Some embodiments of the example method may further include measuring a reflected light beam using a plurality of light sensors, such that generating the tracking beam may include reflecting the tracking beam off a viewer to generate the reflected tracking beam.

For some embodiments of the example method, such that measuring the reflected tracking beam may include measuring at least one color, angle, focal depth, or intensity of the reflected tracking beam.

For some embodiments of the example method, such that generating the tracking beam may include: emitting a tracking light beam from one or more tracking beam light emitting elements; passing each tracking light beam through a tracking beam collimating optical element; and steering each tracking light beam with a tracking beam beam-steering element, such that the tracking beam collimating optical element may be positioned between the one or more tracking beam light-emitting elements and the tracking beam beam-steering element.

For some embodiments of the example method, such that generating the tracking beam generates a synchronous composite beam of light, the synchronous composite beam of light including the tracking light beam emitted from the one or more tracking beam light emitting elements, passing through the tracking beam collimating optical element, and steered by the tracking beam beam-steering element.

For some embodiments of the example method, such that generating the tracking beam generates a calibration spot on a viewer, the calibration spot including the tracking light beam emitted from the one or more tracking beam light emitting elements, passing through the tracking beam collimating optical element, and steered by the tracking beam beam-steering element.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . " For brevity and clarity of presentation, this implied leading clause is not repeated ad nauseum in the detailed description.

DETAILED DESCRIPTION

A wireless transmit/receive unit (WTRU) may be used, e.g., as, and/or may, e.g., include, a light field display in accordance with some embodiments described herein.

Figure 1A:
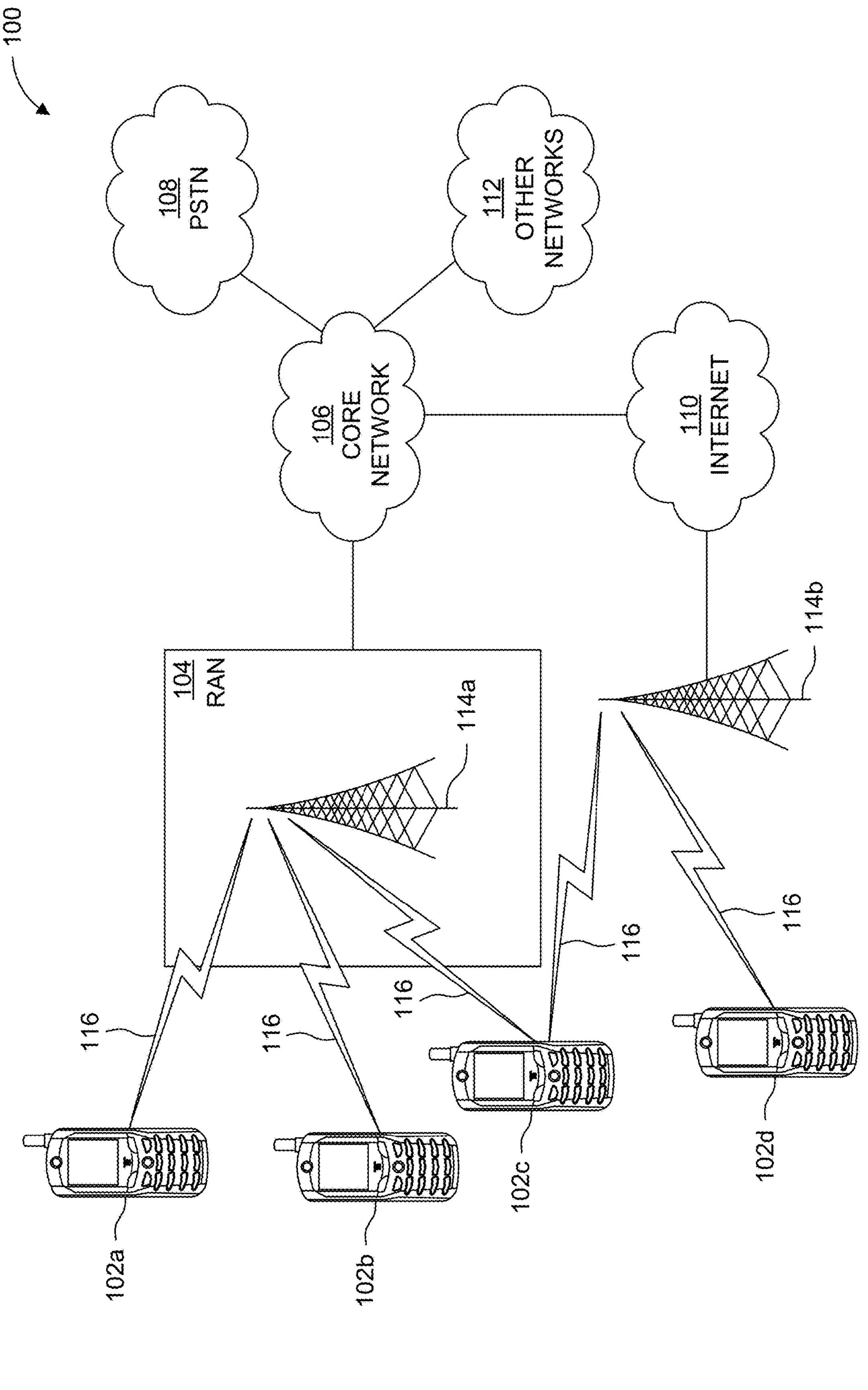
FIG. 1A is a system diagram illustrating an example communications system according to some embodiments.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*,

102*b*, 102*c*, 102*d*, a RAN 104/113, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104/113 may be in communication with the CN 106, which may be any type of network configured to provide voice, data, applications, and/or voice over internet protocol (VOIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106 may be in direct or indirect communication with other RANs that employ the same RAT as the RAN 104/113 or a different RAT. For example, in addition to being connected to the RAN 104/113, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
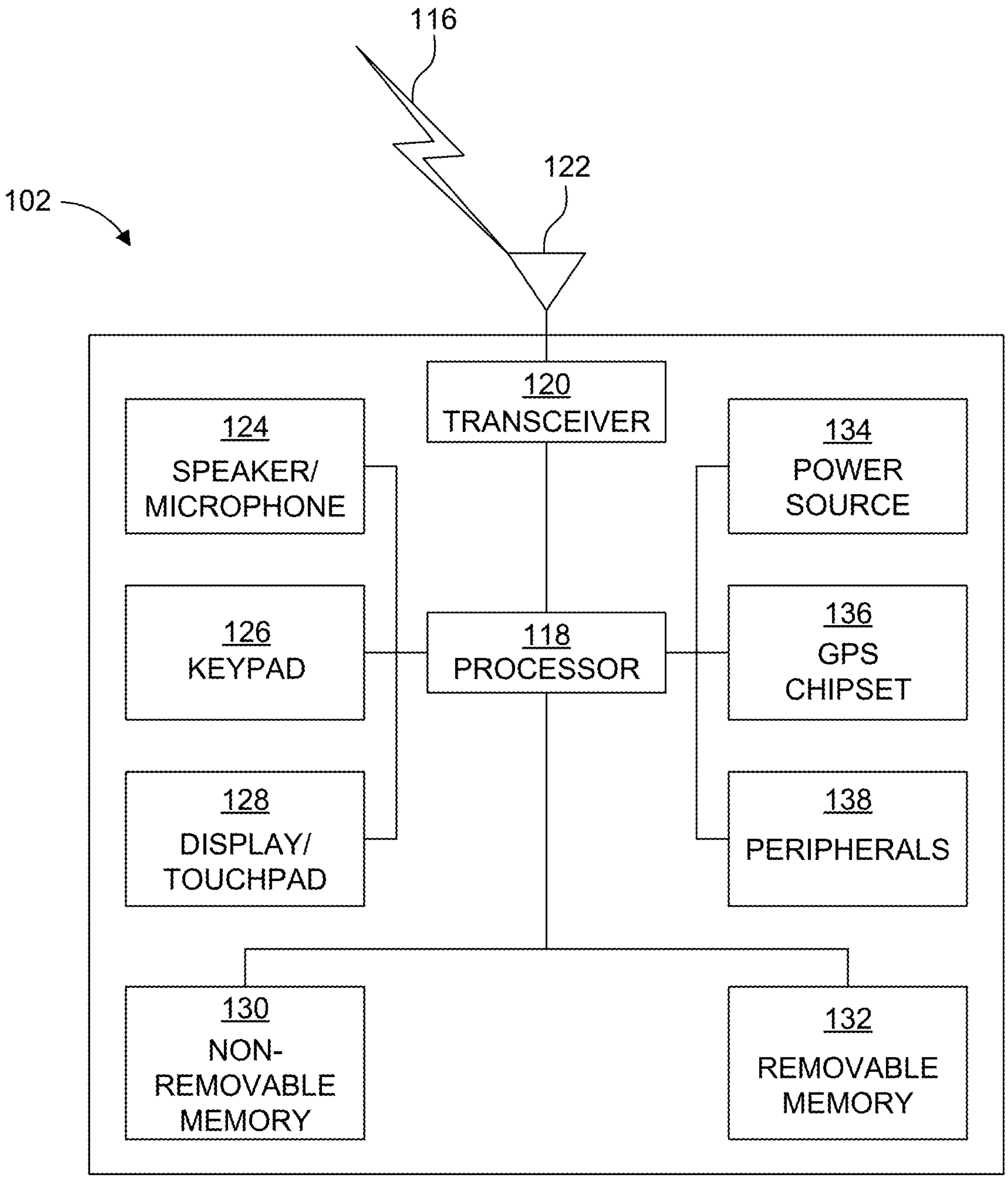
FIG. 1B is a system diagram illustrating an example wireless transmit/receive unit (WTRU) that may be used within the communications system illustrated in FIG. 1A according to some embodiments.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

In view of FIGS. 1A-1B, and the corresponding description of FIGS. 1A-1B, one or more, or all, of the functions described herein with regard to one or more of: WTRU 102*a-d*, Base Station 114*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Displaying visual information is currently achieved mostly, e.g., by using simple displays that control the color and luminance of multiple small pixels, that emit light to all directions. Information about three dimensional scenes on such displays is usually represented as a single 2D-image projection of the 3D scene. This may not be the optimal way to view a 3D scene. Although multiple display paradigms exist that improve the visual experience, it may be argued, depending on, e.g., a desired application, that an optimal visual experience is produced by a display that may produce any arbitrary distribution of luminance and color as a function of position and viewing direction. This luminance distribution is often called a light field (LF), or the plenoptic function. If a light field is produced with sufficient accuracy, the human viewer may not notice the difference between a synthetic light field and a real one.

Multiple different optical methods may be used to create a light field display. These include, e.g., electroholography, integral imaging, parallax barriers and beam redirection. In electroholography, dense spatial light modulators (SLMs) are used to modulate coherent monochromatic light, which creates the light field as a wavefront. In integral imaging, a microlens array is placed in front of a 2D display. This divides the resolution of the underlying display to spatial and angular domains. In parallax barrier methods an array of static pinholes or slits is used to selectively block light. Dynamic barriers also may be used, which are usually implemented with an SLM, or multiple stacked SLMs. Parallax barrier displays also may include time multiplexing by displaying multiple different patterns (usually called frames) on the SLMs, so that the frames get integrated together due to persistence of vision. In beam redirection methods, beams of light are time sequentially scanned while their intensity is modulated. This method may be implemented, for example, with a directional backlight whose intensity is modulated by a SLM. For some embodiments, such a method may be implemented by having an array of intensity controlled beam generators combined with a beam redirection method.

Vergence-accommodation conflict (VAC) may be a reason for moving from stereoscopic 3D displays to high angular resolution light field systems. A high quality 3D LF display may be able to produce both correct eye convergence and retinal focus cues simultaneously without VAC. In many stereoscopic multiview displays, image points lie on a surface of a display and only two illuminated pixels, one visible for each eye, are used in representing a 3D point. This method uses eye convergence for creation of the 3D visual effect, but this method may not be capable of producing the correct retinal focus cues because the angular density of the emitted light field may not be high enough.

One type of 3D display capable of providing correct focus cues uses volumetric display techniques that may produce 3D images in true 3D space. Each voxel of a 3D image is located physically at the spatial position where it is supposed to be and reflects or emits light from that position toward the observers to form a real image in the eyes of viewers. Some issues with 3D volumetric displays may be low resolution, large physical size, and expensive manufacturing costs. These issues may make them too cumbersome to use outside of special cases (such as product displays, museums, shows, etc.). Another type of 3D display device capable of providing correct retinal focus cues is the holographic display. Holographic displays aim to reconstruct whole light wavefronts scattered from objects in natural settings. One problem with holographic displays may be the lack of suitable Spatial Light Modulator (SLM) components that may be used in the creation of the extremely detailed wavefronts.

Figure 2:
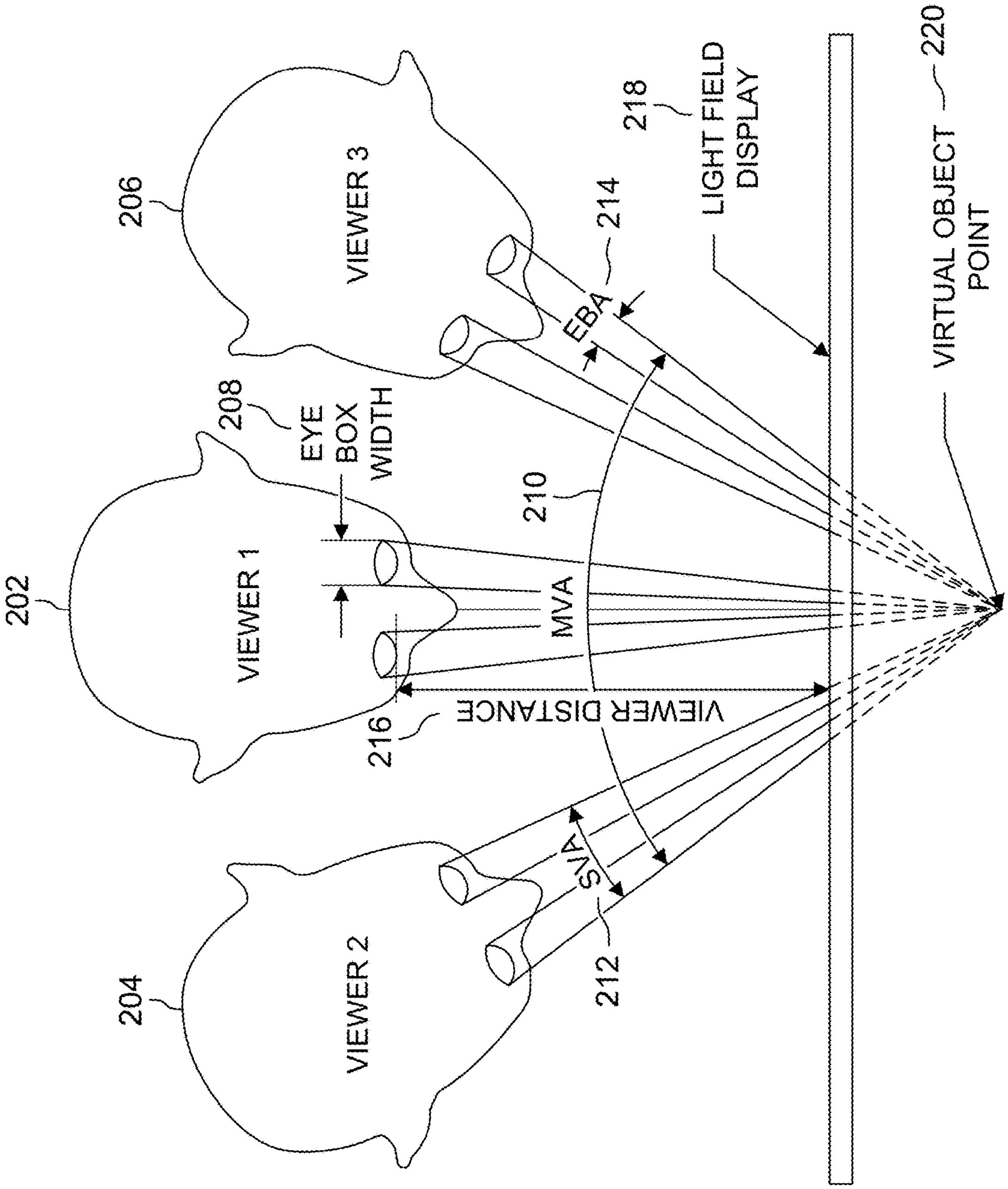
FIG. 2 is a schematic plan view illustrating an example viewing environment of a light field display according to some embodiments.

FIG. 2 is a schematic plan view illustrating an example viewing environment of a light field display according to some embodiments. FIG. 2 shows example geometry of light emission angles associated with a light field (LF) display 218 producing retinal focus cues and multiple viewers 202, 204, 206 of 3D content with a single display panel 218. A single 3D display surface 218 may generate two different views to the eyes of a single user to create a coarse 3D perception effect. The brain uses these two different images for calculation of distance based on triangulation method and interpupillary distance. Two views may be projected into a single user viewing angle (SVA) 212. In addition, an LF display 218 may project two different views inside a single eye pupil to provide a correct retinal focus cues.

For optical design purposes, an "eye-box" width 208 may be determined around a viewer's eye pupil for determining the volume of space within which a viewable image may be formed. In the case of the LF display, two partially overlapping views are projected inside the eye-box angle (EBA) 214 covered by the eye-box at a certain viewing distance 216. If the display 218 is intended to be used by multiple viewers 202, 204, 206 looking at the display 218 from different viewing angles, several views of the same 3D content may be projected to all viewers 202, 204, 206 covering the whole intended multi-user viewing angle (MVA) 210. For some embodiments, light may be projected to the viewers 202, 204, 206 such that an object appears to be behind the display and that such the light appears to be emanating from virtual object point 220.

For some embodiments, a high-quality LF display may be generated with multiple projected beams that form voxels to different focal distances from the display. To create higher resolution images, each beam is very well collimated with a narrow diameter. Furthermore, ideally, the beam waist may be positioned at the same spot as where the beams cross to avoid contradicting focus cues for the eye. If the beam diameter is large, the voxel formed in the beam crossing may be imaged to the eye retina as a large spot. A large divergence value means that the beam is becoming wider as the distance between voxel and the eye is getting smaller. The virtual focal plane spatial resolution becomes worse as the eye resolution becomes better due to the close distance.

Figure 3A:
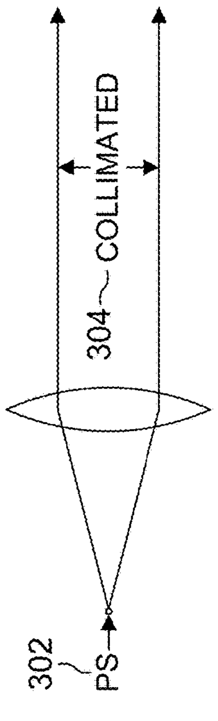
FIG. 3A is an illustration showing an example beam divergence caused by a first geometric factor according to some embodiments.
Figure 3B:
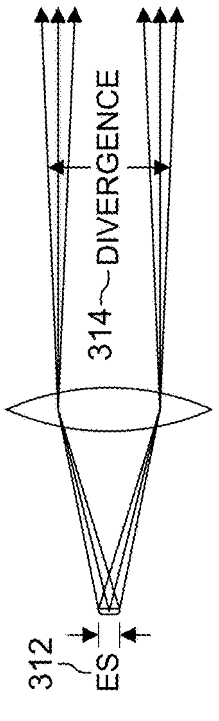
FIG. 3B is an illustration showing an example beam divergence caused by a second geometric factor according to some embodiments.
Figure 3C:
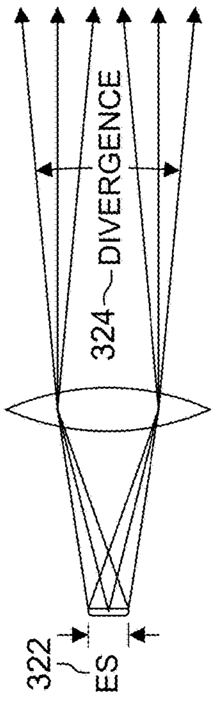
FIG. 3C is an illustration showing an example beam divergence caused by a third geometric factor according to some embodiments.

FIG. 3A is an illustration showing an example ideal case of perfect collimation without any beam divergence caused one or more geometric factors according to some embodiments. FIG. 3B is an illustration showing an example beam divergence caused by one or more geometric factors according to some embodiments. FIG. 3C is an illustration showing an example beam divergence caused by one or more geometric factors according to some embodiments. For the ideal lens of FIG. 3A, the achievable light beam collimation is dependent on two geometrical factors: size of the light source and focal length of the lens. Perfect collimation 304 without any beam divergence may only be achieved in the theoretical case in which a single color point source (PS) 302 is located exactly at focal length distance from an ideal positive lens. This case is pictured in FIG. 3A. Unfortunately, all real-life light sources have some surface area from which the light is emitted making them extended sources (ES) 312, 322. As each point of the source is separately imaged by the lens, the total beam ends up consisting from a group of collimated sub-beams that propagate to somewhat different directions after the lens. As shown in FIGS. 3A to 3C, as the source grows larger, the total beam divergence 314, 324 increases. This geometrical factor generally cannot be avoided with any optical means and it is the dominating feature causing beam divergence with relatively large light sources.

Another, non-geometrical, feature causing beam divergence is diffraction. The term refers to various phenomena that occur when a wave (of light) encounters an obstacle or a slit. Diffraction is the bending of light around the corners of an aperture into the region of a geometrical shadow. Diffraction effects may occur in all imaging systems and cannot be removed, even with a perfect lens design that is able to balance out all optical aberrations. A lens that is able to reach the highest optical quality is often called "diffraction limited" because most of the blurring remaining in the image comes from diffraction. The angular resolution achievable with a diffraction limited lens may be calculated from the formula of Eq. 1:

$$\Theta = \arcsin\left(1.22 * \left(\frac{\lambda}{D}\right)\right) \quad \text{Eq. 1}$$

where λ is the wavelength of light, and D is the diameter of the lens aperture. It may be seen from the equation that the color (wavelength) of light and lens aperture size (diameter of light entering a viewer's pupil) are the only things that have an influence on the amount of diffraction.

Figure 3D:
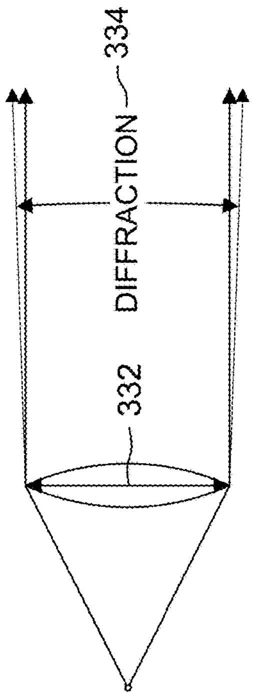
FIG. 3D is an illustration showing an example beam divergence caused by diffraction and a first aperture size according to some embodiments.
Figure 3E:
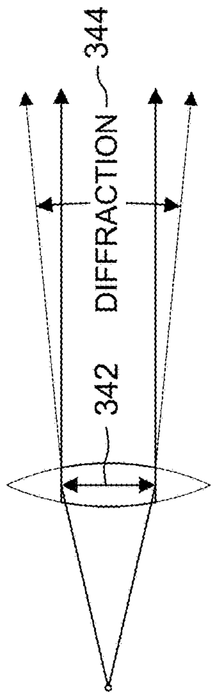
FIG. 3E is an illustration showing an example beam divergence caused by diffraction and a second aperture size according to some embodiments.
Figure 3F:
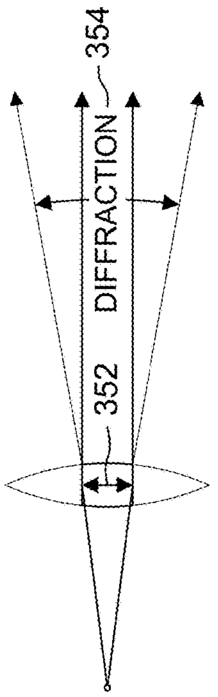
FIG. 3F is an illustration showing an example beam divergence caused by diffraction and a third aperture size according to some embodiments.

FIG. 3D is an illustration showing an example beam divergence caused by diffraction and a first aperture size according to some embodiments. FIG. 3E is an illustration showing an example beam divergence caused by diffraction and a second aperture size according to some embodiments. FIG. 3F is an illustration showing an example beam divergence caused by diffraction and a third aperture size according to some embodiments. FIGS. 3D to 3F show a schematic presentation of how the beam divergence is increased when the lens aperture size 332, 342, 352 is reduced. This effect may actually be formulated into a general rule in imaging optics design: if the design is diffraction limited, the only way to improve resolution is to make the aperture larger. Diffraction is typically the dominating feature causing beam divergence with relatively small light sources.

As shown in FIGS. 3A-3C, the size of an extended source has a big effect on the achievable beam divergence. The source geometry or spatial distribution is actually mapped to the angular distribution of the beam, and this property may be seen in the resulting "far field pattern" of the source-lens system. In practice, this property means that if the collimating lens is positioned at the focal distance from the source, the source is actually imaged to a relatively large distance from the lens and the size of the image may be determined from the system "magnification ratio". In the case of a single imaging lens, this magnification ratio may be calculated by dividing the distance between lens and image with the distance between source and lens, as shown in Eq. 2:

$$\text{magnification ratio} = \frac{\text{distance between lens and image}}{\text{distance between source and lens}} \quad \text{Eq. 2}$$

Figure 4A:
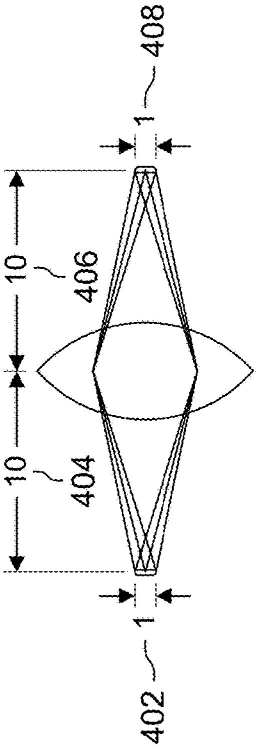
FIG. 4A is an illustration showing an example image magnification lens with a first optical power according to some embodiments.
Figure 4B:
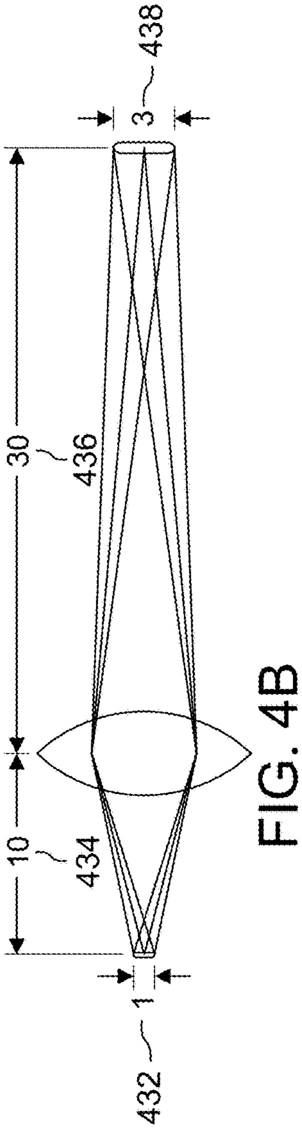
FIG. 4B is an illustration showing an example image magnification lens with a second optical power according to some embodiments.
Figure 4C:
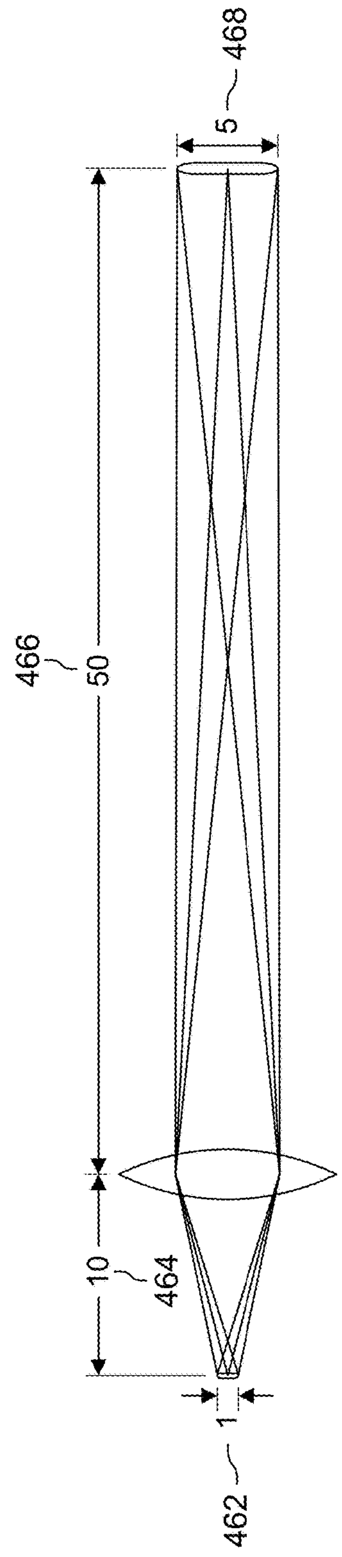
FIG. 4C is an illustration showing an example image magnification lens with a third optical power according to some embodiments.

FIG. 4A is an illustration showing an example image magnification lens with a first optical power according to some embodiments. FIG. 4B is an illustration showing an example image magnification lens with a second optical power according to some embodiments. FIG. 4C is an illustration showing an example image magnification lens with a third optical power according to some embodiments. FIGS. 4A to 4C illustrate Eq. 2 for three different distances 406, 436, 466 between the lens and the image, resulting in larger images 408, 438, 468 as the distance 406, 436, 466 is increased. If the distance 404, 434, 464 between the source (with a fixed height 402, 432, 462) and the lens is fixed, different image distances may be achieved by changing the optical power of the lens with the lens curvature. But when the image distance becomes larger and larger in comparison to the lens focal length, the changes in lens optical power become smaller and smaller, approaching the situation where the lens is effectively collimating the emitted light into a beam that has the spatial distribution of the source mapped into the angular distribution, and the source image is formed without focusing.

In flat form factor goggleless 3D displays, the display projection lenses typically have very small focal lengths in order to achieve the flat structure, and the beams from a single display optics cell are projected to a relatively large viewing distance. This means that the sources are effectively imaged with high magnification when the beams of light propagate to the viewer. For example, if the source size is 50 μm×50 μm, projection lens focal length is 1 mm, and viewing distance is 1 m, then the magnification ratio is 1000:1, and the source geometric image is 50 mm×50 mm. This means that the single light emitter may be seen only with one eye inside this 50 mm diameter eyebox.

For a lens with a magnification ratio of 1000:1, if the source has a diameter of 100 μm, the resulting image is 100 mm wide, and the same pixel may be visible to both eyes simultaneously because the average distance between eye pupils is only 64 mm. In this latter case, a stereoscopic 3D image is not be formed because both eyes see the same images. This example calculation shows how geometrical parameters, like light source size, lens focal length, and viewing distance, are tied to each other.

As the beams of light are projected from the LF display pixels, divergence causes the beams to expand. This effect applies not only to the actual beam emitted from the display towards the viewer but also to the virtual beam that appears to be emitted behind the display, converging to the single virtual focal point close to the display surface. In the case of a multiview display, this effect is a good thing because divergence expands the size of the eye-box and one only has to take care that the beam size at the viewing distance doesn't exceed the distance between the two eyes as that would break the stereoscopic effect. However, if creating a voxel to a virtual focal plane with two or more crossing beams outside the display surface, the spatial resolution achievable with the beams gets worse as the divergence increases. If the beam size at the viewing distance is larger than the size of the eye pupil, the pupil becomes the limiting aperture of the whole optical system.

Both geometric and diffraction effects work in unison, and an LF display pixel design may balance geometric and diffraction effects to achieve a particular voxel resolution. This is emphasized with very small light sources as the optical system measurements become closer to the wavelength of light and diffraction effects start to dominate the performance. FIGS. 5A to 5D illustrate how the geometric and diffraction effects work together in cases where one and two extended sources are imaged to a fixed distance with a fixed magnification. FIGS. 5A to 5D show light source spot sizes for different geometric magnification and diffraction effects.

Figure 5A:
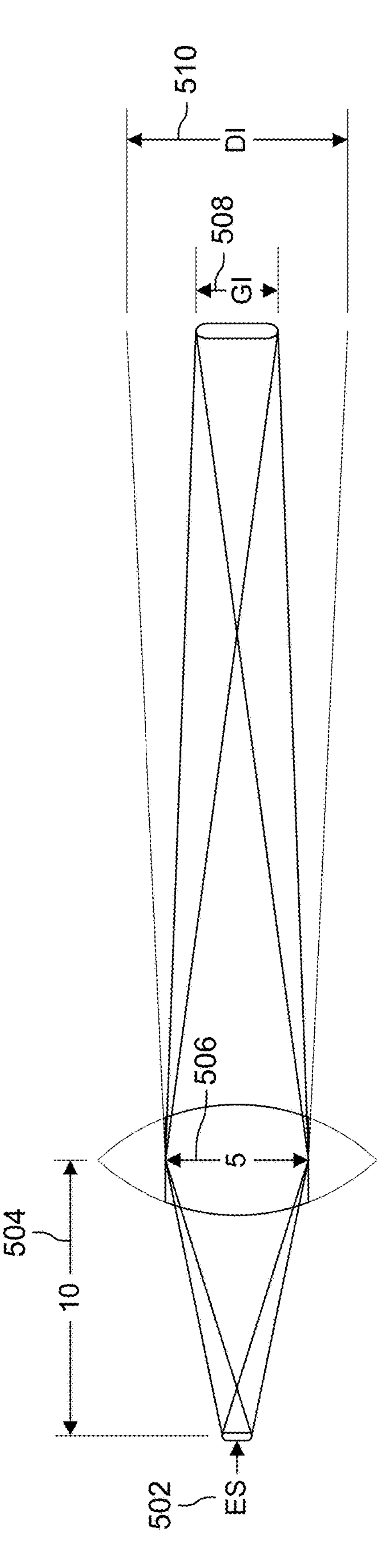
FIG. 5A is an illustration showing an example first light source and lens configuration according to some embodiments.

FIG. 5A is an illustration showing an example first light source and lens configuration according to some embodiments. For the example structure of FIG. 5A, an extended source (ES) 502 is located at a focal length 504 of 10 cm from the magnification lens. Light beams passing through an example lens aperture 506 are separated by 5 cm. The light beams have a geometric image indicated as GI 508. The light source has a diffracted image height indicated by DI 510. FIG. 5A shows a lens aperture size 506 that is relatively small, and the geometric image (GI) 508 is surrounded by a blur that comes from diffraction in making the diffracted image (DI) 510 much larger.

Figure 5B:
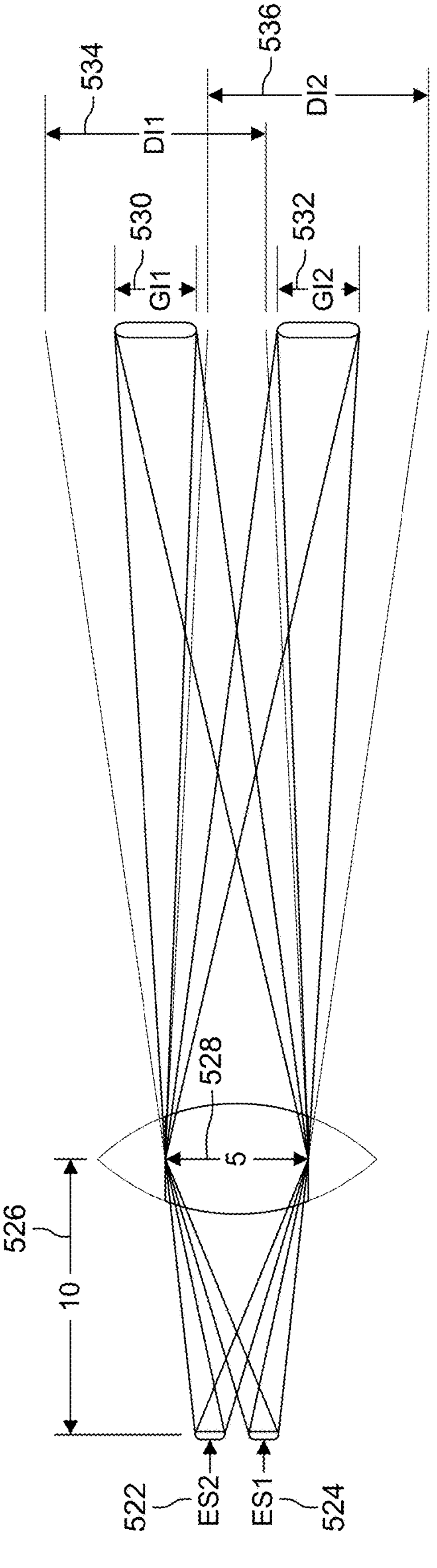
FIG. 5B is an illustration showing an example second light source and lens configuration according to some embodiments.

FIG. 5B is an illustration showing an example second light source and lens configuration according to some embodiments. For the example structure of FIG. 5B, two extended sources (ES1 (522) and ES2 (524)) are located at a focal distance 526 of 10 cm from the magnification lens. Light beams passing through an example lens aperture 528 are separated by 5 cm. The light beams generate respective image indicated with heights of GI1 (530) and GI2 (532), respectively. Each light source has a respective diffracted image height indicated by DI1 (534) and DI2 (536), respectively. FIG. 5B shows a case where two extended sources are placed side-by-side and imaged with the same small aperture lens. Even though the GIs 530, 532 of both sources are separated, the two source images cannot be resolved because the diffracted images overlap. In practice this would mean that reduction of light source size may not improve the achievable voxel resolution because the resulting source image size may be the same with two separate light sources as with one larger source that covers the area of both separate emitters. In order to resolve the two source images as separate pixels/voxels, the aperture size of the imaging lens may be increased.

Figure 5C:
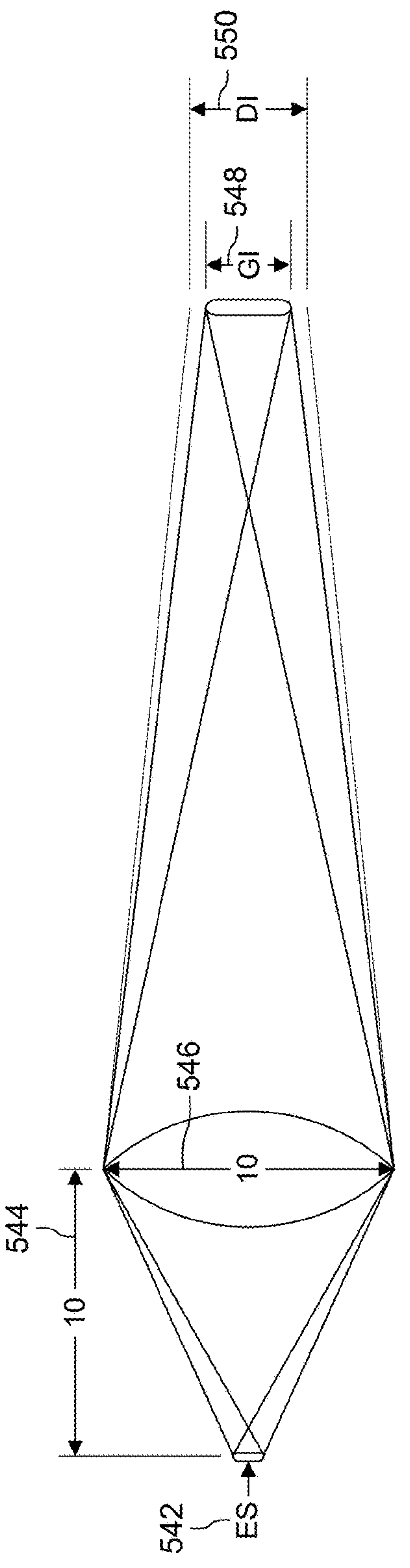
FIG. 5C is an illustration showing an example third light source and lens configuration according to some embodiments.

FIG. 5C is an illustration showing an example third light source and lens configuration according to some embodiments. For the example structure of FIG. 5C, an extended source (ES) 542 is located at a focal distance 544 of 10 cm from the magnification lens. Light beams passing through an example lens aperture 546 are separated by 10 cm. The light beams generate an image indicated with a height of GI (548). The light source has a diffraction index indicated by DI (550). Compared with FIG. 5A, the distance GI (548) is the same in both figures, but the diffracted image height 550 in FIG. 5C is smaller than the diffracted image height 550 in FIG. 5A. FIG. 5C shows the same focal length lens as FIGS. 5A and 5B, but a larger aperture 546 is used in imaging the extended source 542. Diffraction is reduced, and the diffracted image may be only slightly larger than the geometric image, which has remained the same size because magnification is fixed.

Figure 5D:
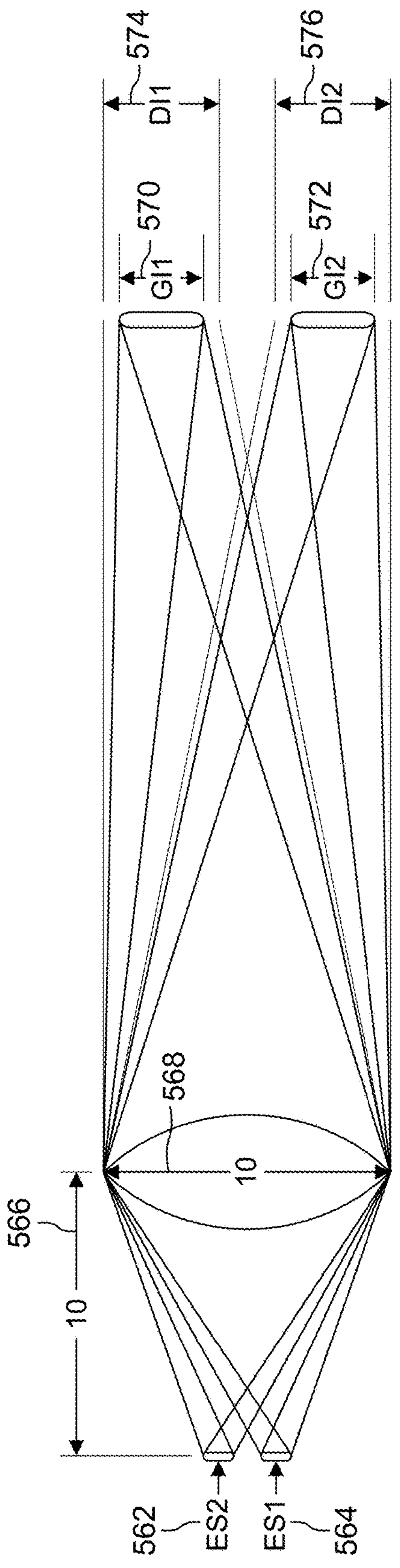
FIG. 5D is an illustration showing an example fourth light source and lens configuration according to some embodiments.

FIG. 5D is an illustration showing an example fourth light source and lens configuration according to some embodiments. For the example structure of FIG. 5D, two extended sources (ES1 (564) and ES2 (562)) are located at a focal distance 566 of 10 cm from the magnification lens. Light beams passing through an example lens aperture 568 are separated by 10 cm. The light beams generate respective image indicated with heights of GI1 (570) and GI2 (572), respectively. Each light source has a respective diffracted image height indicated by DI1 (574) and DI2 (576), respectively. Compared with FIG. 5B, the distances GI1 (570) and GI2 (572) are the same in both figures, but the diffracted image heights 574, 576 in FIG. 5D are smaller than the diffracted heights 532, 536 in FIG. 5B. In FIG. 5D, the two spots may be resolved because the diffracted images 574, 576 are not overlapping, thereby enabling the use of two different sources and improvement of spatial resolution of the voxel grid.

An integral imaging display with horizontal and vertical parallax divides the resolution of a source array or pixelated 2D display into spatio-angular domains, whose intensity may be controlled independently by controlling the individual emitters of the beam generating matrix. Such displays may be subject to a compromise between spatial and angular resolution; the total number of angular views times the spatial resolution equals the number of used light sources or pixels. Additional compromises may be made with the spatial light source density and total spatial range. A smaller display or source matrix with the same number of pixels or sources has a higher spatial density.

Figure 6A:
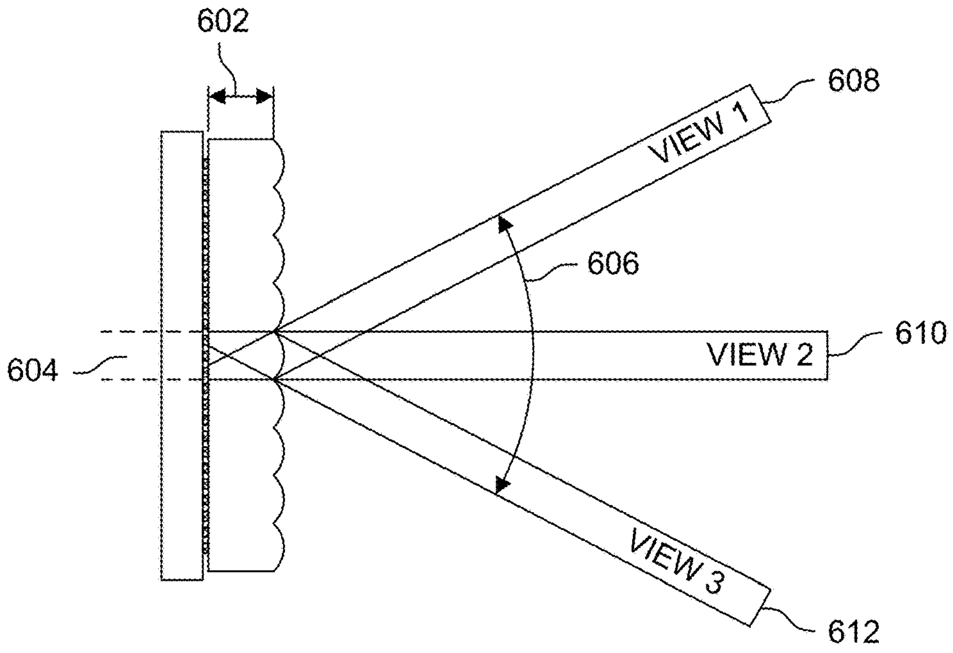
FIG. 6A is an illustration showing an example multiview 3D display structure with a first focal length according to some embodiments.
Figure 6B:
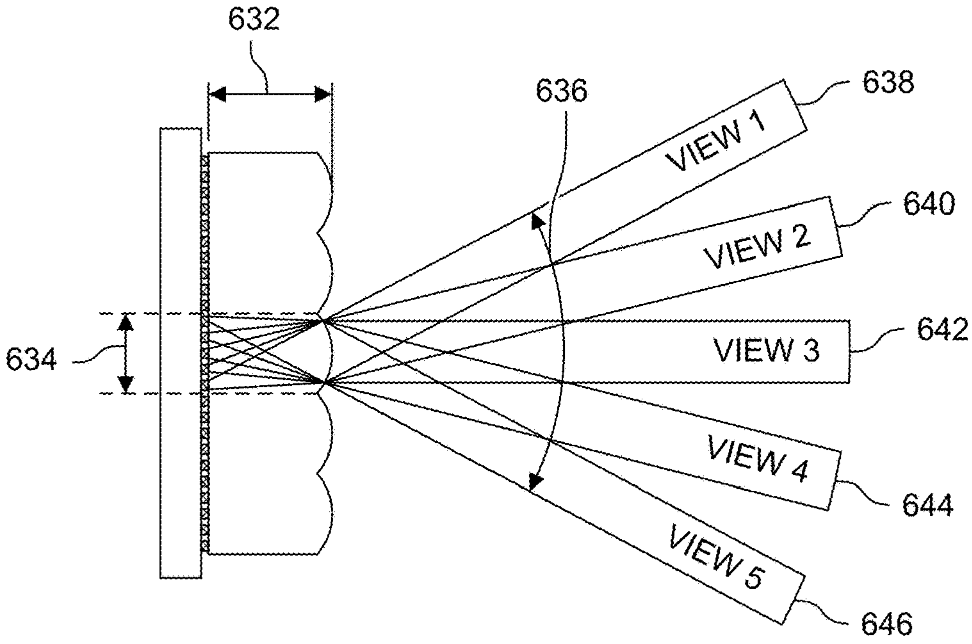
FIG. 6B is an illustration showing an example multiview 3D display structure with a second focal length according to some embodiments.
Figure 6C:
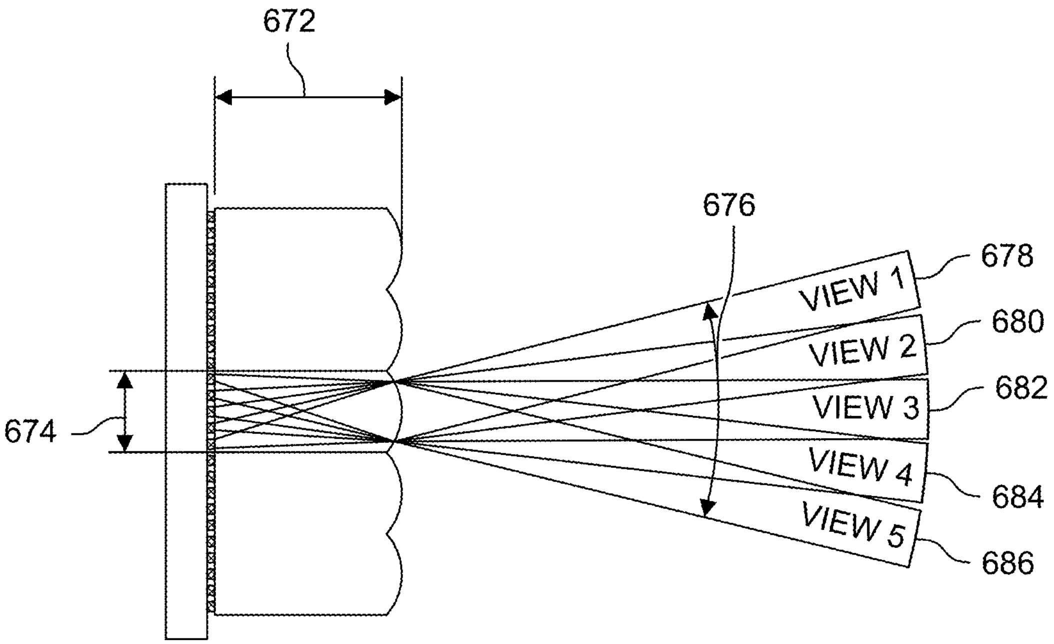
FIG. 6C is an illustration showing an example multiview 3D display structure with a third focal length according to some embodiments.

FIG. 6A is an illustration showing an example multiview 3D display structure with a first focal length according to some embodiments. FIG. 6B is an illustration showing an example multiview 3D display structure with a second focal length according to some embodiments. FIG. 6C is an illustration showing an example multiview 3D display structure with a third focal length according to some embodiments.

As an example of an optical design challenge, FIGS. 6A and 6B show two integral imaging multiview display cases where a lenticular sheet is placed in front of a light emitter array. In the examples of FIGS. 6A and 6B, the quantity and size of emitters is the same. Lenticular lenses may be designed to have the same focal length (FL) 602, 632, which is the distance between lens surface and source. The optics of the lenticular lenses may be able to create multiple well-collimated individual beams of light that are used in showing the multiview images to different view directions. Both example cases have the same field-of-view (FOV) 606, 636, but as the structure of FIG. 6B has a larger lens aperture 634 that covers five sources with five shown views 638, 640, 642, 644, 646 instead of the lens aperture 604 of FIG. 6A that covers three sources with three shown views 608, 610, 612, the angular resolution is higher. However, as the aperture is larger, spatial resolution is lower.

A trade-off may be made with the angular view density and total angular range or FOV. By increasing the distance between microlenses and emitters and decreasing the optical power of the microlenses accordingly, the angular view density may be increased but the FOV is lowered. This trade-off is illustrated in the display optics cases pictured in FIGS. 6B and 6C. Both structures have the same lens aperture size 674, 634 and both structures are able to create five different view beams 638, 640, 642, 644, 646, 678, 680, 682, 684, 686 for each projector cell. But as the optics of the structure of FIG. 6C has a longer FL 672, the beams 678, 680, 682, 684, 686 are projected to a lower FOV 676 and angular density is increased.

For a narrow FOV, eye or face tracking and view steering may be used in order to prevent the viewer from escaping the narrow viewing zone. Such viewing window steering may be used to circumvent the problem of limited spatio-angular resolution according to European Patent Application EP 3 273 302 and U.S. Pat. No. 9,869,969 as understood. Time-multiplexing with the eye-tracked view steering may be used to get separate viewing windows for both of the eyes of the viewer. Such a tracking system is likely not used where the view angular density is not high and single views cover naturally relatively large eye-box areas at the viewing distance. However, many goggleless devices that aim to fulfill the Super Multi View (SMV) condition generate at least two views for each eye pupil, and many such devices may generally need such high accuracy angular aiming that a tracking system likely may be necessary. This high steering accuracy requirement, e.g., for some applications, is emphasized if the viewer is further away from the display system than in cases where the viewer is closer, such as with head mounted devices.

There are many physical factors that may limit the accuracy of ray aiming. For example, with a small diameter microlens, diffraction will effectively make the beam wider when it reaches the viewer. This may place a limit on how small the lens may be made. Also, the lens cannot be too wide either, as the exiting collimated beam width (without considering diffraction) is directly proportional to the lens aperture size and spatial resolution. Also, the wavelength of the light needs to be considered, because if the ray steering layer (RSL) uses refractive elements with dispersion, the colors will be aimed to different locations. Even if all these factors are taken into account in the device design, a ray steering device capable of directing light beams with such high accuracy may be difficult to manufacture because the properties of the ray steering system may change, along with environmental factors, such as temperature. Therefore, the RSL may be calibrated actively during the use of the display.

For some embodiments, display hardware steers ray bundles towards the viewer, which may be contrasted with methods understood to be described in U.S. Patent Application 2014/0035959, journal article Jungmok Bac, et al., *Arrayed Beam Steering Device for Advanced* 3*D Displays,* 8616 Proc. of SPIE (2013) ("Jungmok"), and U.S. Pat. No. 9,207,459 that are understood to steer only one ray and need fast time sequential scanning and persistence of vision. For some embodiments, a ray bundle steering system may use time sequential scanning if the ray steering system is fast enough.

There are several different optoelectronic methods and components that have been developed for non-mechanical beam steering according to journal article P. McManamon, et al., *A Review of Phased Array Steering for Narrow-Band Electrooptical Systems;* 97:6 Proc. of the IEEE (2009) ("McManamon"). Two methods for beam steering are electrowetting cells and multiple techniques based on the combination of beam polarization control and liquid crystal materials. Electrowetting cells forming tunable microprisms (such as the ones mentioned in U.S. Pat. No. 9,042,028) may be used to continually scan beams through a relative large angular range (e.g., ±11° as discussed in Jungmok) with high switching speeds (~ms according to Neil R. Smith, et al., *Agile Wide-Angle Beam Steering with Electrowetting Microprisms;* 14:14 Optics Express 6557-563, (2006). Polarization independence is a benefit of using electrowetting cells, allowing higher optical efficiencies for components. These components have been utilized widely in 3D display applications such as for switching between 2D and 3D display modes as understood to be described in Canadian Patent CA2905147 and U.S. Pat. No. 9,207,459, and for beam steering in the directional backlight system as understood to be described in PCT Application WO2008/142156. Electrowetting cells also have been used for direct image beam steering with additional integral optics structures as understood to be described in U.S. Pat. Nos. 7,688,509 and 10,036,884. Electrowetting has also been used in forming lenticular structures of a multiview display system described in journal article Kim, D., et al., *Electro-Wetting Lenticular Lens with Improved Diopter for 2D and 3D Conversion Using Lens-Shaped ETPTA Chamber,* 26:15 Optics Express 19614 (2018). One disadvantage to electrowetting components is the difficulty in manufacturing the components, which leads to high costs and may limit their use in future consumer 3D display applications. However, as the components are currently under heavy research, electrowetting components may become more available.

Multiple beam steering components and systems based on utilization of liquid crystal (LC) materials have been developed. As highly birefringent material, LC layers have different refractive indices in two orthogonal directions. This property may be used together with, e.g., polymer microprisms for switching between two beam steering states with a structure that contains two LC layers as discussed in H. Wang, et al., *Large-Aperture Transparent Beam Steering Screen Based on LCMPA,* 55:28 Applied Optics (2016). The first, active LC layer, may be sandwiched between, e.g., two glass sheets containing electrodes. The second, passive layer, is formed between glass or polymer substrate and a polymer microprism sheet. Switching is initiated with the active LC layer that twists incident beam linear polarization by 90° in the perpendicular direction to light propagation when voltage is applied. This twisting selects which of the refractive indices of the birefringent passive LC layer is used in the second part of the system. In the first state of the steering system, refractive index difference between passive LC layer and microprism polymer material is so small that no light bending occurs, whereas in the second state the index difference causes light rays to bend to a predetermined angle at the interface. This angle is usually fairly small (~1°), but the angle may be increased, e.g., by adding holographic gratings after the LC layers, according to McManamon or by stacking several polarization based beam steering components, making it possible to reach angles as large as, e.g., ±15° according to PCT Patent Application WO2011/014743.

The first liquid crystal display (LCD) was developed at the late 1960's, which means that LC materials have been used for several decades by the display industry. After such a long history of intense research, the material properties and processing methods are very well known. The main advantage of LC-based beam steering methods is the fact that the components may be produced fairly easily with currently available manufacturing technology and equipment, making it possible to reach low cost in large quantities. The fact that no mechanical movement is needed for initiating beam steering is also one big factor in favor of using such technologies in future 3D displays aimed for consumer markets where the devices will need to be low cost, simple to use and robust. This has led to utilization of LC-based beam steering components in published 3D display prototypes and patents, although no commercial devices have been released yet. A disadvantage of the technology is the use of linearly polarized light, which lowers optical efficiency of the system and increases power consumption. However, as current LCD displays are already polarization dependent systems, the new steering components may be possibly integrated more easily without high cost in efficiency. There also has been some recent developments in using cholesteric LCs (instead of the more common nematic phase crystals) that may be used for beam steering without polarization dependence, as described in Shang X, et al., *Fast Switching Cholesteric Liquid Crystal Optical Beam Deflector with Polarization Independence,* 7 (1) Scientific Reports 6492 (Jul. 26, 2017), making it possible to increase the component transmittance also for display panels based on, e.g., OLEDs or μLEDs.

One of the simplest ways of using LC components in autostereoscopic 3D displays is to use them as electrically switchable parallax barriers as understood to be described in U.S. Pat. No. 9,664,914. When the LC layer is activated, a black grating structure blocks some display pixel view directions and different images may be shown to the two eyes of the viewer. Without the activated grating, the display functions as a normal 2D display. The LC layer also may be used in forming a lenticular lens structure on top of a dense pixel matrix by reorienting some of the LC material molecules with electric current as understood to be described in U.S. Pat. No. 9,709,851. This requires special electrode designs, but it also may be used for switching between 2D and 3D modes as the LC lenses project the pixel images to different view directions. In the latter mode, multiple views may be obtained with the cost of spatial resolution as only spatial multiplexing is used in creation of the multiview image. One proposed system described in Y-P. Huang, et al., *Autostereoscopic 3D Display with Scanning Multi-Electrode Driven Liquid Crystal (MeD-LC) Lens;* 1:1 3D Research 39-42 (2010) scans the electrically formed lenticular LC lenses through the display surface, adding the possibility for time multiplexing. In this case, the pixels synchronized to the scanning action may be activated several times inside a single scan timeframe, creating several additional views. There are also descriptions of hybrid systems, where the beam steering LC element is used before (as understood to be described by PCT Patent Application WO2012/025786) or after (journal article Xiangyu Zhang, et al., *A Novel Spatio-Temporal Multiplexing Multi-View 3D Display,* IEEE Conference on Lasers and Electro-Optics Pacific Rim (CLEO-PR) (2017)) a rigid polymer lenticular sheet structure, making it possible to create additional angular view directions between the directions determined by pixel positions and lenticular optics. In these cases, temporal multiplexing is used effectively together with spatial multiplexing in 3D multiview displays. The same LC based beam steering screen component also may be used in a similar manner with multiple projectors as described in journal article X. Xia, et al., *Time-Multiplexed Multi-View Three-Dimensional Display with Projector Array and Steering Screen,* 26:12 Optics Express 15528-538 (2018). In addition to beam angular steering, both electrowetting cells, as understood to be described in U.S. Pat. No. 6,369,954 and journal article K. Mishra, et al., *Recent Developments in Optofluidic Lens Technology;* 7 (6) Micromachines 102 (2016), and LC-based components with hybrid structures, as understood to be described in U.S. Pat. Nos. 7,408,601 and 9,709,829 and PCT Patent Application WO2016/135434, may be used for adjusting beam focus without mechanical movement. This electronic focus adjustment may be utilized especially in head mounted devices such that the stereoscopic 3D display virtual image may be moved to different focal distances from the eye, making the images look more natural as described in G. Love, et al., *High-Speed Switchable Lens Enables the Development of a Volumetric Stereoscopic Display;* 17 (18) Optics Express 15716-725 (2009). Beam focus adjustment also may be utilized in goggleless 3D displays by adjusting the position or shape of the projected image focal surface as described in N. Matsuda, et al., *Focal Surface Displays;* 36 (4) ACM Transactions on Graphics 1-14 (2017). In many of the cases described in patents and articles, focus adjustment directly alters the whole projected image.

Figure 7:
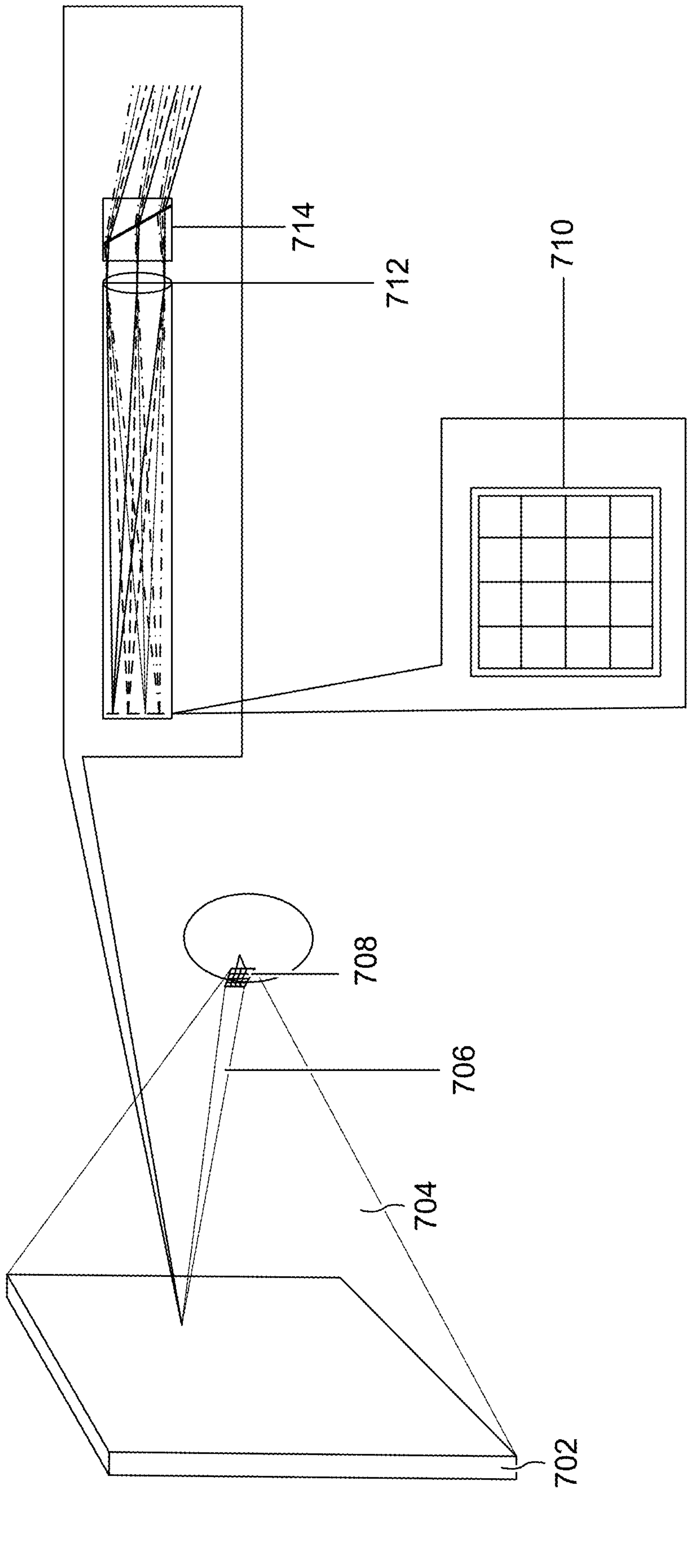
FIG. 7 is a schematic illustration illustrating an example light field display with ray steering according to some embodiments.

FIG. 7 is a schematic illustration illustrating an example light field display with ray steering according to some embodiments. FIG. 7 shows an example display system, which has multiple redirectable ray bundle generators. For some embodiments, a single ray bundle generator may include multiple light emitters 710, a collimating microlens 712, and an electrically-controllable prism 714, such as an electrowetting prism. The microlens 712 collimates emitted light into a bundle of light rays 706 that is steered by the prism 714. Brightness of the individual rays is controlled by the light emitters 710. A display 702 may generate a light field 704 via ray bundles 706 that are viewed in a viewing window 708.

Figure 8B:
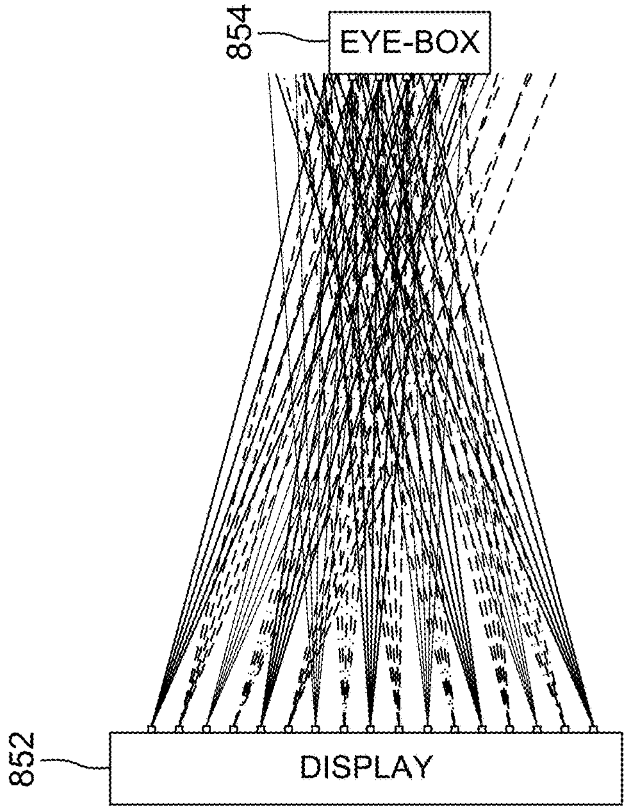
FIGS. 8A-8B are schematic plan views illustrating example ray bundles aimed towards a viewing window according to some embodiments.
Figure 8A:
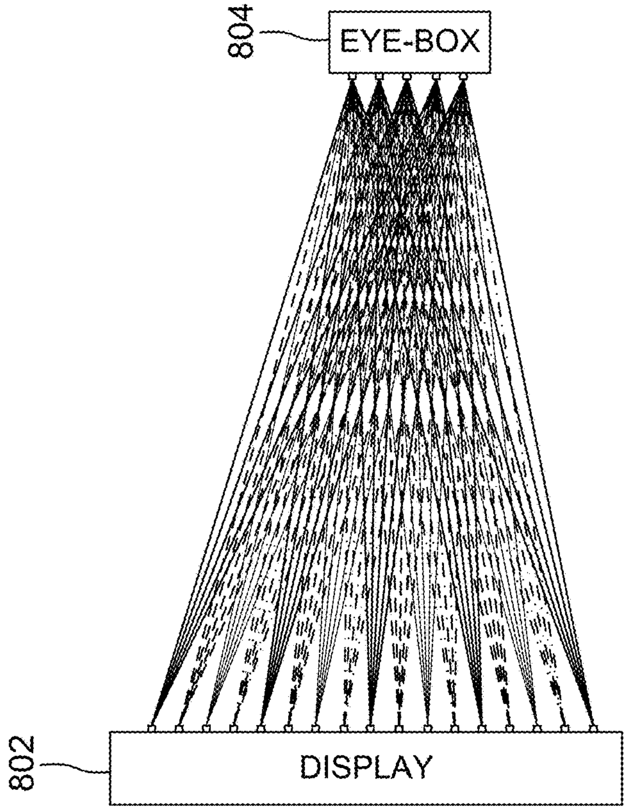

FIGS. 8A-8B are schematic plan views illustrating example ray bundles aimed towards a viewing window according to some embodiments. To create a light field, a viewing window is formed at a certain distance in front of the display around the viewer face, eyes or eye pupils. The light ray bundles are directed towards this viewing window from all display surface locations, and a light field is formed that is visible only from the viewing window. In the viewing window, the detected luminance varies depending on the location on the viewing window and the viewing direction. The window may be discretized by the locations where the individual light rays hit the viewing window. However, because it may be difficult to determine exactly where the light rays hit, the adjacent views may get mixed. This problem is illustrated in FIGS. 8A-8B. In FIG. 8A, the ray bundles are aimed correctly from a display 802 towards predefined locations, which is represented by a viewing window (eye-box) 804. In FIG. 8B, due to inaccurate aiming, the ray bundles coming from different parts of the display 852 that are slightly offset, causing the views to get mixed at the eye-box 854. FIG. 8A shows an example desired beam alignment, and FIG. 8B shows an uncalibrated beam alignment.

This LF display may be viewed as a layered structure, such that the light emitters behind the ray bundle generators are sections of a 2D display unit, the collimating lenses are part of a micro lens array, and the prism is a part of a larger ray steering layer (RSL). Regarding to this viewpoint, as used herein in accordance with some embodiments, the 2D display unit will be called the light emitting layer, and the micro lens array will be called the collimating layer.

A light field may be parameterized over a specified surface by giving the luminance or a similar quantity for each position (x, y) on the surface and each viewing direction (θ, ϕ). This process will be called xyθϕ-parameterization of the light field. The surface usually will be either the viewing window or the display surface. If a xyθϕ-parameterized light field is subjected to a discretization with a rectangular sampling lattice, each discretized point may be thought to cover a 4D-rectangular domain, in a similar way that a pixel in a 2D-display covers a 2D-rectangle. The resulting domains from discretizing in spatial direction and angular direction will be called angular and spatial domains, respectively.

Figure 9:
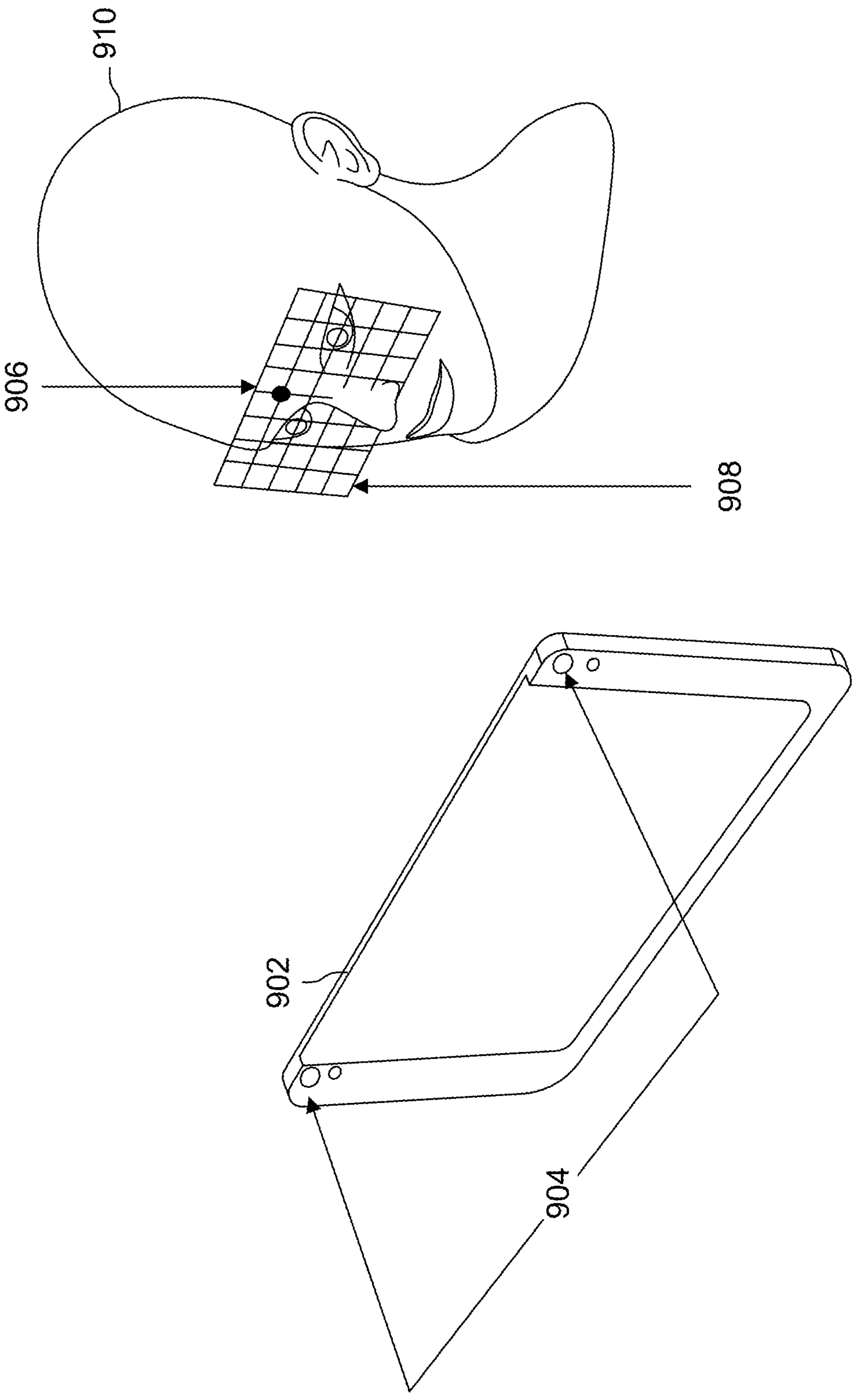
FIG. 9 is a schematic illustration illustrating an example calibration of a light field display according to some embodiments.

FIG. 9 is a schematic illustration illustrating an example calibration of a light field display according to some embodiments. FIG. 9 shows a schematic presentation of an example light field display system that is based on viewer tracking, beam steering and continual image calibration with the presented ray aiming method. The display 902 is divided into a matrix of projector cells that are able to direct beam bundles towards a viewing window 908 created in front of the eyes of the viewer 910. Light is emitted inside the display structure from small individually addressable emitters, such as μLEDs or pixelated OLEDs. The same layer may contain interlaced light sensors, such as photodiodes of organic printed light sensor elements. An optical layer with beam collimating structures and ray steering elements is used in projecting the LF image forming tracking beam spot 906 to the viewing window 908. The rigid optical pieces may be, e.g., polymer microlens and prisms sheets, and the ray steering may be, e.g., electrowetting microprisms or LC-based steering elements. An integrated eye tracking module with beam projection 904 may be included in the device to track eye movements of the viewer 910.

For some embodiments, viewer eyeball tracking of position and/or distance along with calibrating and tracking an illuminated beam spot pattern may enable the use of a low-resolution calibration sensor spatially distributed and co-located with the display's illumination elements. For some embodiments, a device may determine a viewing window of the viewer; render a light field image to be displayed for the viewing window; and display the rendered light field image by the light field display. The viewing window location in the 3D space may be determined using an eye tracking process, which may include, for example, one or more light emitting elements, one or more image sensors (such as image detectors), one or more computer processors, and one or more software functions used to control projecting light with the light emitting elements, reading image sensor data from the image sensors, and processing the sensor data. For some embodiments, this process includes a camera and a separate tracking beam projection unit that is used for making a calibration spot to the viewer facial area inside the viewing window. The optoelectronic projector unit may be, e.g., a polymer or glass lens and an LED or a laser diode. When this common calibration spot is imaged through the individual projector cell optics to the light sensitive components, error correction signals may be determined for both ray steering and LF image. For some embodiments, the optical paths are common to both LF image beams and calibration measurement signal. This makes it possible to render and project the 3D image to exactly the right direction and image beams may be calibrated continuously with a direct feedback signal to each beam projecting unit of the display. The tracking system detects viewer location in all three spatial coordinates, which are used as input data for image rendering. For some embodiments, projecting a beam spot on the viewer may include: determining an estimated reflection location to be an offset above an eye location of the viewer; and projecting the beam spot to reflect off the viewer at the estimated reflection location.

Figure 10:
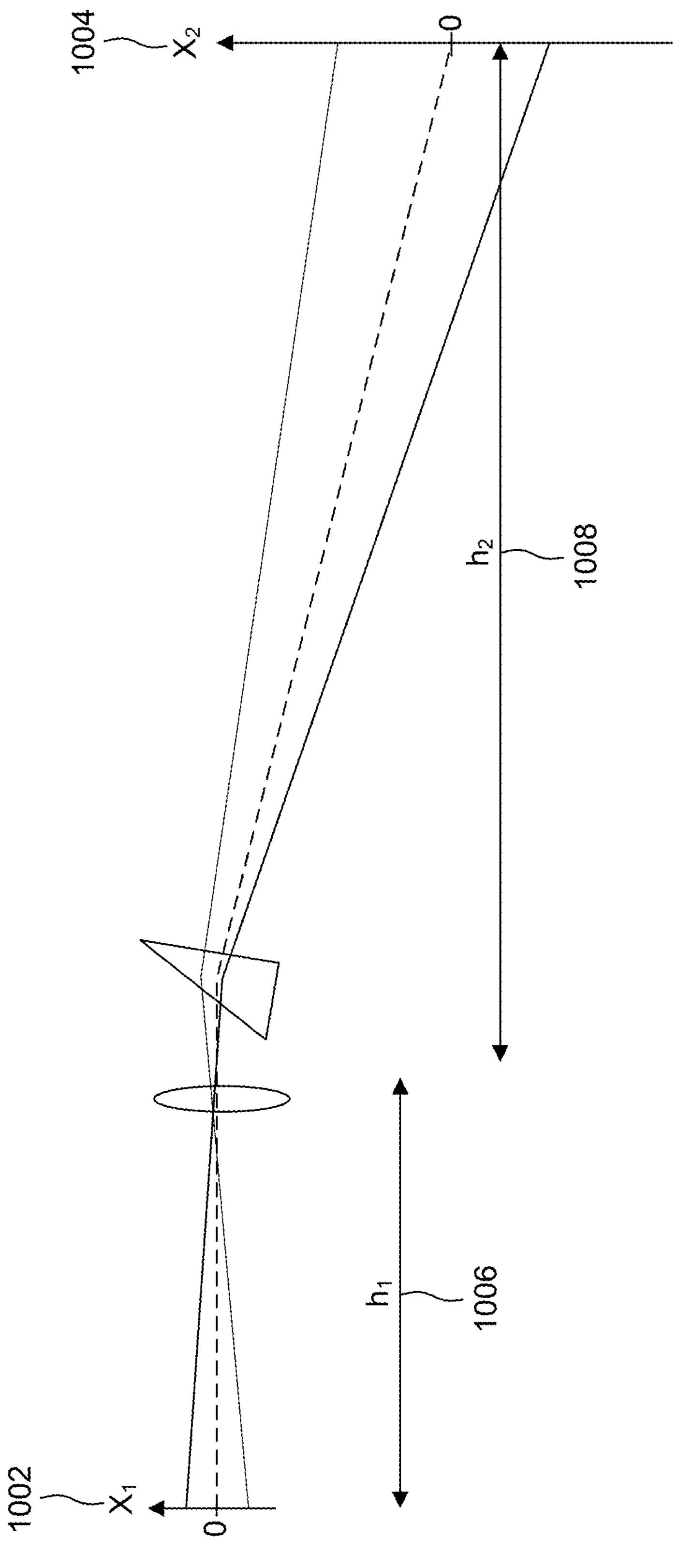
FIG. 10 is a schematic plan view illustrating an example correspondence between light emitting layer and viewing window locations according to some embodiments.

FIG. 10 is a schematic plan view illustrating an example correspondence between light emitting layer and viewing window locations according to some embodiments. A direct correspondence may be established between the locations on the light emitting layer and the viewing window. As depicted in FIG. 10, a bright emitter spot on the light emitting layer pictured on the left gets imaged to the corresponding spot on the viewing window pictured on the right, and vice versa. The light emitting layer location co-ordinate $x_1$ (1002) is approximately related to the viewing window location $x_2$ (1004) by Eq. 3:

$$h_1 x_2 \approx -h_2 x_1 \quad \text{Eq. 3}$$

Variable $h_1$ (1006) is the focal length. Variable $h_2$ (1008) is the viewing distance. This correspondence between light emitting layer location and viewing window location may be used to aim the LF image ray bundles.

For some embodiments, a 3D light field display includes an integral imaging optical system with narrow steerable light ray bundles. Within each ray bundle generating structure, one or more photodetector elements may be intertwined with the light emitting elements of the display. For some embodiments, an additional eye tracking system with a camera and a tracking beam generator may be used for detecting the viewer location and illuminating selected parts of the viewers face with a calibration spot or pattern. For some embodiments, photodetectors are integrated with the display to measure how much of the calibration spot light is reflected and imaged onto them. The tracking beam may scan multiple points to collect more data. Using the collected data, the true location where the ray bundles are aimed may be determined. This data may be used, e.g., to correct the aim of the LF image ray bundles and to calibrate, e.g., luminosity values.

A ray steering display with accurate aiming may produce very high angular resolution light fields, providing, for example, multiple views within the pupil of the eye. Such a high aiming accuracy may be difficult to achieve without active calibration, because the properties of many optical elements are susceptible to error sources such as misalignment in manufacturing and vibration and/or temperature changes when the display is in use. The active calibration method presented may compensate for these error sources and enable higher angular resolution to be achieved.

For some embodiments, a ray steering display may use ray bundles to create a high-resolution LF image. Each ray bundle contains a set of rays that show voxels for different view images. The beams inside one bundle may be very accurately aligned to each other with a small and accurately positioned emitter matrix. As the individual sources inside one matrix are imaged through the same projection cell optics with a single beam steering component, very high angular resolution may be achieved inside the bundles. Many other displays based on beam steering use single beam display projection cells, such as displays understood to be described in U.S. Pat. No. 9,207,459, U.S. Patent Application 2014/0035959, and journal article *Jungmok*.

An active calibration method may be used for lowering the manufacturing costs of a high quality 3D display. Because the calibration is performed during use, there is less individual device measurement and initial calibration during manufacturing. An active calibration method also allows looser tolerances in component assembly because the beams are steered actively and may be used to compensate for misalignments. For some embodiments, the steps involved in the described process are very fast, allowing display calibration in a time period undetectable to the viewer and allowing the device to be actively calibrated during use. Active calibration enables adjustment of the image for very good quality 3D viewing experience.

Figure 11:
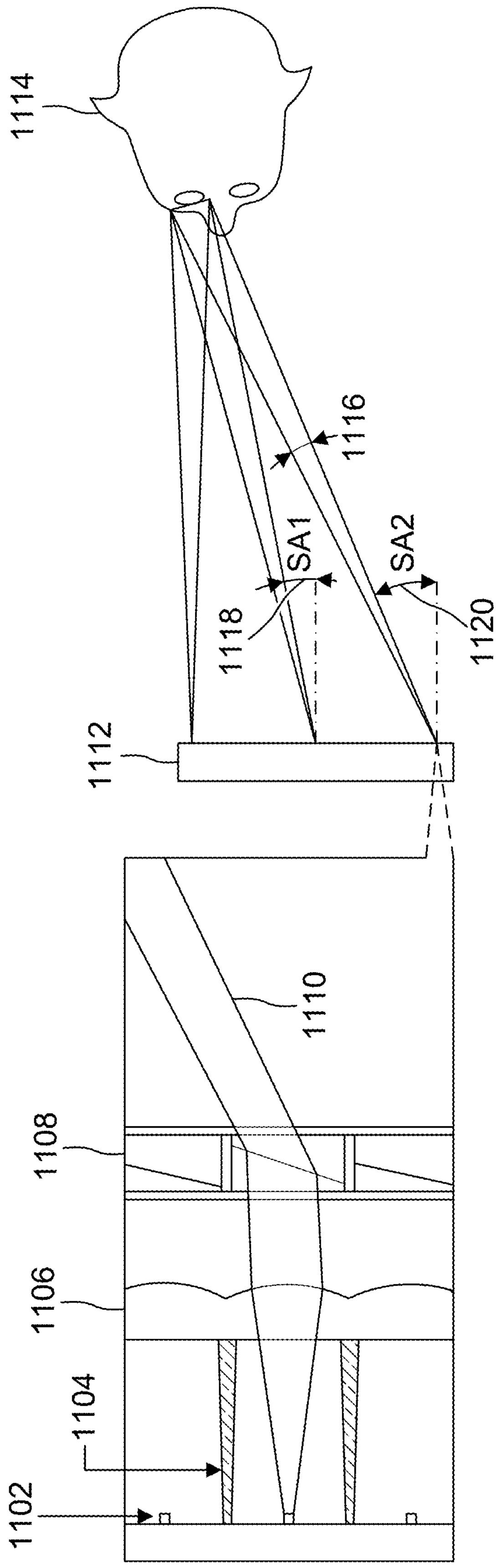
FIG. 11 is a schematic plan view illustrating an example light field imaging display with an example ray steering layer (RSL).

FIG. 11 is a schematic plan view illustrating an example light field imaging display with an example ray steering layer (RSL). Many beam steering LF displays are limited in angular and spatial resolution due to a single beam 1110 per pixel approach. Achieving high angular and spatial resolution with such systems uses dense arrays of light emitters per projector, producing multiple beams per each display projector cell. Such displays use tightly controlled and coordinated beam alignment with multiple views per eye pupil from different regions of the display and complex optical assemblies with tight tolerances. Additionally, traditional optical challenges with narrow, high-density beams require coordination within and across multiple projectors for alignment and illuminance level correction based on a specific viewer's eyes, such as distance and angle relative to the display surface.

Given a high enough angular resolution, a view steering system may place multiple views within the pupil of the viewer, giving the eye correct monocular focus cues. As an example, FIG. 11 depicts an integral imaging system with a very narrow FOV, equipped with an additional ray steering layer (RSL) 1108, which steers a set of collimated light beams towards the eye of a viewer 1114. One light emitter 1102 per cell may be separated by baffles 1104. A light beam may be emitted toward the beam collimator layer 1106 and a ray steering layer 1108 to generate an example single beam 1110. The beam bundles have a very narrow FOV, which means that the angular resolution may be very high and that the beam bundles (which may be a single wide beam 1116) are steered to the eyes of the viewer 1114 with different steering angles (SA) 1118, 1120 from different parts of the 3D LF display 1112. This kind of a system may steer the views with a very high accuracy, because even a slight change in the direction of the rays may cause the narrow angular domains to mix.

Figure 12:
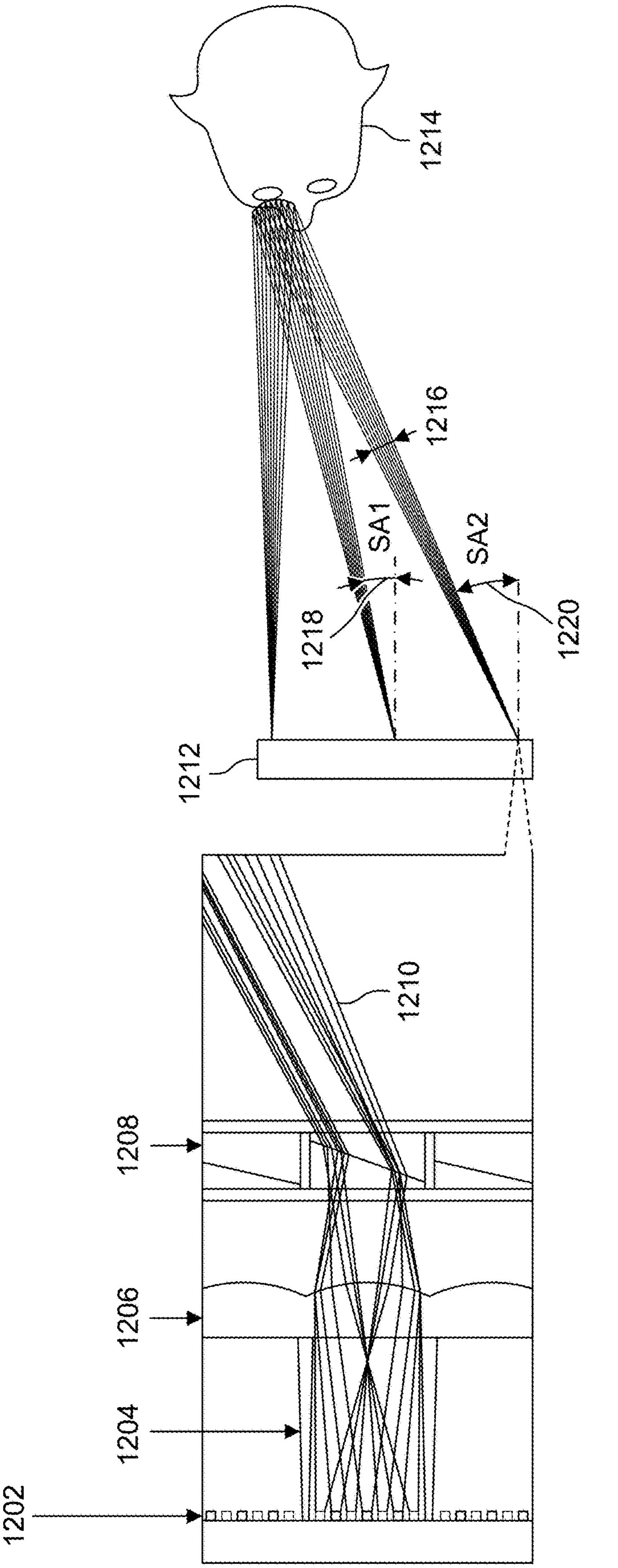
FIG. 12 is a schematic plan view illustrating an example light field display with another example ray steering layer (RSL) according to some embodiments.

FIG. 12 is a schematic plan view illustrating an example light field display with another example ray steering layer (RSL) according to some embodiments. FIG. 12 shows an example high angular resolution 3D LF display 1212 with beam bundle steering. For some embodiments, an array of light emitting elements 1202, such as, e.g., the example emitters (with seven shown for explanatory purposes in FIG. 12), emit light beams. The bundle of light beams is coarsely collimated by the baffles 1204. The coarsely collimated light beam bundle passes through the light beam collimator layer 1206 to be more finely collimated. The finely collimated light beam is steered by the ray steering layer 1208 to generate a steered beam bundle 1210. FIG. 12 shows example steering angles SA1 (1218) and SA2 (1220) for two respective example narrow beam bundles 1216 aimed at the eyes of the viewer 1214.

For some embodiments, an example apparatus may include a matrix of a plurality of projector cells. Each projector cell may include: a plurality of individually-addressable light emitting elements; a beam-steering element; and a collimating optical element positioned between one or more of the light-emitting elements and the beam-steering element. The plurality of light emitting elements and the beam-steering element may be configured to form a synchronous composite beam of light, the synchronous composite beam of light including light emitted from one or more of the plurality of light emitting elements of the projector cell, passing through the collimating optical element of the projector cell, and steered by the beam-steering element (such as a portion of the ray steering layer) of the projector cell. For some embodiments, the steering angle (such as the examples SA1 and SA2) may be adjusted by a portion of the ray steering layer. For some embodiments, the ray steering layer and associated portions of the apparatus may be configured to be calibrated continually using a calibration beam, such as using the process described in FIG. 17. For some embodiments, a device may include an optical structure, a processor, and a non-transitory computer-readable medium storing instructions that are operative, when executed by the processor, to perform, in cooperation with the optical structure, a portion of a process performed by the device. For some embodiments, a device may include: a plurality of individually-addressable light emitting elements; a beam-steering element; and a collimating optical element positioned between one or more of the light-emitting elements and the beam-steering element, wherein the plurality of light emitting elements and the beam-steering element may be configured to form a synchronous composite beam of light, the synchronous composite beam of light including light emitted from one or more of the plurality of light emitting elements, passing through the collimating optical element, and steered by the beam-steering element.

Figure 13:
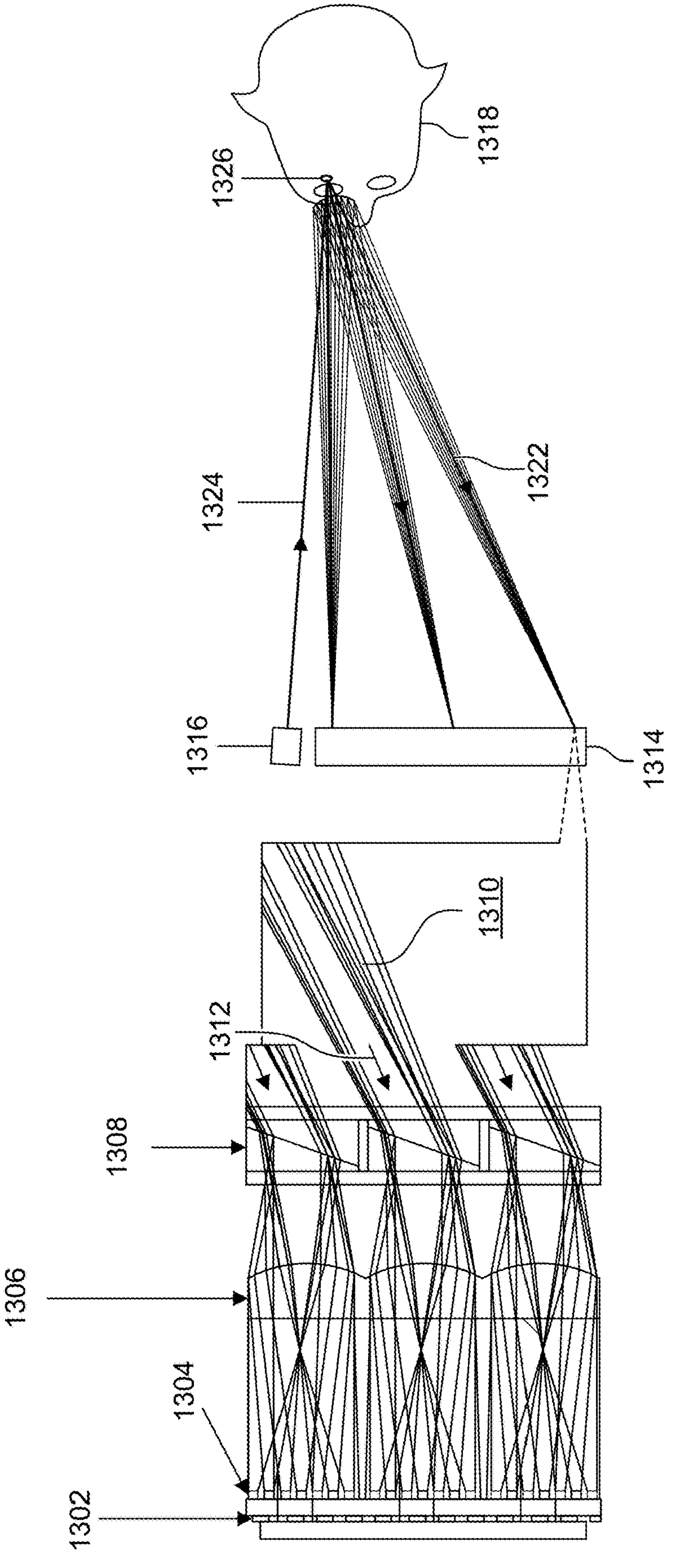
FIG. 13 is a schematic plan view illustrating an example calibration of a light field display according to some embodiments.
Figure 21A:
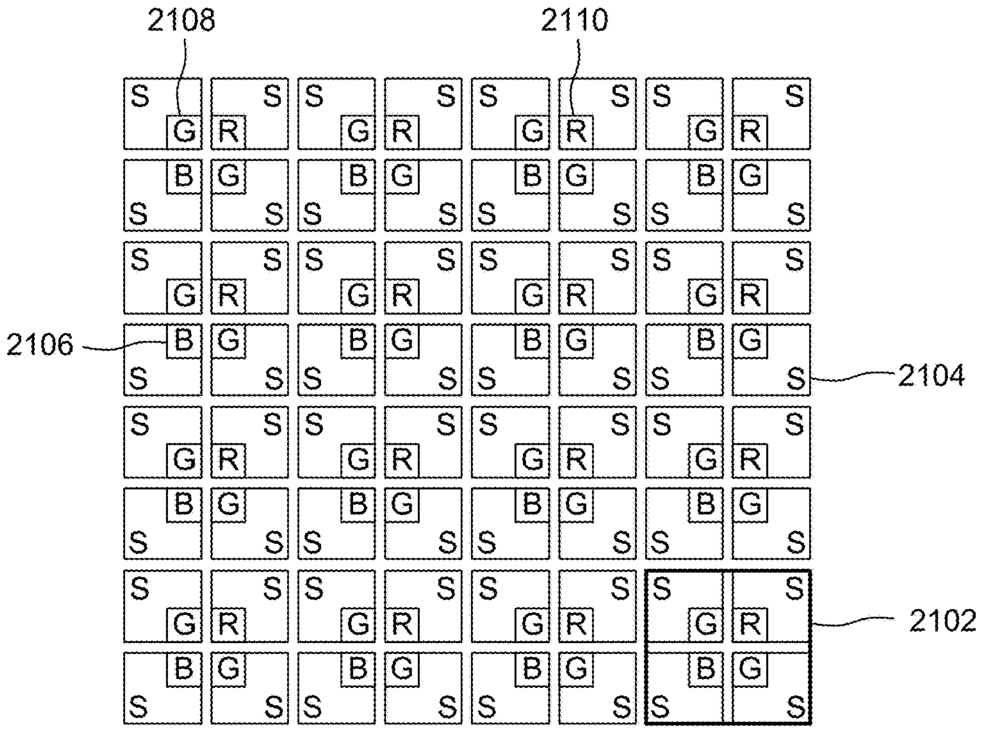
FIGS. 21A-21B are schematic front views illustrating example display emitter and sensor layouts according to some embodiments.
Figure 21B:
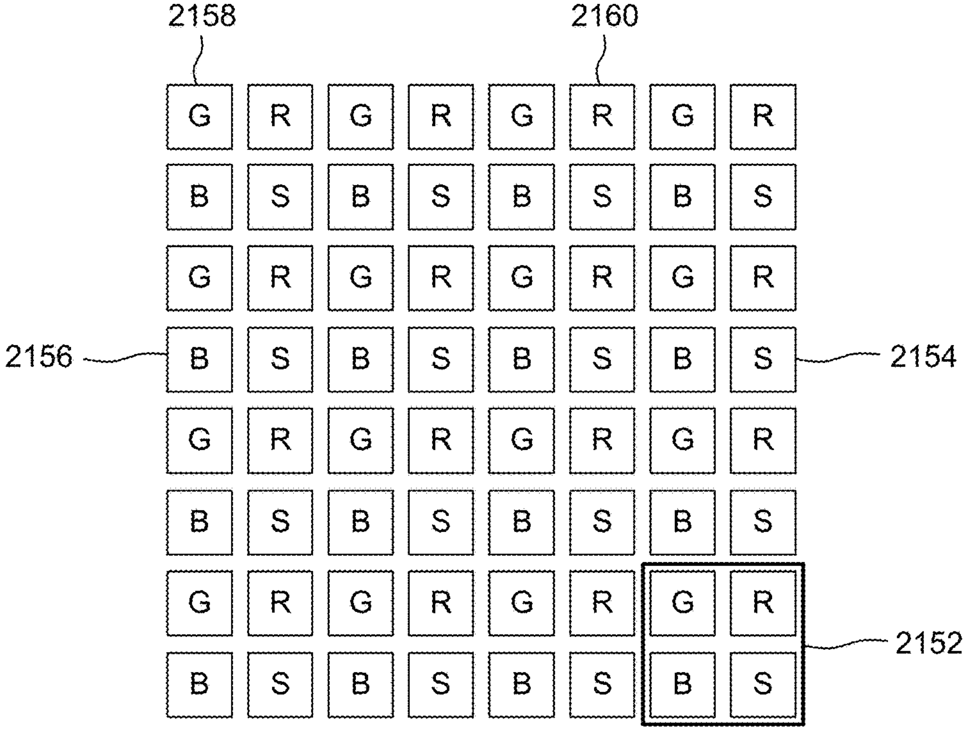

FIG. 13 is a schematic plan view illustrating an example calibration of a light field display according to some embodiments. FIG. 13 shows, for some embodiments, use of an integrated and continually-calibrated display/optics system that projects a calibration pattern and analyzes the received calibration pattern images using the same optical paths as the LF image projection of the 3D LF display 1314 and system. For some embodiments, a tracking module or process 1316 (which may include, for example, one or more light emitting elements 1304, one or more image sensors (such as image detectors), one or more computer processors, and one or more software functions used to control projecting light with the light emitting elements 1304, reading image sensor data from the image sensors, and processing the sensor data) may generate a tracking beam 1324 which creates a calibration spot 1326 on the viewer 1318. The calibration spot 1326 reflects off the viewer as a reflected calibration beam (or signal) 1312, 1322. The reflected calibration beams 1312, 1322 may follow the same path as LF image beam bundles 1310 projected by the array of light emitter elements 1304. The light emitters emit light beams that are collimated by the beam collimator layer 1306 and steered by the ray steering layer 1308 to project LF image beam bundles at the viewer 1318. The reflected calibration beams 1312, 1322 may be detected by light sensors 1302 that are distributed in a diverse pattern with the light emitter elements 1304. FIGS. 21A and 21B describe some example distribution patterns of the light sensors. Measurements of the reflected calibration beams, such as color, angle, location, focal depth, and intensity, may be made using the light sensors 1302.

For some embodiments, the light display structure may execute a process that includes generating a plurality of beams or sub-beams of light via coordinated spatial-temporal altering of control inputs to a light emitting element array and to a controllable ray steering layer based on at least one of color, angle, focal depth, and intensity of a rendered image. For some embodiments, the array of one or more light emitter elements may be used to generate the plurality of beams or sub-beams of light. For some embodiments, the measurements of the reflected calibration beams may be used to adjust the color, angle, focal depth, and/or intensity of projected light beams, which may be used to render an image. For some embodiments, a light image display structure includes a plurality of beam-steering elements corresponding to respective light emitting elements. For some embodiments, control inputs to a light emitting element array and to a ray steering array may be altered such that the altering of the control inputs is coordinated to cause spatial-temporal altering of at least one of color, angle, focal depth, or intensity of a rendered image.

Figure 14:
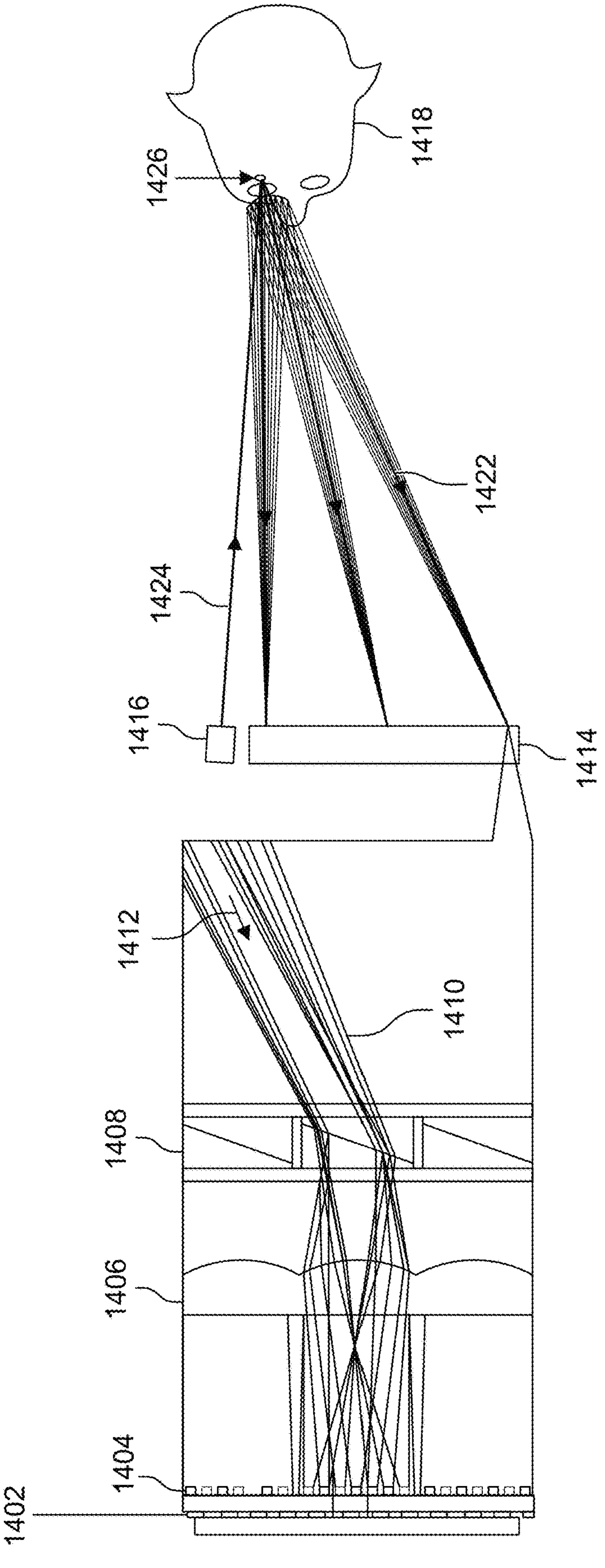
FIG. 14 is a schematic plan view illustrating an example calibration of a light field display according to some embodiments.

FIG. 14 is a schematic plan view illustrating an example calibration method of a light field display according to some embodiments. FIG. 14 shows an example apparatus for aiming ray bundles and calibrating a display 1414. The light emitting layer has example pixels that have capabilities of both light emitters 1404 and light sensors 1402. Light beams are emitted by light emitters 1404, collimated by a beam collimator layer 1406, and steered by a ray steering layer 1408 to generate an LF image beam bundle 1410. An eye tracking structure may be used to determine the location of the viewer 1418. A well-collimated tracking light beam 1424 generated by a tracking module 1416 is used to illuminate a small calibration spot 1426 on the viewer facial area. For some embodiments, the calibration spot 1426 may be a common spot imaged onto the viewer 1418 and reflected towards the light emitting and sensing layer for each of the ray generators. The location of the reflected spot 1426 may be determined, such as by extracting measurements from reflected image data. Depending on where the calibration spot 1426 is placed on the viewer 1418 and where the projected LF image beam bundles are aimed, an optimal location for the calibration spot 1418 on the light emitting and sensing layer may be calculated. This optimal location may be compared with the actual detected location based on measurements of reflected calibration signals 1412, 1422, and a correction may be applied by the ray steering layer 1408 to decrease this difference. The projected LF image luminosity values also may be calibrated based on the reflected calibration spot signal 1422, and corrections may be made to handle small errors caused by optical component imperfections.

For some embodiments, at least one of the beam-steering elements (such as a portion of the ray steering layer) is configured to steer simultaneously a plurality of light beams (which may be a light field image beam bundle). For some embodiments, a tracking process may be configured to generate a tracking beam used for adjusting image display parameters. The tracking process may be used to perform part of a calibration method described above. For some embodiments, an LF display structure may include: a plurality of display pixels; a plurality of beam-steering elements; a collimating layer including one or more collimating elements positioned between one of the light-emitting elements and one of the beam-steering elements; and a tracking beam process configured to generate a calibration tracking beam spot. For some embodiments, an LF display structure may include: a matrix of projector cells, each including a controllable light emitting element array configured to generate a light beam including a plurality of sub-beams; and an optical element stack, that may include: a collimating optical layer; and a controllable ray steering layer configured to change a projection angle of a passed light beam. For some embodiments, an LF display structure may generate a plurality of sub-beams via coordinated spatial-temporal altering of control inputs to the light emitting element array and to the controllable ray steering layer based on at least one of color, angle, focal depth, and intensity of a rendered image. For some embodiments, an LF display structure may include a matrix of projector cells. Each projector cell may include a controllable light emitting element array configured to generate a light beam; and an optical element stack that includes: a collimating optical layer; and a controllable ray steering layer configured to change a projection angle of a passed light beam.

For some embodiments, a projector cell may include: a plurality of individually-addressable light emitting elements; a beam-steering element; and a collimating optical element positioned between one or more of the light-emitting elements and the beam-steering element, wherein the plurality of light emitting elements and the beam-steering element are configured to form a synchronous composite beam of light, the synchronous composite beam of light including light emitted from one or more of the plurality of light emitting elements, passing through the collimating optical element, and steered by the beam-steering element. For some embodiments, a light field display structure may include a matrix of one or more projector cells. For some embodiments, the beam-steering element may be a part of an array of beam-steering elements, such as a ray steering layer. For some embodiments, a device may include an optical structure, a processor, and a non-transitory computer-readable medium storing instructions that are operative, when executed by the processor, to perform, in cooperation with the optical structure, a portion of a process performed by the device. For some embodiments, a device may include: a plurality of display pixels; a beam collimator layer; a plurality of beam-steering elements; a tracking beam generator configured to generate a tracking beam; and a plurality of sensors configured to detect a reflection of the tracking beam.

Figure 15:
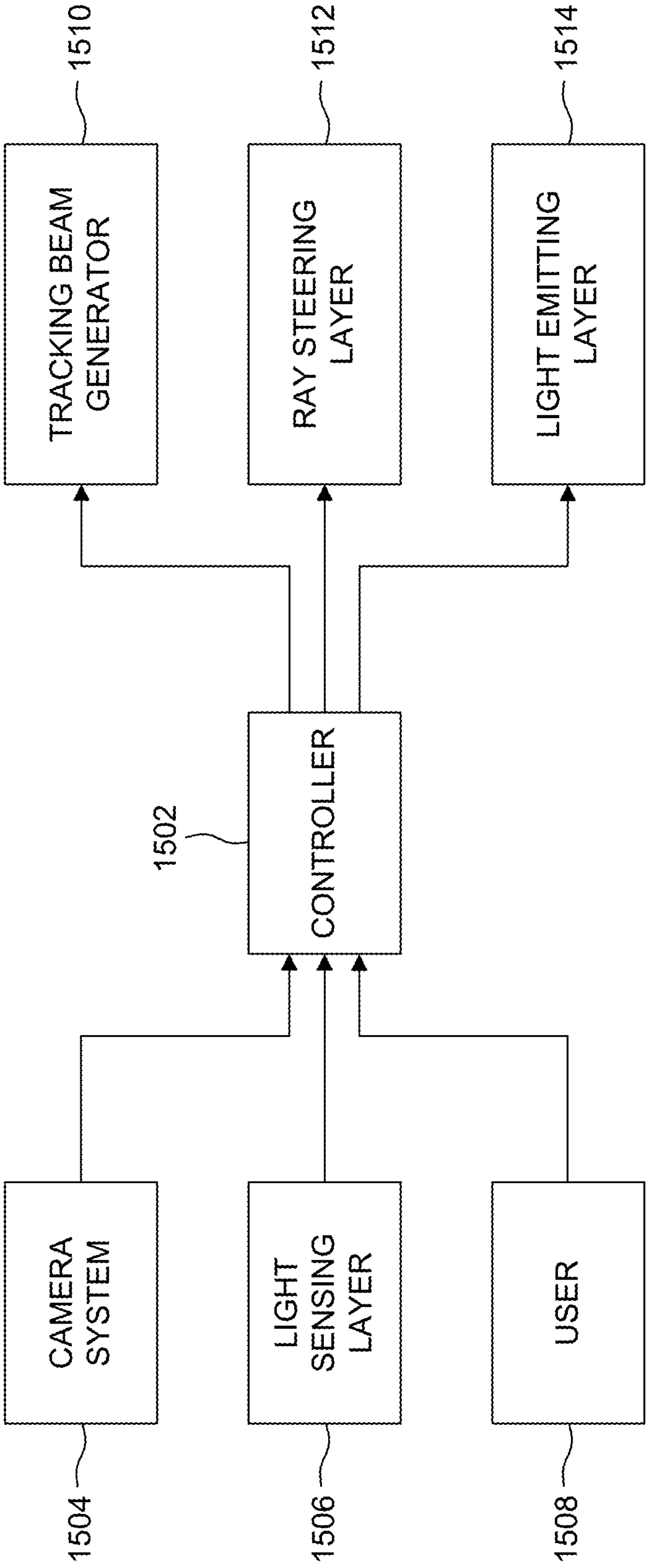
FIG. 15 is an interface diagram illustrating an example light field display system according to some embodiments.

FIG. 15 is an interface diagram illustrating an example light field display system according to some embodiments. For some embodiments, a controller 1502 of a light field display structure is shown in FIG. 15. The controller 1502 is connected to the subcomponents of the display and to the user 1508 of the display. For some embodiments, the user 1508 may include one or more processes that control output display settings and images displayed. For some embodiments, the user 1508 may include a computer application (such as a laptop or smart phone application), and the controller 1502 may include one or more processors configured to execute one or more functions and processes. For some embodiments, the controller 1502 receives imaging input data from an eye tracking camera system (which may include a camera system 1504). The light sensing layer 1506 (which may include an array of light sensors) may send input signals (which may include data that indicates, e.g., color, angle, focal length, and intensity) to the controller 1502. The user application may send user inputs (such as preferences regarding the input light field image to be rendered) to the controller 1502. For some embodiments, the controller unit 1502 outputs control signals to control the tracking/calibration beam generator 1510, the ray steering layer (RSL) 1512, and the light emitting layer (LEL) 1514.

For some embodiments, a sensor may be configured to track eye position of a viewer. Such a sensor may be part of the tracking beam generator 1510. For some embodiments, an eye tracking process may be configured to track eye positions of a viewer (user 1508). The eye tracking process may include software functions that interface with light emitting elements and imaging sensors and/or light detectors. For some embodiments, the intensity level of a light field image may be adjusted using image correction parameters (which may be determined, e.g., from the light sensing layer input signals). For some embodiments, a light field display structure may include: a tracking beam generator 1510 configured to generate a tracking beam; and a viewer illumination level sensor configured to sense an illumination level of a viewer such that at least one of the controllable light emitting element arrays is configured to alter an intensity of the light beam generated based on the illumination level sensed during an active period for a respective projector cell. For some embodiments, a camera system 1504 may include an eye tracking sensor. For some embodiments, an eye tracking sensor may be a camera.

Figure 16:
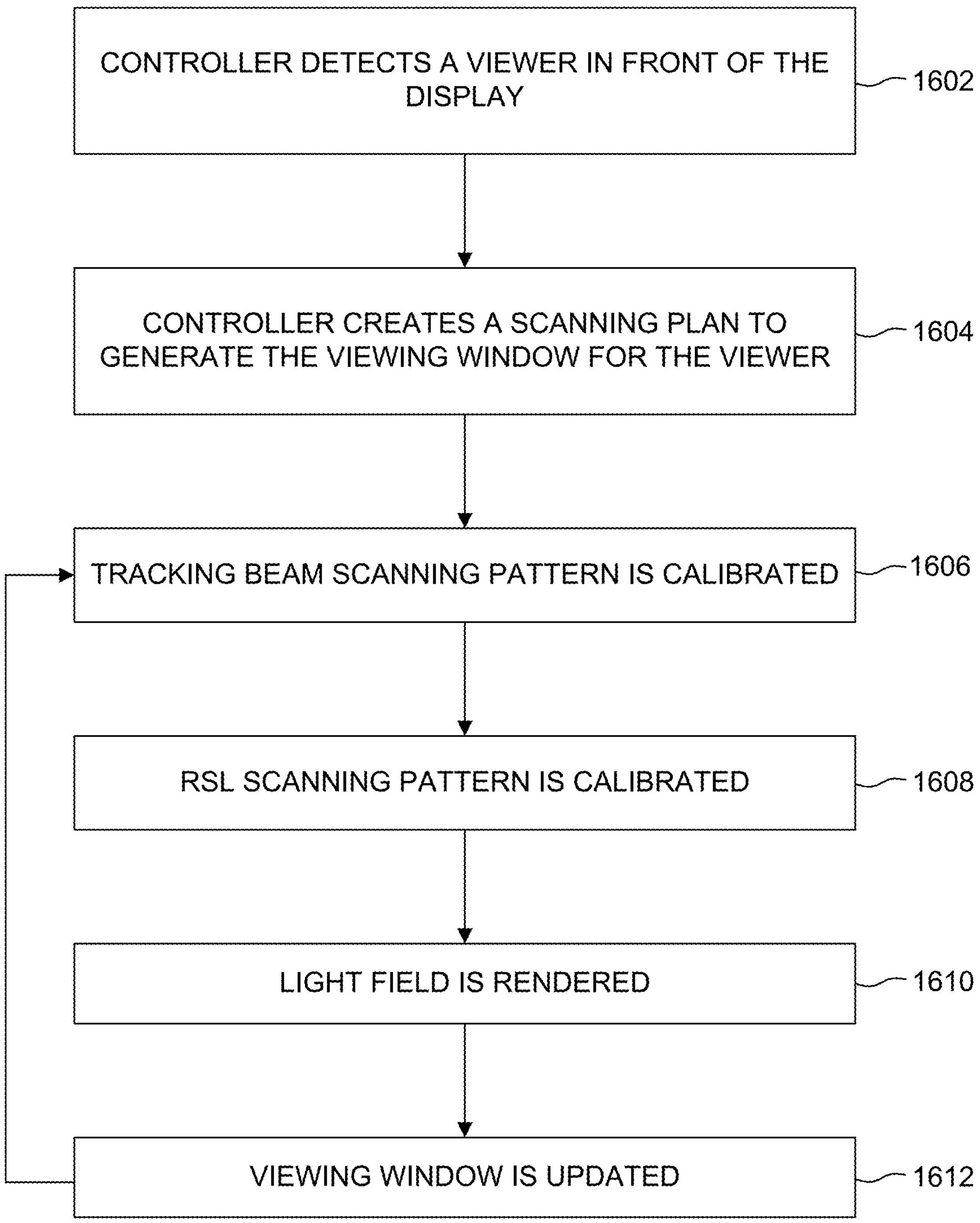
FIG. 16 is a flowchart illustrating an example display controller process cycle according to some embodiments.

FIG. 16 is a flowchart illustrating an example display controller process cycle according to some embodiments. For some embodiments, a calibration method may include detecting 1602 a viewer in front of the light field display (such as by detecting an image of a viewer from image data generated by a tracking camera system). For some embodiments, the calibration method may include creating 1604 a scanning plan to generate a viewing window for the viewer. For some embodiments, the scanning plan may include a scanning pattern that indicates how the beam steering directions change for a display cycle. The scanning plan may indicate how each beam steering element, including the tracking beam generator steering system, changes for the display cycle.

For some embodiments, the scanning plan may include an initial set of values for the scanning pattern signals that approximately generate a desired scanning pattern. These scanning pattern signals may indicate, for example in the case of electrowetting prisms, the voltage of the electrodes in the electrowetting cell. The initial values may be based on, for example, a theoretical model of the function of the steering element. For some embodiments, the scanning patterns are a steering direction given at periodic time intervals or time frames. Within each time frame, the steering direction may be constant for some embodiments. The total time taken by the scanning may be small enough such that the viewer's visual system sees the averaged light field due to persistence of vision.

For some embodiments, a tracking beam scanning pattern may be calibrated 1606. The display controller process cycle may include calibrating 1608 the ray steering layer (RSL) scanning pattern. The display controller process cycle may include rendering 1610 the light field and updating 1612 the viewing window. For some embodiments, the display controller process cycle may repeat continually, cycling back to calibrating the tracking beam scanning pattern and continuing.

For some embodiments, the ray steering layer may be configured to be calibrated using a calibration beam imaged through display optics of the apparatus and recorded by light sensor elements. The calibration beam may reflect off the viewer and follow a path similar to light beams projected by the array of light emitter elements. For some embodiments, the light field display structure may include: a tracking process configured to track viewer movement adjustments; and a light image display structure configured to display a light field image using the viewer movement adjustments. Viewer movements may be tracked by tracking movements of a reflected calibration beam for some embodiments.

For some embodiments, an example scanning pattern total work cycle time may be set to 16 μs, and the work cycle may be divided into four time frames, each having a length of 4 μs. Of course, other times may be used. During the first time frame, the tracking beam may be aimed to a spot above the right eye of the viewer, and the beam steering in the ray steering layer (RSL) targets the right eye. For the second frame, the tracking beam may be aimed below the right eye, and the RSL may stay in the same position as the first frame. During the third time frame, the tracking beam may be aimed above the left eye of the viewer, and the RSL targets the left eye. During the fourth time frame, the tracking beam may be moved to a spot below the left eye, and the RSL may be aimed at the left eye. This scanning pattern enables the RSL to generate viewing windows in front of both eyes, and the tracking beam generator may provide two calibration spots for both generated viewing windows.

For some embodiments, after the controller has created a scanning plan, the display structure may perform repeatedly multiple scanning plan tasks. These scanning plan tasks may include calibrating the tracking beam scanning pattern, calibrating the RSL scanning patterns, rendering the light field, and updating the viewing window. For some embodiments, these tasks may be omitted from a work cycle, for example, if no misalignment is detected or if the display structure determines to retain the status quo, e.g., if the viewer has not moved and/or the LF image shown is a still image. These scanning plan tasks may be done in any order, any number of times, and may be done in parallel for some embodiments.

Calibrating the scanning pattern of the tracking beam generator may be used to detect, measure, and/or correct an error with the display tracking beam generator itself, for example if the beam generator is misaligned due to mechanical stress or an impact imparted to the display. This task, for example, may be done every time the display boots, or may be done at regular intervals during the use of the display. For some embodiments, the controller sends the tracking beam generator a signal according to the steering plan and records the resulting scanning pattern from the data provided by the tracking camera system. The resulting scanning pattern may be compared with the desired scanning pattern, and a correction may be applied to the signal to calibrate the scanning pattern.

Calibrating the RSL scanning pattern may be repeated and may include each of the ray steering elements in the RSL or a portion of the ray steering elements. To calibrate the RSL scanning pattern, the light emitters in the light emitting layer (LEL) may be turned off if the tracking beam is in the visible light range and there is a risk that the display light sensing layer (LSL) may be flooded with stray light from the image forming beams. For some embodiments, if the tracking beam is made with near-infrared (NIR) light and LSL elements have bandpass filters that block the visible light, the LEL may remain active. The controller sends to the RSL the scanning plan signals indicated in the scanning plan, and the tracking beam generator detects, using the LSL, the locations where the calibration spots are projected on the LSL. In some embodiments, the controller calculates the locations where the calibration spots may be projected optimally if the scanning plan is executed perfectly. The optimal location may be compared with the actual locations, and to minimize this error, a correction may be applied to the signal sent to the RSL.

To render the light field, the controller may retrieve light field image data from the user. For some embodiments, the controller unit may calculate color and/or intensity value for each light emitting element in the LEL during each time frame. For each time frame and light emitting element, the direction in which light is expected to be emitted for the respective element is determined. This direction may be the direction indicated in the scanning plan, or the direction may be a corrected direction if there is data available about the actual steering directions of the RSL. The desired light field may be sampled to determine the color and/or intensity value for the expected emission directions. For each time frame, a color and/or intensity value may be determined. The display may send the scanning signal to the RSL, and the display structure may modulate the LEL emission using the calculated data. The viewer may see the rendered light field image.

To update the viewing window, the controller unit may determine the location of the viewer and may update the scanning plan to cover the new viewing window. The controller may adjust the scanning signals similar to before, or the controller may use accumulated data from previous calibration runs to generate a more accurate initial value set. Previous calibration data may be accurate enough if the viewing window has not shifted much and calibration corrections are not much different from the previous calculation case.

Figure 17:
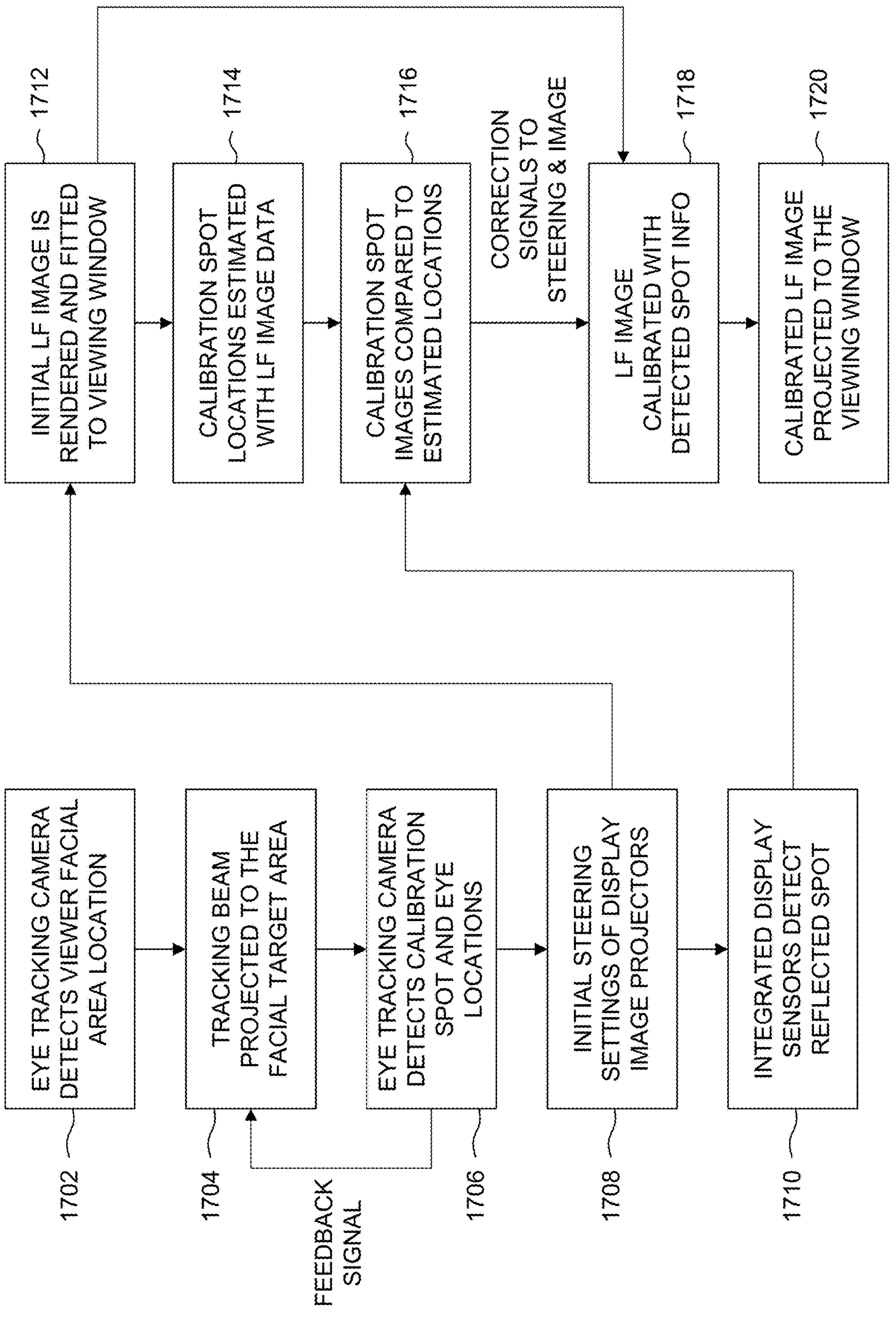
FIG. 17 is a flowchart illustrating another example process for calibration according to some embodiments.

FIG. 17 is a flowchart illustrating another example process for calibration according to some embodiments. For some embodiments, an example calibration process may be used to handle a low density of sensor elements per projector cell. A calibration process may be used with, e.g., color filtering, measurement of a calibration spot size, and/or measurement of intensity levels, to reduce the amount of environmental noise filtering. For some embodiments, the location of the calibration spot may be adjusted to be visible by each projector cell at any point in time.

FIG. 17 illustrates a flowchart for an example LF display calibration process. For some embodiments, the eye tracking camera may detect 1702 a viewer location and control the tracking process to project 1704 two tracking beams to one or more facial target areas (such as above each eye), which may be predetermined. The camera may detect 1706 the actual spot locations with respect to the viewer's eyes, and a correction (or feedback) signal may be sent to the tracking beam projector. This feedback loop ensures that the calibration spot stays in the correct location with respect to the viewer's eyes if the viewer moves. If rough viewer eye locations have been detected 1706, initial settings for the display beam steering components for each beam projector cell may be made 1708. An initial light field image may be rendered and fitted 1712 to the viewing window around the eyes (such as the viewing window shown in FIG. 9). Ideal calibration spot image locations and irradiance values for each ray generator cell may be calculated with respect to the initial LF image. For some embodiments, calibration spot sensors integrated into each beam projection cell may detect 1710 the actual reflected spot locations and irradiance values. For some embodiments, calibration spot locations may be estimated 1714 with LF image data. These two datasets (e.g., actual vs. estimated reflected calibration spot location; or actual vs. "ideal" reflected calibration spot location for some embodiments) may be compared 1716, and correction signal matrices may be calculated for both ray steering and LF image calibration for each beam projection unit in the display. For some embodiments, an LF image (e.g., received LF image data) may be calibrated 1718 with detected spot information. If the LF image is calibrated, the LF image may be projected 1720 to the viewing window with corrected steering parameters for each projector cell, such as by activating and adjusting the corrected emitter pixels. For some embodiments, the tracking and display subsystems may be run in parallel as separate processes in which the tracking subsystem sends update signals to the display subsystem without intermitting the image rendering and projection process.

For some embodiments, a calibration process may include detecting an eye location of the viewer, wherein estimating the location of a reflected calibration spot may be based on the detected eye location of the viewer. For some embodiments, comparison of the estimated location and the actual location of the calibration spot reflected off the viewer may include determining a calibration spatial offset between the estimated location and the actual location of the calibration spot reflected off the viewer, and rendering a light field image may include adjusting a location for the light field image to be displayed using the calibration spatial offset.

For some embodiments, determining the viewing window of the viewer may adjust a location of the viewing window using the calibration spatial offset. For some embodiments, a calibration process may include: determining a relative position of an eye of a first user; projecting a calibration beam to intercept within a projection area of the first user, the projection area including an area capable of being targeted and detected by each projector cell of a display apparatus; receiving, as a reflected calibration image, the calibration beam reflected, for each projector cell, through a respective optical path used for display illumination; measuring, for each projector cell, a spatial offset of the received calibration image; and responsive to the measured spatial offset of the received calibration image for each projector cell, making a calibration adjustment to a respective projection angle for the respective projector cell. For some embodiments, a light field display structure may be configured to be calibrated using a calibration beam projected on a face of a viewer in coordination with movement of an eye location of the viewer relative to a display of the light field display structure.

For some embodiments, the calibration method may use a tracking beam that may be detected from outside the display. Integrated display sensor pixels inside the individual projector cells may be detected from outside with a microscope because the detector surfaces may be visible through transparent beam steering elements. For some embodiments, several active optoelectronic modules used by the light field display structure may be assembled together and synchronized. Because the calibration method allows calibration of individual display projection cells during use, mechanical tolerances on modules fitted together may be larger.

For some embodiments, determining image correction parameter may include: determining a spatial offset between the estimated location and the actual location of a beam spot reflected off the viewer; and altering a steering angle of a ray steering element by an angular amount corresponding to the spatial offset. The beam spot reflected off the viewer may be a calibration beam projected on the face of the viewer and reflected off the viewer.

Figure 18:
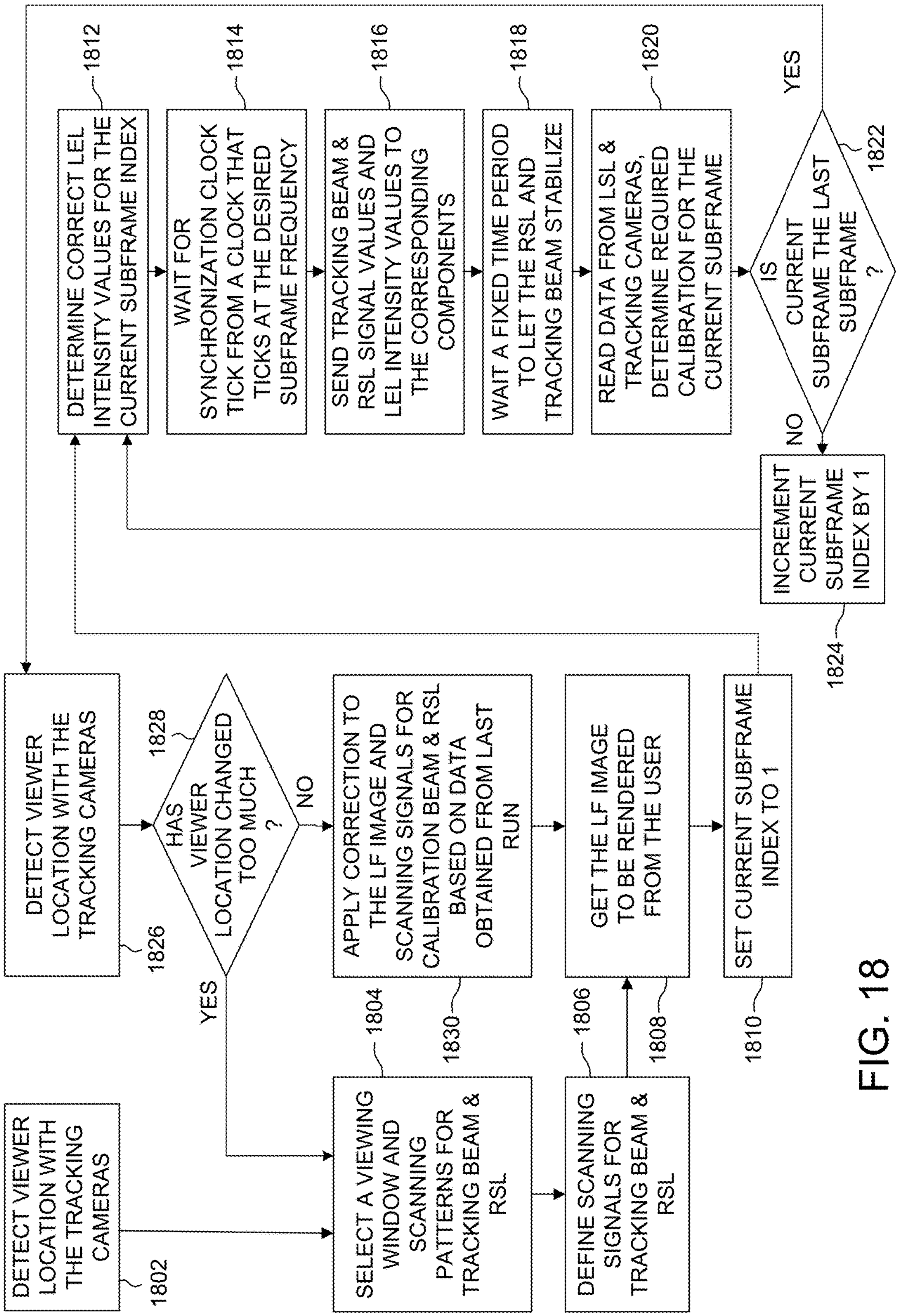
FIG. 18 is a flowchart illustrating a further example process for calibration according to some embodiments.

FIG. 18 is a flowchart illustrating a further example process for calibration according to some embodiments. For some embodiments, a calibration process may be performed for a ray steering display that uses a time-varying light field. The display updates the light field at a periodic rate called the frame frequency. An interval between these updates will be called a frame. Each frame is divided into multiple smaller time periods, called subframes. Each subframe is of equal length. For some embodiments, at the start of each subframe, the display updates, for example, the steering direction of the ray steering elements in the ray steering layer (RSL), the calibration spot location, and the emissivity of the light emitters in the light emitting layer (LEL). For some embodiments, the total length of each subframe is set considerably longer than the time the ray steering elements take to stabilize, so the display spends most of the subframe in a stable state. For some embodiments, infrared beams (such as NIR light beams) are used for calibration.

An example calibration process may use data provided by the tracking camera system to determine or detect 1802 the location of the viewer. The process selects 1804 a viewing window area around the viewer's eyes, and creates 1806 a steering plan for the RSL (e.g., by determining scanning signals for tracking the beam and RSL). By modulating the LEL, a light field may be generated that is visible by the viewer looking through the viewing window.

For some embodiments, the steering plan includes a scanning pattern and scanning signals. The scanning pattern may include steering directions for the steering elements in RSL for each subframe, along with the steering directions for the tracking beam generator. The scanning signals may include signals that may be used to generate scanning patterns for the RSL and the tracking beam generator. For some embodiments, the scanning signals are approximations of signals that may be used to produce the correct scanning patterns for both the RSL and the tracking beam generator.

For some embodiments, the display obtains 1808 a target light field to be projected from the user, which is, e.g., a LF image rendering engine. The display may execute an iteration loop, which iterates over all the subframes. For some embodiments, for the first cycle of the iteration loop, the current subframe index is set 1810 to 1. During each cycle of the iteration loop, the display determines 1812 the correct light emissivity values for the light emitting elements associated with a particular subframe. For each subframe, a portion of the light field generated by the light emitting elements associated with the subframe may be sampled to determine if the light emissivity for the associated light emitting elements is correct. For some embodiments, upon completing the sampling, the display structure waits 1814 for a synchronization clock "tick" (which may be a periodic pulse signal that generates a pulse at the subframe frequency).

After receiving a synchronization clock "tick", the display may send 1816 signals specified in the steering plan to the RSL and the tracking beam generator. The display also may set the light emissivity values for each light emitter associated with the subframe. The display waits 1818 a small stabilization time to let the RSL and the tracking beam generator to stabilize, after which the display measures 1820 and records the incident infrared light intensity values for the light sensitive elements of the LSL and determines the amount of calibration to be used for the signal sent to the RSL. The display also may determine, based on image data from the camera system, if the calibration spot is in the correct position. After completing the tasks associated with a particular subframe, the display starts preparing for the next subframe by comparing 1822 the current subframe with the last subframe index value. If the current subframe is not the last subframe, the current subframe index is incremented 1824 by 1 and the iteration loop repeats. Otherwise, viewer location is detected 1826 with the tracking cameras. The amount of viewer location change is determined 1828. If the viewer location has changed too much (e.g., the viewer location change exceeds a threshold), a viewing window and scanning patterns for the tracking beam and RSL are selected 1804. Otherwise, a correction is applied 1830 to the LF image and scanning signals for the calibration beam and RSL based on data obtained from the last run, and the LF image to be rendered is obtained 1808 from the user.

After the display has iterated over all the subframes, the tracking cameras detect viewer location again, and the data is compared to the previously detected location. If the location has changed so much that the viewing window is no longer over the eyes, if the calibration spot is at a bad location, or if the calibration spot is moved more than a threshold value away from the optimal location, the process may start over to determine a viewing window and scanning patterns for the tracking beam and the RSL and to determine scanning signals for the tracking beam and the RSL. If the viewer location has remained nearly the same, the display may apply corrections to the tracking beam and RSL signals, based on the data obtained during the previous scanning.

For some embodiments, a light field display structure may perform a process that includes: illuminating the viewer with an illumination beam during an active period for a projector cell; detecting the illumination beam during the active period for the projector cell; generating, with the projector cell, a light beam at an intensity level; and adjusting the intensity level based on the detected illumination beam. For some embodiments, projecting a calibration spot, estimating a location of the reflected calibration spot, detecting the actual location of the reflected calibration spot, and determining image correction parameters may be performed for a subframe corresponding to a light emitting device.

For some embodiments, adjusting the intensity level of a light beam projected by a light emitting element may include: determining an intensity level of a detected reflection of an illumination beam illuminated on a viewer; determining an intensity level offset between the intensity level of the detected reflection of the illumination beam and the intensity level of the illumination beam illuminated on the viewer; and adjusting, by an amount proportional to the intensity level offset, the intensity level of the light beam projected by the light emitting element. For some embodiments, a controllable light emitting element array may be configured to alter the intensity level of the light beam generated by an amount proportional to the intensity level detected during an active period for the respective projector cell corresponding to the controllable light emitting element array.

Figure 19:
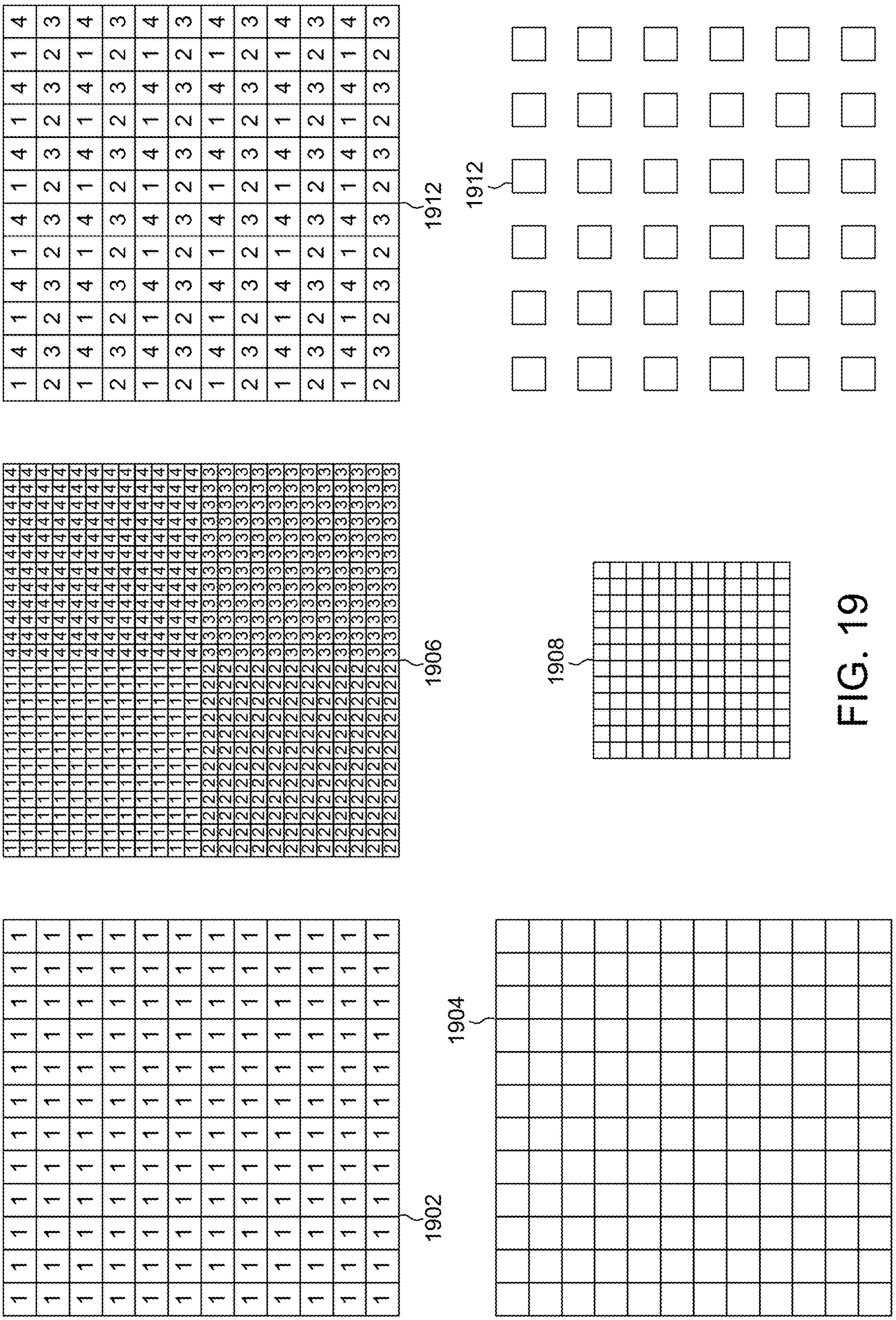
FIG. 19 is an illustration showing example light emitter patterns that may be used to scan a viewing window according to some embodiments.

FIG. 19 is an illustration showing an example light emitter patterns that may be used to scan a viewing window according to some embodiments. For some embodiments, each pixel in the light emitting and sensing layer has one or more light emitting elements. Having more light emitting elements allows a larger area of the viewing window to be covered and/or allows a denser sampling of the viewing window in one cycle. If the entire viewing window cannot be covered in one cycle, time multiplexing of the RSL may be used to increase coverage, which may use a fast RSL. The viewing window may be, for example, a rectangle or round shape in front of the viewers face or eyes. The viewing window also may include two separate areas which are each placed in front of the eyes of the viewer. If multiple viewers are present, the viewing window may include even more separate areas.

Some example viewing window scanning patterns are shown in FIG. 19. In the left example pattern, no time-multiplexed frames are used, and the viewing window 1902 corresponds directly to the light emitter pattern 1904. In the center example pattern, time-multiplexed frames are used to scan a viewing window 1906 four times larger than the light emitter pattern 1908 and four times larger than scanning using a single frame. The center example pattern 1908 shows scanning of four frames, which each include a quadrant of the viewing window 1906. For example, the first frame (indicated with "1") may be the upper left quadrant, the second frame (indicated with "2") may be the lower left quadrant, the third frame (indicated with "3") may be the lower right quadrant, and the fourth frame (indicated with "4") may be the upper right quadrant. In the right example pattern of FIG. 19, time-multiplexed frames are used to increase the sampling density of the viewing window 1912 by interlacing. FIG. 19 shows an example checkerboard interlacing pattern that divides the viewing window 1910 into 4 frames of checkerboard patterns. Other patterns may be used for some embodiments. For some embodiments of one extreme, time multiplexing may use only one light emitter in each ray bundle generator, which would scan all the points in the viewing window. For some embodiments of another extreme, no time multiplexing is used at all.

Figure 20:
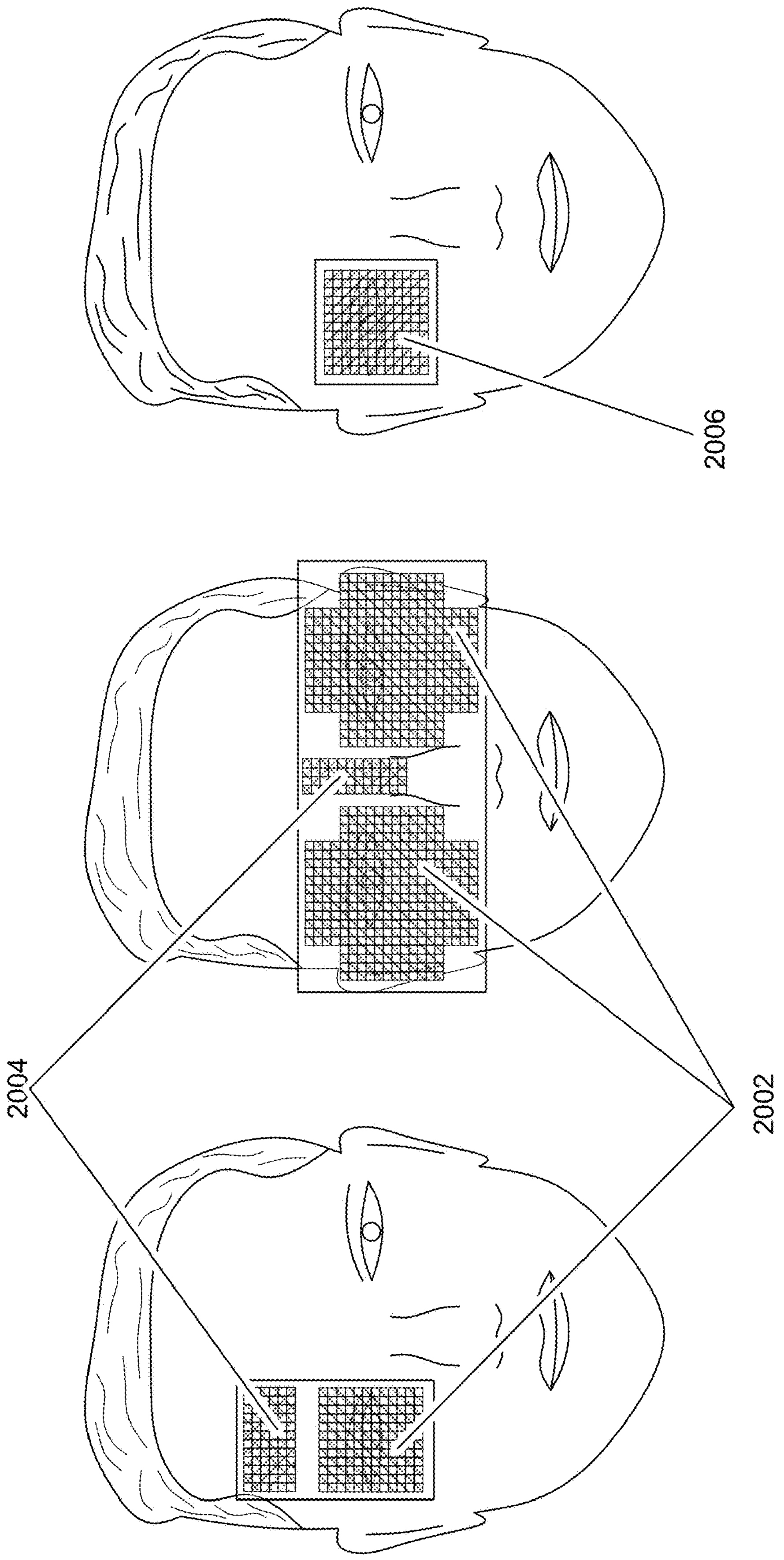
FIG. 20 is a schematic front view illustrating example light emitter and sensor patterns projected on a face according to some embodiments.

FIG. 20 is a schematic front view illustrating example light emitter and sensor patterns projected on a face according to some embodiments. For some embodiments, the light emitting and sensing layer (among many disclosed examples see, e.g., FIGS. 13 and 14, and, e.g., FIGS. 21A-21B, 23A-23B below) uses one or more light sensing elements 2004 for calibration. These light sensing elements 2004 may be located at the same locations as the light emitting elements 2002 or in different locations close to the emitters 2002. While the RSL is active, all the elements at the back of the ray bundle generator may be projected onto the viewers face, as depicted in FIG. 20, which shows a few exemplary layouts of light sensor and light emitter projections. The left and center faces show light emitters 2002 and light sensors 2004 in separate areas of the face. The right face shows combined light emitters and sensors 2006. The emitters are projected to where the targeted viewing window is, while the light sensors are projected to the area where the tracking beam is directed. Good target areas on the face for the calibration spot are flat and protruding features of the face, such as the bridge of the nose or forehead. Shallow places or places which are not visible from all locations from the display are less optimal. If all the light sensors are projected to areas which may not be always visible (e.g., FIG. 20, right), the tracking beam may be targeted to different time multiplexed locations so that at least one calibration spot is visible for all ray bundle generators at all times. Multiple time-multiplexed calibration spots also may be used to reduce the number of light sensors. Reflected illumination levels sensed by the calibration sensors may be used to adjust luminance levels of the display emitters.

FIGS. 21A-21B are schematic front views illustrating example display emitter and sensor layouts according to some embodiments. An example physical implementation of the light emitting and sensing layer may have a semi-transparent μLED display on top of a light sensor array as pictured in FIG. 21A. For some embodiments, the small area μLEDs (e.g., blue 2106, green 2108, and red 2110) may be bonded to a transparent substrate foil with transparent ITO electrodes and wiring. A second, non-transparent structure layer, with somewhat larger area matrix of photodiodes or CMOS sensors 2104 may be located behind the light emitting layer. This light sensing layer may be exposed to light reflected back from the tracking beam and transmitted through the μLED layer spaces between the emitter components. For some embodiments, a full color and sensing pixel 2102 may include the 4 μLED and 4 sensor pattern shown. For some embodiments, the 4 μLEDs in the pixel may be blue, green, red, and white μLEDs.

For some embodiments, an array of printed OLEDs (e.g., blue 2156, green 2158, and red 2160) with interlaced organic sensing elements 2154 as shown in FIG. 21B. For some embodiments, the full color emitting and sensing pixels 2152 may be attached to the same substrate or a transparent substrate foil may be used for the emitters, and the sensing elements may be placed behind the emitters on a second substrate layer. Both of the layers may be flexible, which may allow, e.g., a curved display of structures.

In both integrated emitter-sensor cases, the light sensors may be coated with bandpass filters that allow only narrow spectral ranges to pass to the detector. These filters may be used as blocking filters to block stray light if the calibration spot has a narrow spectral range (e.g., using a laser diode), and light emitted from the display sources may be absorbed by the filter coatings.

Co-located/interlaced LF image creating emitters and calibration sensors use the same optical paths. For some embodiments, the array of illuminators/sensors may be aligned with a beam steering optical path. This example of a "projector cell" according to some embodiments may illuminate the viewing window with a single steering prism angle setting.

For some embodiments, a light field display structure may include a matrix of display pixels, such that each of the matrix of display pixels includes at least one individually-addressable light emitting element and an illumination sensor configured to detect illumination levels of reflected light beams. For some embodiments, each display pixel may include: one or more light emitting elements and one or more light detectors.

The ray steering layer (RSL) deflects the incoming light rays towards selected directions. The RSL may work bidirectionally for the example calibration methods, meaning that the light follows the same path if its direction was reversed. This bidirectionality condition should apply for most beam steering methods, at least to some extent. Of the many methods included in, e.g., McManamon that are used for beam steering, liquid crystal prisms, micromirrors, and lenslet array steering may be used for some embodiments. Also, phased array methods or electrically controllable polarization gratings, such as liquid crystal polarization gratings (LCPG:s) may be used for some embodiments. Micro mirrors also may be used in deflecting light beams transmissively by using two mirrors as understood to be shown in U.S. Patent Application 2014/0035959. Using reflective elements has the added benefit of no color dispersion.

Some embodiments may use electrowetting prisms for the ray steering layer. Journal article Jungmok shows that arrays of EW prisms may be produced with high accuracy. Electrowetting prisms exhibit fast switching speeds of less than 1 ms according to Y. Takai, et al., *Electrowetting Fresnel lenticular*, Proc. of the IEEE Int'l Conf. on Micro Electro Mechanical Systems (MEMS) (2012) ("Takai"), allowing time multiplexing. Electrowetting prisms also may include adaptable focus according to Soraya Terrab, et al., *Adaptive Electrowetting Lens-Prism Element;* 23:20 Optics Express 25838-845, (2015), so the collimating layer may be combined with the RSL. This approach may allow optimization of focus by using the calibration spots. The prism array may be designed to match with the collimating lenses, or may extend over multiple lenses for some embodiments.

If the selected steering method cannot produce large enough angular dynamic range in order to cover the needed area over the two eyes and some head movement tolerance, a static steering element, such as a lens, a Fresnel lens, or a tiled array of prisms may be used to apply a fixed steering geometry. This is needed especially in the case where a relatively large display is viewed at close range and the projection directions at the edge of the display will need to be steered towards the center axis in order to overlap the correct views from all parts of the display surface. Another example technique to overlap the views is to make the display curved with radius designed to a specific viewing distance. If the selected ray steering method cannot steer beams continuously, but instead in steps, it may not be possible to get the ray bundle in the exact position that is desired. In that case, the image data may be shifted instead to match the detected location of the ray bundle.

A tracking beam generator process may be used to detect the viewer and to generate a beam or beams of light that are directed to selected locations on the face. Such a method may be used to generate bright spots of light that are used for calibration. For example, the face detection system may have a stereoscopic camera pair whose image data is processed to detect the viewer. Light from a separate light beam generator may be directed to a selected spot on the viewer's face, with the tracking camera being used in the aiming for some embodiments. The camera may be able to detect the viewer location in all three dimensions for some embodiments. Depth resolution may be the same order as what is the sampling resolution of the projected image beams in the viewing window. As the projected beam bundles from different parts of the display surface will need to overlap exactly at the viewer eye pupils, the viewing window may be positioned at the correct depth location and a relatively high resolution depth measurement may be used.

The tracking beam generator may produce multiple beams or a single beam may scan multiple locations. For some embodiments, there may be more than one beam generator, which may create a common calibration spot by crossing the beams at the viewer target area distance. In this case, the separation between two spots may be used to determine the viewer distance. Furthermore, the generated tracking beams may be astigmatic of otherwise optimized to change shape with distance, in which case they may be used for further viewer distance measurement by imaging the reflected spots with adequate accuracy for spot shape detection, even with a single camera. The tracking beam(s) may be generated, e.g., with a generator that has a polymer or glass lens placed at a focal distance from an LED, laser diode (LD), μLED, or OLED emitter(s). If a matrix of emitters is used, beam scanning actions may be done without any mechanical movement by activating one or some of the components in the matrix that produce the correct beam direction(s). For some embodiments, mechanical or electromechanical micromirrors may be used for the scanning action or electrowetting microprisms.

Both the tracking beam projection process and display LF beam bundle projection cells may have optics that have specific optical magnification ratios that determine the projected beam (tracking and image) spot sizes at a certain distance. Because both beam types may be well collimated, both magnification ratios may change linearly with the distance from the viewer and their respective ratios may remain the same. In other words, the tracking beam spot increases in size with distance, but so does the magnification of the display projection cell, and the end result is that the imaged calibration spot size remains the same at the integrated sensor array and only intensity is changed. The calibration spot may have fairly sharp edges at all distances, but that characteristic may exist with small sources and well-collimated beams because the beams image the source spatial distribution to the optical far-field as angular distribution. However, if the spot image size on the calibration sensor stays the same, a relative calibration measurement comparing the current and previous situations may be adequate even with, e.g., a Gaussian spot that looks "blurred" as long as the beam intensity profile is scaled linearly with the distance.

Aspheric imaging lens optics may be used for making well-collimated beams from an array of small emitters as described below. For some embodiments, a different optical beam steering system, such as an electrowetting prism, may be used with more than one collimating lens. For some embodiments, a tracking beam focus adjustment, for example, may be added. The benefit in calibration spot image quality may be balanced with the added technical complexity. Spatial resolution of the sensor array integrated in the display projector cells may not be very high and therefore also the requirements for calibration spot are not that high. One calibration spot image may fall on at least three sensor pixels on the single display projection cell in order to be able to see the exact location of the calibration spot in relation to the to the intended viewing window.

In accordance with some embodiments, there may be some practical limitations on how far the viewer may be from the display as determined by the ray steering layer accuracy and image beam spot sizes. As the distance gets larger, for example, the single beams in the beam bundle may not be able to cover the eye pupil properly and image resolution may start to decrease. This means that, in accordance with some example embodiments, there may be a certain range of distances for the viewer where image resolution may be higher than other distances. The tracking beam generator has more freedom in design (e.g., a larger aperture size and focal length) than the display projector cells and they may be designed to have better performance than the display beam projectors with simple optical components that are just bigger. The viewer tracking camera system also may have much better spatial resolution than the sensor array built into the display projector cells making it possible to fine-adjust the calibration spot location and fine facial features for, e.g., user recognition. However, if very fine sensor pixel patterns may be made to the projector cells, the integrated sensor array may be used for good quality imaging with, e.g., super-resolution techniques. For some embodiments, the display projector array may be considered as a large array of low spatial resolution cameras, in which images from the same viewing window area may be combined and a higher resolution image may be obtained. An integrated display sensor array may be used for, e.g., user recognition because an integrated display sensor array functions like a low spatial resolution with very high angular resolution light field camera and the camera may detect recognizable fine features in the angular domain even if the spatial domain is not adequate.

If the ambient illumination makes it difficult to detect the calibration spot, a pulsed operation of the beam generator may be used so that the ambient illumination may be separated from the calibration spot signal. For some embodiments, a very narrow spectral range source, like laser diode (LD), may be used for beam generation. For some embodiments, the display sensor array may be coated with narrow bandpass filter material selected for a specific wavelength. This filtering method may increase the signal to noise ratio considerably. The source also may be in the near-infrared (NIR) region, in which case the calibration spot would not be visible to the naked eye, and spectral bands between tracking beam and LF image beams may be separated.

An often important determinant of achievable light field quality is the width and angular spread of the light beams emitted from the display. For some embodiments, the integral imaging display may have light emitters that are placed at a focal distance away from beam collimating microlenses. Within the FOV of the display, the produced light field may have a number of 4D domains such that the luminance may be determined by a specific pixel. Because the light emitting layer is at the focal length of the projector lens, the domains are in the xyθϕ-parameterization of the light field as a 4D-rectangle. These domains correspond to the beams of light that the display produces. The pixel width, along with the distance from lens to light emitting layer, determine the angular spread of the light rays. The spatial width of the beam at the display surface is solely determined by the lens aperture width. At further distances from the display, the beam width is also determined by the angular spread coming from the emitter size and projection lens focal length. By tuning these geometrical and optical parameters, the desired discretization of the light field may be selected, with some density of angular domains and spatial domains.

Light field sampling may be limited by the size of the light emitting elements. Light field sampling may be limited due to wave properties of light, because if the microlenses are made too small, there may be additional angular spreading of the light, causing the intensity of the discretized domains to get mixed, reducing contrast. This causes the maximum quality of light field achievable by such a display to have an upper theoretical limit. However, this theoretical limit may be quite high, far surpassing the capabilities of integral imaging displays. For example, a display may have a viewing distance of 1 m and a submillimeter sampling in both the display plane and viewing window.

Mixing between the angular domains caused by diffraction may be reduced by reducing the beam intensity at the edges of the beam. An example intensity profile may be a Gaussian shape, which may be generated for some embodiments by adding a static intensity modulating layer, with spatially varying transmittance, to the collimating layer. One example of such a component is the zone plate, which is commonly located with the imaging lens aperture and has concentric rings with varying transmittance of width. Since the collimating layer essentially modulates the phase of light, together they form a kind of a phase and amplitude modulation layer. The purpose of the amplitude modulation layer may be to improve the contrast of the light field.

Refractive optical components have color dispersion, which means that they refract different wavelengths of light by different amounts. This may cause problems for a display that targets a very high angular resolution. For example, in the collimating layer, some wavelengths may be focused too strongly, while other wavelengths are not focused enough. This may cause angular spreading and contrast loss. Since the power of the focusing microlenses may be relatively low, this angular spreading may be considered small compared to the size of the angular domains. Therefore, the dispersion in the collimating layer is unlikely to be a problem. The RSL however, for some embodiments, may refract the beams of light very strongly, and therefore is more vulnerable to dispersion. Even if the light emitters have a relatively narrow spectrum, the beam may be angularly spread in the steering direction. In order to mitigate the color dispersion problem, the RSL may be designed to have low dispersion by e.g. integrating a diffractive structure to the steering layer that compensates for the color dispersion in the refractive material. It is also possible to use light emitters that have a very narrow spectrum, such as laser diodes or use additional narrow-band spectral filters in front of the emitters.

For some embodiments, a color display may use light emitters of different colors. Even if the differently colored light emitters themselves have a spectrum that is narrow enough, the different colors may be refracted by different amounts. For some embodiments, the RSL may have a very low dispersion. For some embodiments, different colors may be steered separately with either spatial or temporal multiplexing. In spatial multiplexing, the differently colored emitters may be placed into different ray bundle generators. In temporal multiplexing, the differently colored emitters may be activated at different times, allowing the RSL to adapt the steering for each color separately. For some embodiments, an ordered matrix of red, green and blue components may enable use of time delay constants for emitter activation because the steering element scans through the angular range. For some embodiments, rendered image data may be displaced slightly depending on the color channel. The locations of the differently colored viewing windows may be different, but a fully colored image may be visible wherever the viewing windows would overlap.

For some embodiments of a color display, each of the different colors may use a separate calibration signal that matches the color. For some embodiments, refraction direction data for one color may be used to calculate refraction directions for other colors, and one calibration signal may be enough. The tracking beam may have a slightly higher wavelength than the red image beams. For some embodiments, the calibration signal may be in the near-infrared region and may be undetectable with the naked eye. Because the beam wavelength may be close to the image beam wavelength, the optical components of the projector cell may have the same optical functionality and calibration for steering angles, and rendering an image may be performed with high accuracy.

The light emitters are supposed to only send light towards the collimator directly in front of them. If the light emitters send light to other directions, this light may exit through adjacent collimators, generating unwanted stray light, which may be a problem. If the display does not use time multiplexing, the stray light may not be a problem, because all of the light that exits through the wrong collimators may be directed to areas outside of the viewing window. If time multiplexing is used for RSL direction switching, the stray light may cause problems because the stray light may hit the viewing window. Also, there may be some other non-ideal behavior that causes the stray light to enter the viewing window. For example, if light enters the RSL at large angles, the light may be reflected in an unintended way.

For some embodiments, stray light may be blocked by placing light absorbing baffles between the ray bundle generators. For some embodiments, these baffles may be collectively formed by having a block of black material with holes drilled in it, with the hole locations corresponding to the ray bundle generator. For some embodiments, multiple stacked black sheets may be used, generating better light trapping properties. For some embodiments, an interference filter that blocks light depending on incidence angle may be used. For some embodiments, light emitters that emit most of the light in the desired direction may be used.

If the distance between the light emitter layer and collimating layer is large, the total amount of intended light exiting the display may be very low if compared with the amount of stray light. For example, if the collimator lens is square shaped with 0.5 mm edge, and the distance between the light emitter layer and collimating layer is 2 cm, the solid angle covered is 0.0125 radians. If the light emitters send light evenly over the entire front hemisphere, only 0.01% of the light is emitted towards the desired direction. This percentage may seem like a very small amount, but because there is a large distance between the light emitter layer and the collimating layer, there is a very small angular FOV, and the light is very effectively directed towards the viewer. Effectively, the brightness detected by the viewer is therefore not lowered but stays constant when the distance between the two layers is varied. A ray steering display may therefore appear as bright as any other integral imaging display. However, there is a possible discrepancy between the amount of stray light and the amount of desired light.

If the width of the beams of light are made very narrow, each ray bundle generator may be made to direct only one beam of light towards the pupil of the viewer. If this aiming may be done with extreme accuracy and speed, it may be possible to only illuminate the center point of the entrance pupil of the eye, thus eliminating all depth cues based on focus accommodation and retinal blur. This would cause (incorrectly) the image to always be in focus on the retina but would still eliminate VAC. Additionally, because the focusing depth of the viewer may be detected with eye tracking methods such as, e.g., according to Duchowski, Andrew; *Eye Tracking Methodology: Theory and Practice, 3rd edition* (2017), the blur may be rendered directly to the image data.

This method may require extremely fast ray steering to keep the beam fixed at the center of the pupil. However, some EW prisms have speeds on the order of 1 ms, according to Takai, which is less than the timespan of saccades of the eye. The actual image rendering may have more delay, because the change of the viewpoint (pupil middle point) associated with saccades is very small.

Discretization of the viewing window may be made with a sampling interval smaller than the pupil size, so that multiple discretization points fall within each pupil. Due to the finite width of the beams of light, the same luminance distribution will be visible over a small area around the discretization point. Usually, this luminance distribution is incorrect for points other than the discretization point, unless the viewed virtual object is at infinite distance from the viewer. Because these wrong light rays may cause incorrect blurring effects, it might be better to eliminate them completely. This may be done by using glasses with multiple pinholes in them. The surface of the glasses is made to match the viewing window, and the pinholes are made to match the sampling points of the viewing window. Therefore, only the "correct" light rays are let through, effectively making the objects close to the viewer appear sharper.

Active shutter goggles, with a transmission controlling spatial light modulator (SLM), such as a liquid crystal SLM may be used to increase the sampling resolution of the viewing window. If no shutter glasses are used, the width of the light beams at the viewing window define the maximum resolution of the viewing window. By selectively blocking parts of the light field the sampling resolution of viewing window may be increased.

If the light emitting layer is formed of continuous 2D-array of emitters, it may be possible to extend the viewing window by omitting the baffles and instead placing an additional SLM to the collimating layer. Since the baffles are omitted, light from the emitters that are not directly below a single collimator (e.g., a microlens), may be allowed to emit light through that collimator. This causes the ray bundle generator to send light rays to a larger field of angles. The SLM may be used to block unwanted light rays; sequentially all the collimator apertures are made transparent, while the neighboring collimator apertures are opaque.

Figure 22B:
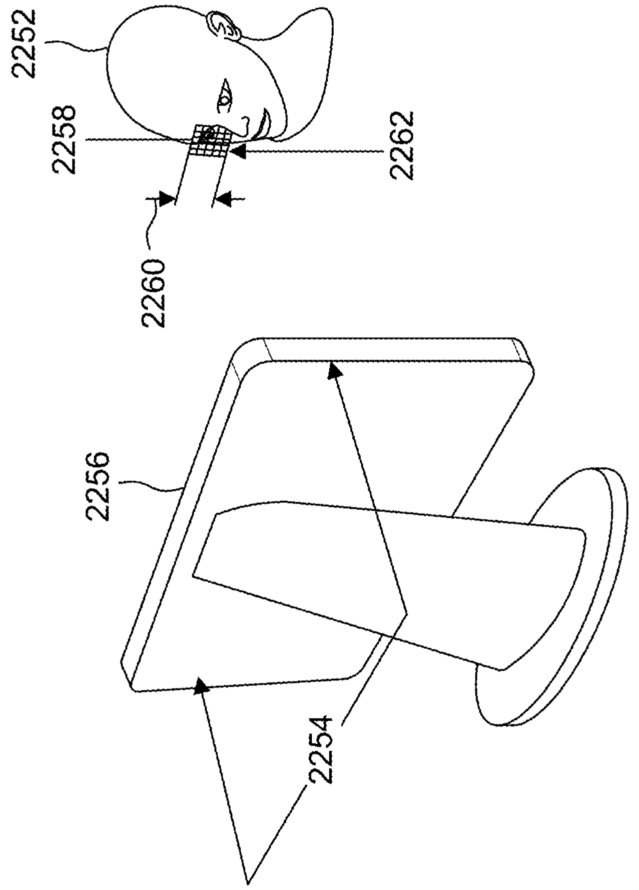
FIGS. 22A-22B are schematic illustrations showing example beam scanning LF display geometries according to some embodiments.
Figure 22A:
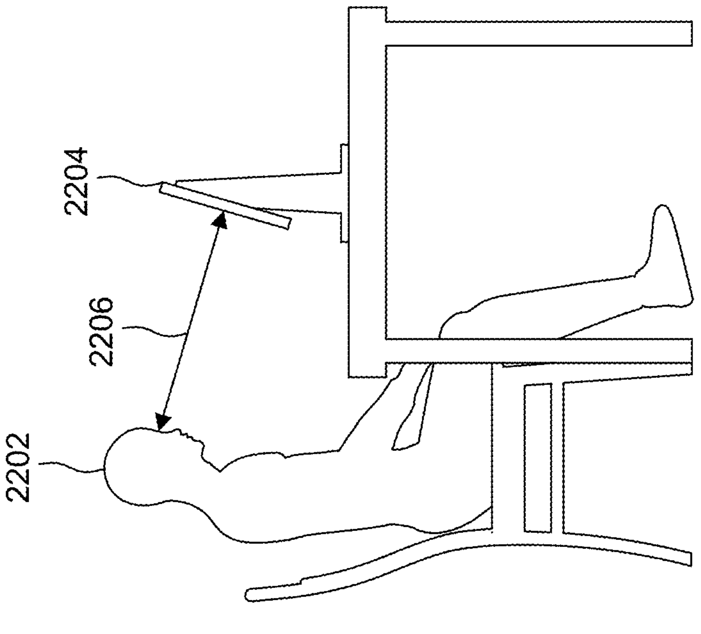

FIGS. 22A-22B are schematic illustrations showing example beam scanning LF display geometries according to some embodiments. An example display system utilizing an example viewing geometry (for explanatory purposes) for a calibration method is shown for some embodiments. A 26" (e.g., 324 mm by 576 mm) desktop 3D display 2204 generates a light field image for a single viewer 2202 positioned at a viewing distance 2206 of, e.g., 600 mm. FIG. 22B shows an integrated tracking module 2254 (or process for some embodiments) that includes a stereo camera and beam projector for some embodiments. The viewing window size 2260 is, e.g., 60 mm×60 mm, and the viewing window 2262 may be scanned by both eyes of the viewer 2252. The example beam steering structure is built into the display structure. The steering system is able to scan the viewing window 2262 by, e.g., +10° in both horizontal and vertical directions to track the beam spot 2258, which means that the viewer eyes may be positioned inside an area of, e.g., 270 mm×270 mm at the viewing distance from the (e.g., 26") LF display 2256. The viewing area may be considered adequate for a single viewer, allowing head and eye movements. An eye tracking system with a stereo camera pair and tracking beam projector may be used to detects the viewer eye locations.

Figure 23A:
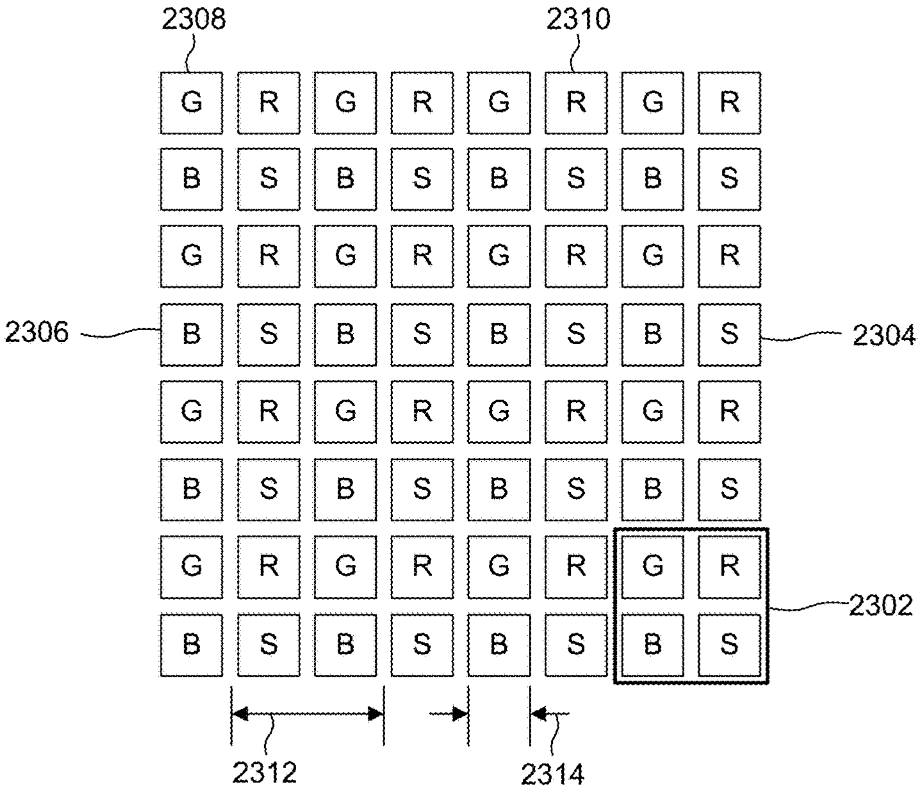
FIG. 23A is a schematic front view illustrating an example display emitter and sensor layout according to some embodiments.

FIG. 23A is a schematic front view illustrating an example display emitter and sensor layout according to some embodiments. FIG. 23A shows an example light emitting and sensing structure layout for some embodiments. A full-color emitter pixel 2302 may include three separate OLED pixels that each have a size 2314 of, e.g., 6 μm×6 μm and that may be printed to a transparent polymer substrate foil with 8 μm pitch. A full-color emitter pixel 2302 may have a pitch 2312 of, e.g., 16 μm. There may be one red (R) 2310, one blue (B) 2306, one green (G) 2308 OLED, and one sensor(S) 2304 in each full-color emitter cluster 2302. The substrate may include transparent ITO electrodes, which may allow individual control of each emitter component. Light sensor elements may be printed on a second, rigid substrate, and the element size may be the same 6 μm×6 μm as the light emitters. Pitch between the sensor elements may be 16 μm. A continuous thin-film cut-off filter may be coated on top of the light sensor element backboard, allowing only light with a wavelength of 660 nm (NIR) or greater to pass. The semi-transparent emitter foil may be laminated on top of the sensor array with high accuracy alignment. The full color and sensing pixels may be patterned in a cluster that has 12×12 full pixels under each display light projector cell. This means that each projector cell is able to generate 144 full-color full-parallax beams at any point in time.

Figure 23B:
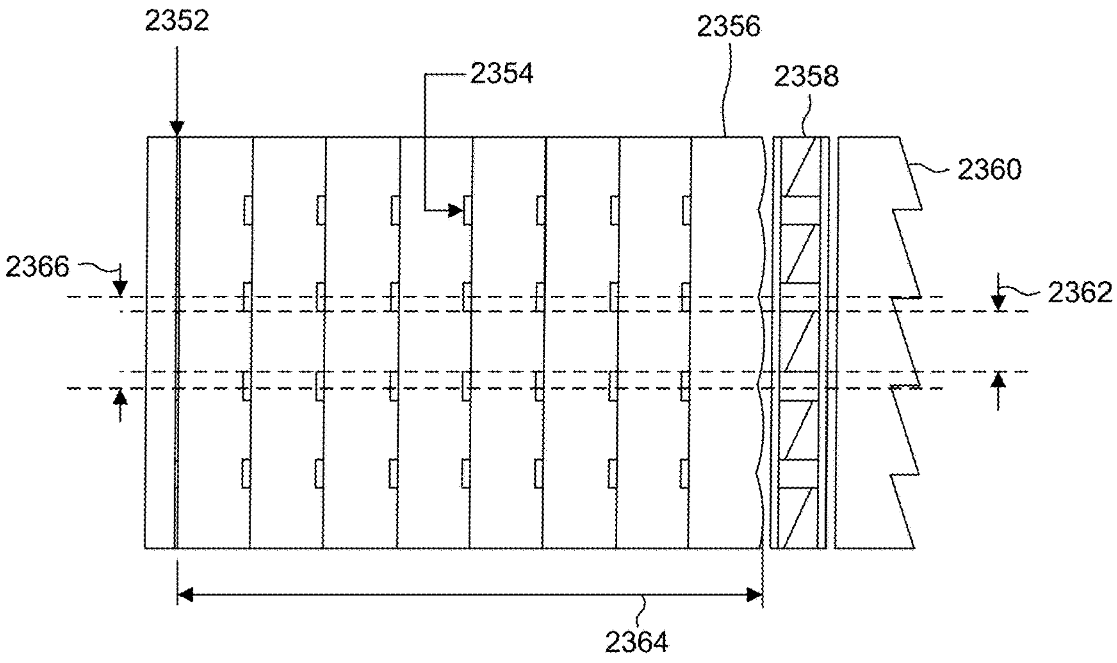
FIG. 23B is a schematic plan view illustrating an example optical display component layout according to some embodiments.

FIG. 23B is a schematic plan view illustrating an example optical display component layout according to some embodiments. FIG. 23B shows a layered optical display structure. For some embodiments, light emitters and sensors 2352 may include OLEDs. Light emitted from the OLED pixels may be collimated with a microlens array (MLA) 2356 that has, e.g., ~2 mm focal length and, e.g., 300 μm×300 μm, aperture size 2366. A light absorbing baffle structure 2354 may be used between each projector cell by aligning and laminating together 7 layers of, e.g., 250 μm thick polymer foils with 100 μm wide printed baffle patterns. Together these printed line grids form a long and narrow opening for each projector cell that suppresses the stray light emitted towards neighboring microlenses. For some embodiments, the polymer foils and the MLA may be bonded together to form a structure with a width 2364 of, e.g., 2000 μm. An electrowetting prism 2358 may be located between the MLA 2356 and a prism foil 2360. For some embodiments, each of the electrowetting prisms 2358 may correspond to a microlens in the micro lens array. A custom prism foil may be used on top of the beam steering layer for directing the central view direction projected from each display cell towards a central location at the viewing distance. Both the MLA and prism layer may be, e.g., 250 μm thick polymer foils with embossed optical features. Both the MLA and prism layer may contain diffractive features that compensate for chromatic aberration of the refractive materials. Aperture size 2362 of a single projector cell may be, e.g., ~200 μm as determined by the baffle and electrowetting cell structures.

For some embodiments, a single-color image beam may be created with one OLED pixel on the light emitting and sensing layer. The beam steering element may be used for time sequential color generation by overlaying the colored beams at slightly different points in time. As the pixels are small and the projector cell FOV is narrow (, e.g., ~5.7°), the angular resolution may be very high. The MLA focal length is, e.g., ~2 mm and the viewing distance is 600 mm, which corresponds to a geometric magnification of around 200:1. This means that one, e.g., 6 μm sized source is imaged to the viewer eye as, e.g., ~1.8 mm spot and two neighboring views may be projected into one eye pupil at the same time if the pupil size is an average of, e.g., 4 mm. The described LF projection system may fulfill the Super Multi View (SMV) condition. Furthermore, the display projector cell pitch on the display surface is, e.g., 0.3 mm, which means that the 26" display 2D resolution is Full HD 1920×1080 pix.

Figure 24:
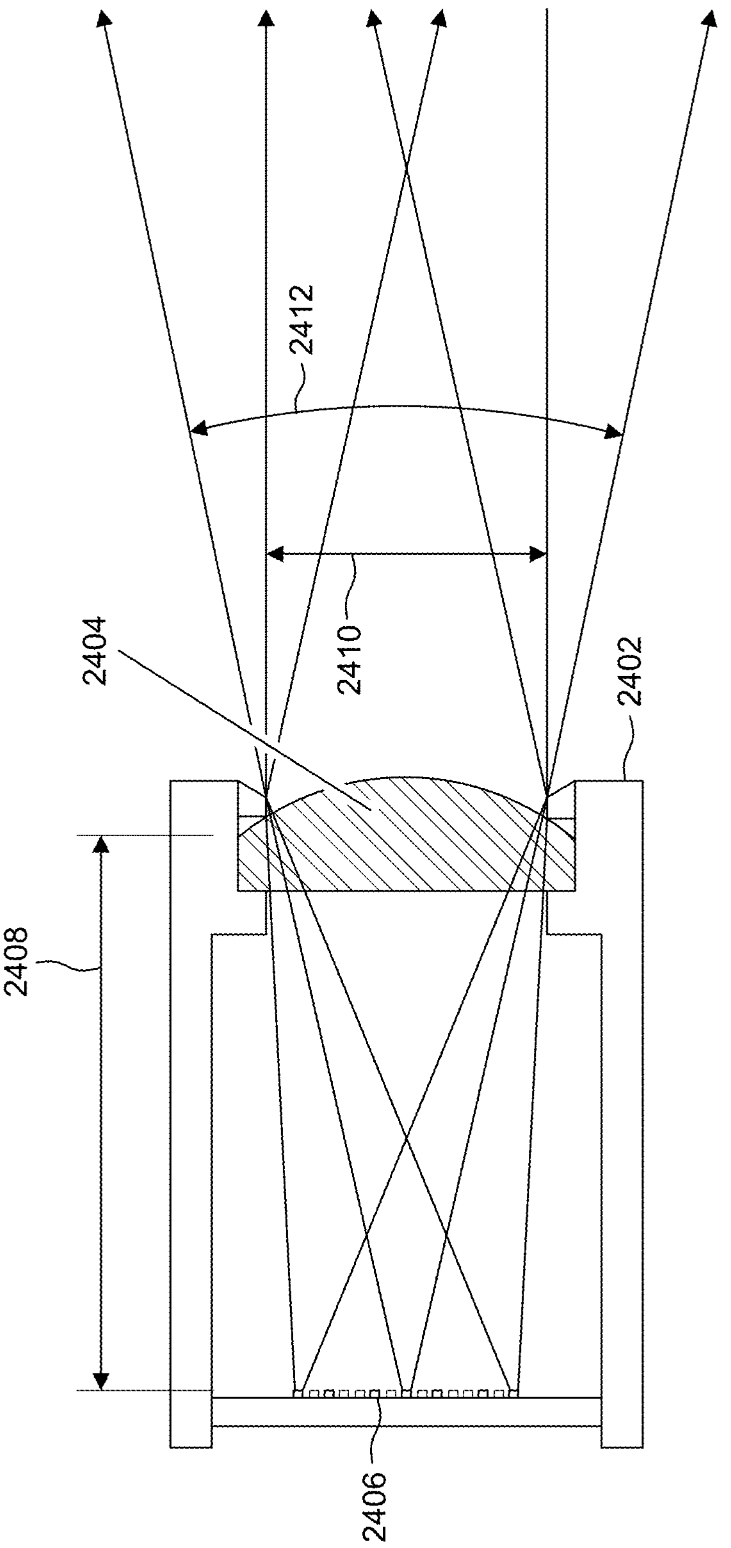
FIG. 24 is a schematic plan view illustrating an example tracking beam generator optical structure according to some embodiments.

FIG. 24 is a schematic plan view illustrating an example tracking beam generator optical structure according to some embodiments. FIG. 24 shows an example optics geometry for a tracking beam generator mounted on a housing 2402. For some embodiments, the tracking beam generator may include a 23×23 matrix of 670 nm NIR μLED light emitters and a collimating lens. The emitter components may be, e.g., 15 μm×15 μm and may have, e.g., 17 μm pitch. For some embodiments, the μLEDs 2406 are placed on the focal plane of the lens 2404 to collimate the beams. A polymer aspheric lens 2404 may have a focal length 2408 of 1 mm and an aperture size 2410 of, e.g., 0.5 mm. The tracking beam generator may be able to project a matrix of 23×23 beams into a horizontal and vertical FOV of, e.g., ±12° (24° total) 2412. The tracking beams may be projected to a slightly wider pattern than what the integrated display sensor elements are able to detect for the electrowetting prism scan angles, creating some tolerance for the overlapping of the two projected angular regions. Tracking beams for each viewer position may be selected by enabling the corresponding emitter from the array. For some embodiments, no mechanical movement occurs for beam scanning. The dimensions shown in FIG. 24 are examples, and other dimensions and configurations may be used.

Figure 25:
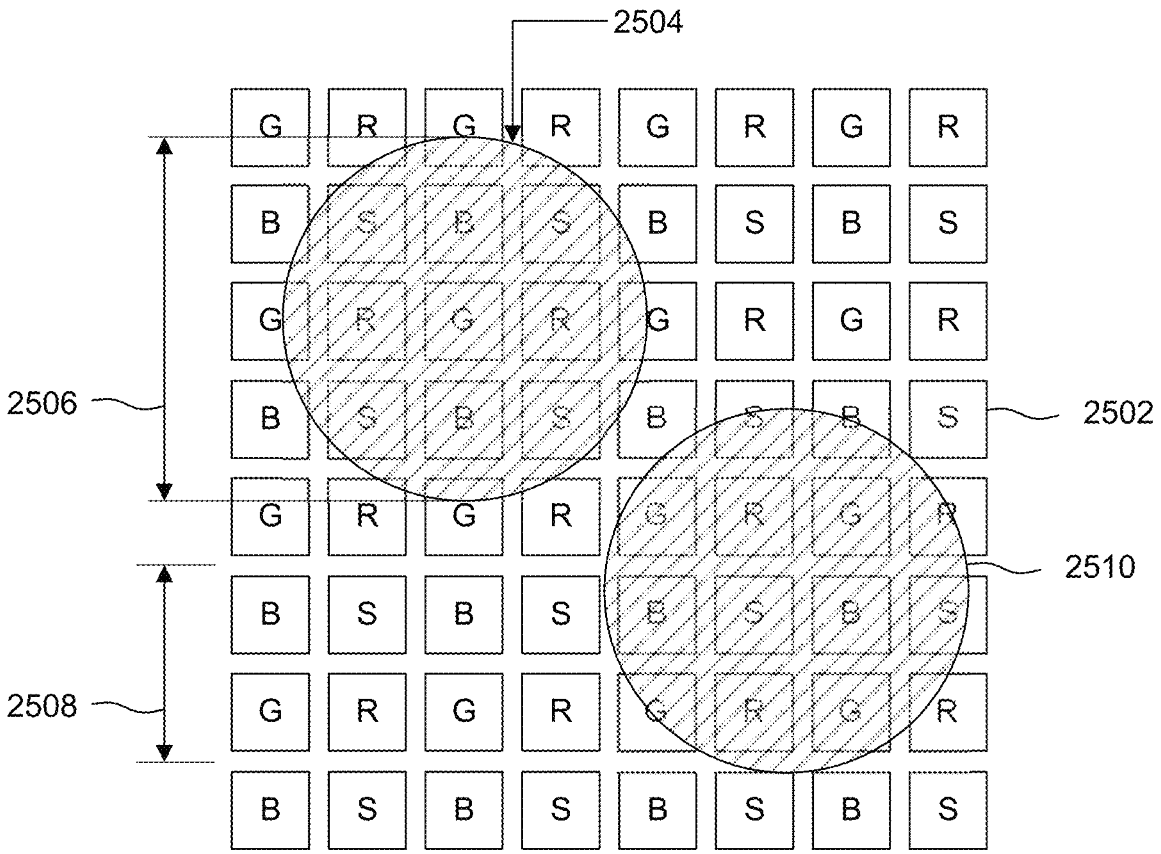
FIG. 25 is a schematic front view illustrating example calibration spot images overlaid on a light sensing layer according to some embodiments.

FIG. 25 is a schematic front view illustrating example calibration spot images overlaid on a light sensing layer according to some embodiments. For some embodiments, a calibration spot may be projected to the viewer facial target area as a spot that has a size of, e.g., ~9 mm. This spot is reflected back and imaged through the display projector cell structure to each projector cell sensing element when the image beams are scanned. A calibration spot 2504, 2506 may be reflected back and have a diameter 2506 of, e.g., ~30 μm at the sensing element array, which means that at least 3 sensing pixels are able to see the spot image at all times. Measured relative irradiance values of the sensor elements may be used for more accurate evaluation of the beam location in relation to the single projection cell steering angle. As an example, FIG. 25 shows two beam spot images 2504, 2506 overlaid on top of the light emitting and sensing layer. The first spot 2504 near the top left corner may be detected by four sensor pixels for pixels separated by an example center-to-center distance 2508 of, e.g., 16 μm. The second spot 2506 near the lower right corner may be detected by three sensor pixels. For some embodiments, detection by three sensor panels is the minimum number of sensor detections for locating a spot accurately inside a 2D matrix.

For some embodiments, display projector cells scan four slightly different steering directions for both eyes in such a way that the scanning directions form a square that follows the same pattern as the light emitting and sensing element pixels. This means that a blue, a red, and a green emitter pixel may be projected onto a selected spot within the viewing window sequentially, and each spot may be detected with the sensing element. By temporal multiplexing, a full color beam may be produced in each location within the viewing window, and the display projector cells also may detect the calibration spot in all of the same locations.

For some embodiments, each image cycle may have eight beam projecting timeframes, four timeframes for each of the two eyes. Scanning four locations over one eye may enable using very small steering angles when the image for a single eye is produced. For some embodiments, the steering angle may be changed by, e.g., ~0.23° degrees between each eye timeframe. For some embodiments, three steering angle shifts may be used to cover all angular directions. If each shift uses ~1 ms of time before the electrowetting prisms are ready to perform, an eye scan may be made in around 3 ms. After the single eye images are created, the beam steering elements may make a larger angular shift to go from one eye to the other. This angular shift may be ~6.1° for the average interpupillary distance of 64 mm. For some embodiments, this shift may be performed consistently in ~5 ms using electrowetting prisms. The total timespan for an image cycle of the two eyes is therefore ~16 ms (2×3 ms shift for each eye+2×5 ms shift between eyes), and the display image may be updated with a refresh frequency of ~60 Hz. The single emitters may be driven with a refresh frequency 8 times higher (~500 Hz) for imaging the subframes.

For some embodiments, two calibration spots may be placed above the eyebrows of each eye. This way the display sensors may be able to see a single calibration spot at any given time because the viewing window size may be 60 mm×60 mm around a single eye. Both spot locations may be checked, and positions may be altered with an eye tracking system that has a feedback loop inside the calibration process between the cameras and tracking beam projector. This configuration may ensure that the beams are at the correct locations over each eye even if the viewer moves. Because the calibration spot adjustment and beam steering calibration cycles are separate, the two control systems may not be fully synchronized with each other. For some embodiments, when the projected image beam shifts from one eye to the other, the calibration spot used for display fine adjustment also may be changed. If the larger angular shift uses an intermediate checkpoint for better aiming accuracy, a third spot may be projected on the forehead between the two eyes for some embodiments.

It will be understood, of course, that the example distances, measurements, angles, thicknesses, sizes, numbers of example features or elements, matrix sizes, and the like used herein (e.g., as shown in, and explained with reference to, FIGS. 4A-4C, 5A-5D, 11-14, 19, 21A-21B, 22A-22B, 23A-23B, 24, 25, 26, and the like) are merely for purposes of explanation (e.g., in accordance with some example embodiments) and that other values may be used.

Figure 26:
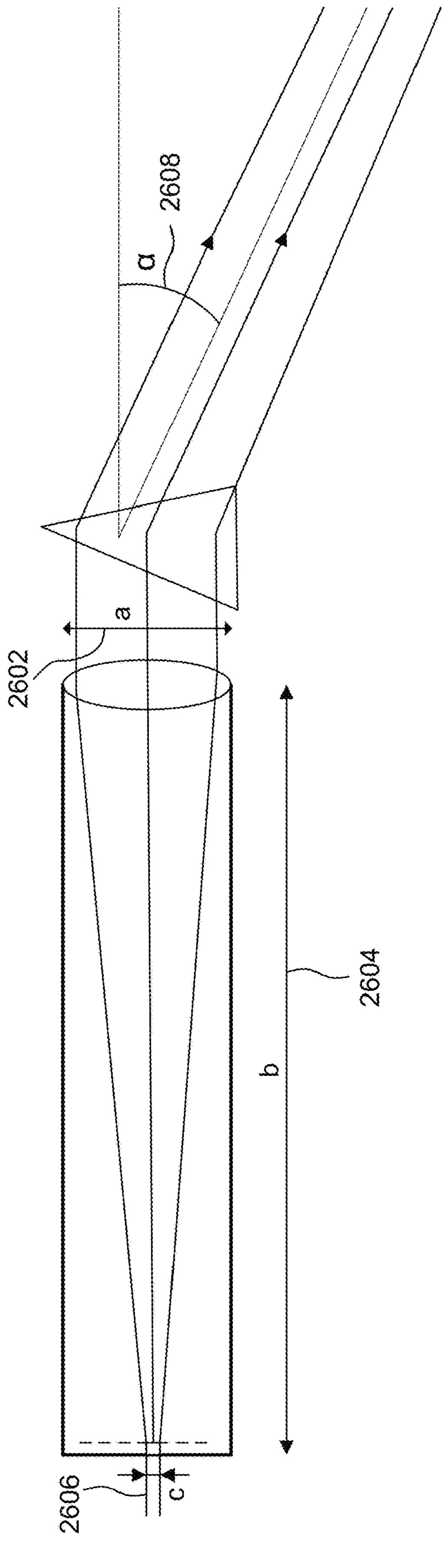
FIG. 26 is a schematic plan view illustrating an example ray bundle generator structure according to some embodiments.

FIG. 26 is a schematic plan view illustrating an example ray bundle generator structure according to some embodiments. The resolution producible by a display that constructs a light field using narrow beams of light is dependent on how wide the beams are and how much angular spread the beams contain. Therefore, variables affecting these parameters are discussed first. To get a more concrete understanding, it will be assumed that the beams are generated by the example structure of FIG. 26. The structure may contain an array of small light sources, a lens, and a prism. The light sources, which for simplicity are now assumed to be μLED; and emitting light beams that are collimated into the lens. The collimated light passes a prism structure that redirects the light by some amount.

Consider the factors that may be seen from a geometrical optics standpoint, without taking into consideration the wave properties of light. Close to the prism, the produced light beams have a width approximately equal to the lens width. Moving away from the prism, the angular spread due to the finite width of the LEDs may affect the beam width. Placing a diffusely reflecting screen along the path where the beam of light is headed at a distance d, the detected illumination distribution width is approximately $$\frac{cd}{b},$$

if the starting width a may be ignored due to small size. Mathematically, it would be more correct to take a convolution of the two distributions, but if only approximating an upper limit to the size, the beam width may be a sum of the two contributions:

$$a + \frac{cd}{b}.$$

This equation allows, for example, making the following calculation. Assuming that the LEDs have a physical width 2606 of c=5 μm, that the distance b=10 cm (2604), that the lens diameter 2602 is a=0.5 mm, and that the distance of the screen is d=1 m, the total spreading is as shown in Eq. 4:

$$a + \frac{cd}{b} = 0.5\text{ mm} + \frac{5\mu\text{m}\cdot 1\text{ m}}{10\text{ cm}} = 0.55\text{ mm} \qquad \text{Eq. 4}$$

which is dominated mainly by the contribution from the lens width. This kind of a beam width may still allow placing multiple views within a pupil, because a human pupil is several millimeters wide.

Next, consider the effect of the polychromatic nature of the beam. If the micro lens is made from a dispersive material, different wavelengths may be deflected by different amounts on the surfaces. This means that the lens power will be different for different wavelengths, creating angular spreading. The lens optical power may be approximated to be proportional to the radius of curvature of the lens and the parameter $n-n_a$, where n is the refractive index of the material, and $n_a$ is the refractive index of the surrounding material. Because the radius of curvature remains constant for all wavelengths, only the variation in refractive index is considered. For example, assuming that the micro-LEDs produce wavelengths in the range 450 nm to 500 nm, the optical power may vary by 0.5% for some embodiments, according to catalog data from OpticsStudio for an example glass type (N-BK7). The optical power P is related to the focal lengths by Eq. 5:

$$P = \frac{1}{f_1} + \frac{1}{f_2} \qquad \text{Eq. 5}$$

where $f_1$ is the front focal length and $f_2$ is the back focal length. For perfectly collimated light, the back focal length is infinity, and $$\frac{1}{f_2}$$

is zero. This condition may be guaranteed for only one wavelength, because the optical power may have a 0.5% deviation. The total optical power for an optimal wavelength is $$\frac{1}{b}$$

because the LEDs are on the focal plane. A 0.5% variation from this optical power is shown in Eq. 6:

$$\Delta P = \frac{1}{b} \cdot 0.5\% = \frac{1}{10\text{ cm}} \cdot 0.5\% = \frac{1}{20\text{ m}} \quad \text{Eq. 6}$$

which means that the back focal plane is at a distance of $$f_2' = 20\text{ m}$$

m instead of infinity. This condition will cause the rays to have an angular spread, such that the rays passing the lens at the edges (marginal rays) will have the most error in the deflection direction. Based on the worst case rays, the error size may be estimated to be as shown in Eq. 7:

$$\text{Error Size} = d \cdot \frac{a}{2f_2'} = 1\text{ m} \cdot \frac{0.5\text{ mm}}{2 \cdot 20\text{ m}} = 0.0125\text{ mm} \quad \text{Eq. 7}$$

This error is smaller than what was obtained before from the other sources, so in the example display, the dispersion effect is not too bad. However, dispersion also will affect the refraction at the prism, which refracts the rays much more strongly than the weak collimating lens.

Assuming, for some embodiments, that the display has a FOV of $\alpha$=30°, the ray steering prism also may be able to steer the light by such an amount. The prism may be assumed to be a small part of a large lens, so that the relative error in the refractive power translates to a proportionally relative error in the steering angle 2608. An error in the steering angle may be around $\Delta\alpha$=30°. 0.5%=0.15°. At the distance of the viewer, the error in the spot location may be approximated using Eq. 8:

$$\Delta\alpha \cdot d = 0.15° \cdot 1\text{ m} = 2.6\text{ mm} \quad \text{Eq. 8}$$

which is a relatively large error, compared to the spreading from the other effects already discussed. Depending on how high a quality used to build the light field, this spreading may or may not be a problem. For some embodiments of a high quality light field, the ray steering system may have very little dispersion and/or the light sources may have a very narrow spectral linewidth.

For some embodiments, each of the error sources discussed so far may be minimized either by making the lens diameter a smaller or by increasing the distance b. It may seem that the light field quality has no upper limit. This is not of course the case because the wave properties of light have been ignored so far. If the lens width is made small, the waves propagate in a way that resembles less a "ray" of light. If the aperture is made smaller, the angular spreading of the beam of light increases. The width of the spread may be demonstrated with Gaussian beams, which are fundamental propagation modes of monochromatic light. A Gaussian beam has the property that the "width" of the beam changes as a function of distance traveled z as shown in Eq. 9:

$$w(z) = w_0\sqrt{1 + \left(\frac{z}{z_R}\right)^2} \quad \text{Eq. 9}$$

where $w_0$ is the "width" of the distribution at the narrowest point (called the "waist" of the beam) and the so-called Rayleigh range is as shown in Eq. 10:

$$z_R = \frac{\pi w_0^2}{\lambda} \quad \text{Eq. 10}$$

where $\lambda$ is the wavelength of the light as understood according to William T. Sifvast, *Laser Fundamentals*, Cambridge University Press (1996), 338. Assume that the system emits Gaussian beams whose waist is at the lens location, and whose waist width is equal to the lens size, such that $w_0$=a. Assume that the wavelength is $\lambda$=500 nm. From these parameters, the Rayleigh range is shown in Eq. 11:

$$z_r = \frac{\pi(a)^2}{\lambda} = \frac{\pi(0.5\text{ mm})^2}{500\text{ nm}} = 1.57\text{ m} \quad \text{Eq. 11}$$

which makes the width of the beam at the screen or eye distance, as shown in Eq. 12:

$$w(d) = a\sqrt{1 + \left(\frac{d}{z_R}\right)^2} = 0.5\text{ mm}\sqrt{1 + \left(\frac{1\text{ m}}{1.57\text{ m}}\right)^2} = 0.6\text{ mm} \quad \text{Eq. 12}$$

Hence, there is a 0.1 mm increase in the width of the beam due to wave properties. Based on the example beam steering system described here, a submillimeter scale sampling of the pupil may be used if the beam steering system is accurate enough and has a low enough dispersion in the range of wavelengths produced by the light emitting elements.

Figure 27:
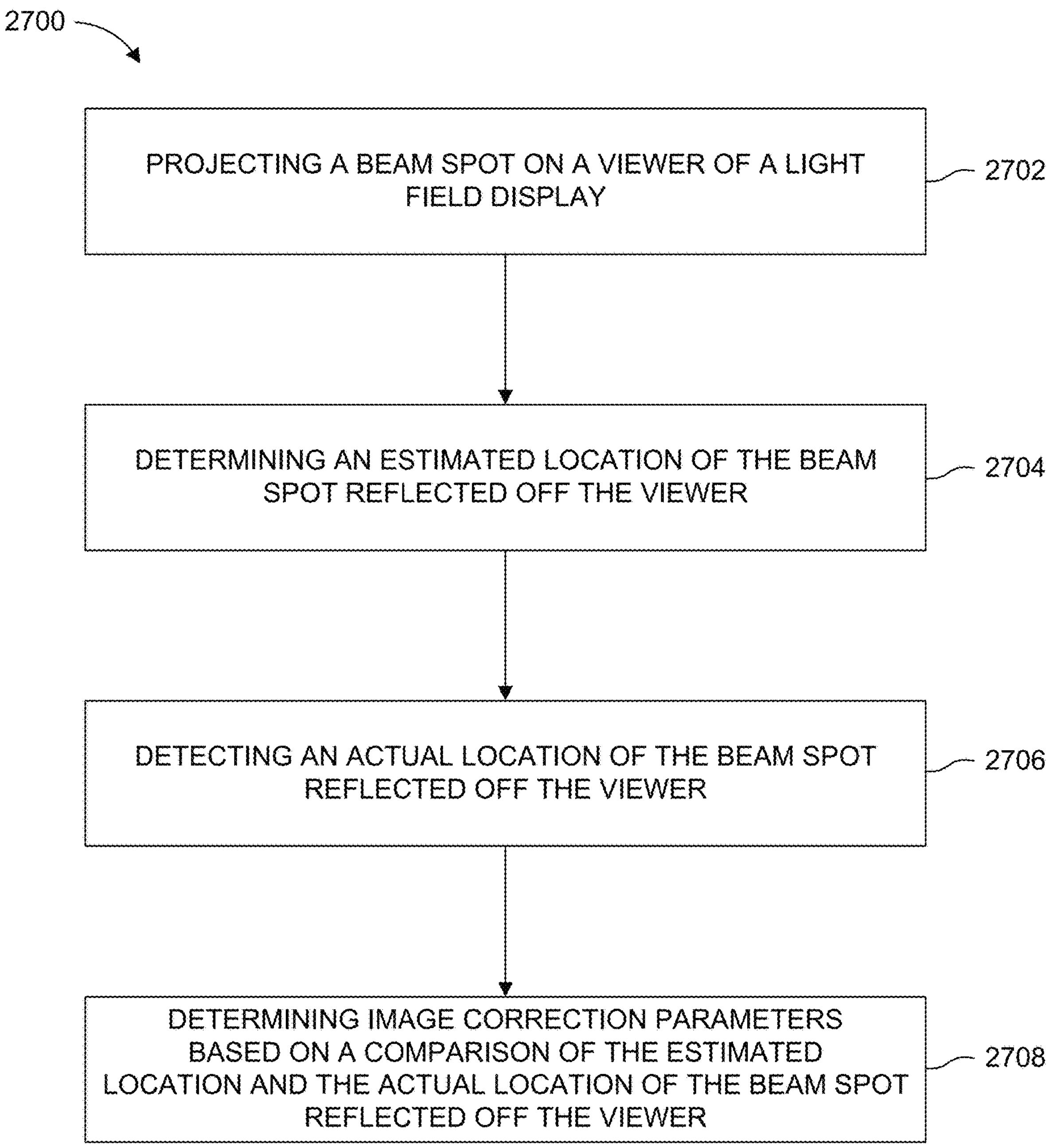
FIG. 27 is a flowchart illustrating an example process for calibration according to some embodiments.

FIG. 27 is a flowchart illustrating an example process for calibration according to some embodiments. For some embodiments, a process 2700 may be executed that may include projecting 2702 a beam spot on a viewer of a light field display. For some embodiments, the process 2700 may further include determining 2704 an estimated location of the beam spot reflected off the viewer. For some embodiments, the process 2700 may further include detecting 2706 an actual location of the beam spot reflected off the viewer. For some embodiments, the process 2700 may further include determining 2708 image correction parameters based on a comparison of the estimated location and the actual location of the beam spot reflected off the viewer. For some embodiments, the comparison may be like the example process shown in FIG. 17. For some embodiments, image correction parameters may include, for example, image center location, illumination level, intensity level, color, focal depth, view angle, and image orientation.

For some embodiments, a process executed by a device with a processor and a non-transitory computer-readable medium storing instructions that are operative, when executed by the processor may include performing the process shown in FIG. 27.

An example apparatus in accordance with some embodiments may include: a matrix of a plurality of projector cells, each of the projector cells may include: a plurality of individually-addressable light emitting elements; a beam-steering element; and a collimating optical element positioned between one or more of the light-emitting elements and the beam-steering element, wherein for each of the projector cells the respective plurality of light emitting elements and the respective beam-steering element may be configured to form a respective synchronous composite beam of light, the synchronous composite beam of light including light emitted from one or more of the plurality of light emitting elements of the projector cell, passing through the collimating optical element of the projector cell, and steered by the beam-steering element of the projector cell.

For some embodiments of the example apparatus, the matrix of projector cells may include a matrix of display pixels, and each display pixel of the matrix of display pixels may include: one of the plurality of individually-addressable light emitting elements; and an illumination sensor configured to detect illumination levels of reflected light beams.

For some embodiments of the example apparatus, at least one of the beam-steering elements may be configured to steer simultaneously a plurality of light beams.

Some embodiments of the example apparatus may further include a sensor configured to track eye position of a viewer.

Some embodiments of the example apparatus may further include a tracking beam generator configured to generate a tracking beam used for adjusting image display parameters.

Some embodiments of the example apparatus may further include a plurality of light sensors, such that the tracking beam generator is configured to reflect the tracking beam off a viewer of the apparatus, and such that the plurality of light sensors are configured to measure the reflected tracking beam.

For some embodiments of an example apparatus, such that at least one of the plurality of light sensors is further configured to measure at least one color, angle, focal depth, or intensity of the reflected tracking beam.

For some embodiments of an example apparatus, such that the tracking beam generator includes: one or more tracking beam light emitting elements; a tracking beam beam-steering element; and a tracking beam collimating optical element positioned between the one or more tracking beam light-emitting elements and the tracking beam beam-steering element.

For some embodiments of an example apparatus, such that the one or more tracking beam light emitting elements and the tracking beam beam-steering element are configured to form a synchronous composite beam of light, the synchronous composite beam of light including light emitted from the one or more tracking beam light emitting elements, passing through the tracking beam collimating optical element and steered by the tracking beam beam-steering element.

For some embodiments of an example apparatus, such that the one or more tracking beam light emitting elements and the tracking beam beam-steering element are configured to form a calibration spot on a viewer, the calibration spot including light emitted from the one or more tracking beam light emitting elements, passing through the tracking beam collimating optical element, and steered by the tracking beam beam-steering element.

An example apparatus in accordance with some embodiments may include: an optical structure; a processor; and a non-transitory computer-readable medium storing instructions that are operative, when executed by the processor, to perform, in cooperation with the optical structure, a portion of any of the processes performed by the example apparatus.

Another example apparatus in accordance with some embodiments may include: a plurality of display pixels; a plurality of beam-steering elements; a collimating layer including one or more collimating elements positioned between one of the light-emitting elements and one of the beam-steering elements; and a tracking beam generator configured to generate a beam spot on a target.

For some embodiments of another example apparatus, each of the plurality of display pixels may include: one or more light emitting elements; and one or more light detectors.

Some embodiments of another example apparatus may further include: an eye tracking sensor configured to track eye positions of a viewer.

Another example apparatus in accordance with some embodiments may include: an optical structure; a processor; and a non-transitory computer-readable medium storing instructions that are operative, when executed by the processor, to perform, in cooperation with the optical structure, a portion of any of the processes performed by another example apparatus.

An example method in accordance with some embodiments may include: projecting a beam spot on a viewer of a light field display; determining an estimated location of the beam spot reflected off the viewer; detecting an actual location of the beam spot reflected off the viewer; and determining an image correction parameter based on a comparison of the estimated location and the actual location of the beam spot reflected off the viewer.

For some embodiments of an example method, determining the image correction parameter may include: determining a spatial offset between the estimated location and the actual location of the beam spot reflected off the viewer; and altering a steering angle of a ray steering element by an angular amount corresponding to the spatial offset.

Some embodiments of an example method may further include: detecting an eye location of the viewer, wherein projecting the beam spot on the viewer may be based on the detected eye location of the viewer.

For some embodiments of an example method, projecting the beam spot on the viewer may include: determining an estimated reflection location to be an offset above the eye location of the viewer; and projecting the beam spot to reflect off the viewer at the estimated reflection location.

Some embodiments of an example method may further include: determining an estimated viewing window of the viewer; rendering a light field image to be seen by the viewer through the estimated viewing window; and displaying the rendered light field image by the light field display.

Some embodiments of an example method may further include: adjusting an intensity level for the light field image using the determined image correction parameters, wherein rendering the light field image uses the adjusted intensity level.

For some embodiments of an example method, wherein the comparison of the estimated location and the actual location of the beam spot reflected off the viewer may include determining a spatial offset between the estimated location and the actual location of the beam spot reflected off the viewer, and wherein rendering the light field image may include adjusting a location for the light field image to be displayed using the spatial offset.

For some embodiments of an example method, determining the estimated viewing window of the viewer may adjust a location of the estimated viewing window using the spatial offset.

Some embodiments of an example method may further include: illuminating the viewer with an illumination beam during an active period for a projector cell; detecting a reflection of the illumination beam during the active period for the projector cell; generating, with the projector cell, a light beam at an intensity level; and adjusting the intensity level based on the detected reflection of the illumination beam.

For some embodiments of an example method, adjusting the intensity level may include: determining an intensity level of the detected reflection of the illumination beam; determining an intensity level offset between the intensity level of the detected reflection of the illumination beam and the intensity level of the illumination beam; and adjusting the intensity level by an amount proportional to the intensity level offset.

Some embodiments of an example method may further include: altering a first control input to a light emitting element array; altering a second control input to a ray steering layer; and coordinating altering of the first control input and altering of the second control input to cause spatial-temporal altering of at least one of color, angle, focal depth, or intensity of a rendered image.

For some embodiments of an example method, projecting the beam spot, determining the estimated location, detecting the actual location, and determining the image correction parameters may be performed for a subframe corresponding to a light emitting device.

An example apparatus in accordance with some embodiments may include: an optical structure; a processor; and a non-transitory computer-readable medium storing instructions that are operative, when executed by the processor, to perform, in cooperation with the optical structure, a portion of the method of any of the processes performed by the example apparatus.

An additional example apparatus in accordance with some embodiments may include: a matrix of projector cells, each of the projector cells including: a controllable light emitting element array configured to generate a light beam including a plurality of sub-beams; and an optical element stack, including: a collimating optical layer; and a controllable ray steering layer configured to change a projection angle of an incoming light ray.

For some embodiments of an additional example apparatus, control inputs to the controllable light emitting element array and to the controllable ray steering layer may be configured to cause spatial-temporal altering of at least one of color, angle, focal depth, or intensity of a rendered image.

A further example method in accordance with some embodiments may include: determining a relative position of an eye of a first user; projecting a calibration beam to intercept within a projection area of the first user, the projection area including an area capable of being targeted and detected by each projector cell of a display apparatus; receiving, for each projector cell, as a reflected calibration image, the calibration beam reflected through a respective optical path used for display illumination; measuring, for each projector cell, a spatial offset of the received calibration image; and responsive to the measured spatial offset of the received calibration image for each projector cell, making a calibration adjustment to a respective projection angle for the respective projector cell.

Another additional example apparatus in accordance with some embodiments may include: a matrix of projector cells, each projector cell including a controllable light emitting element array configured to generate a light beam; and an optical element stack, including: a collimating optical layer; and a controllable ray steering layer configured to change a projection angle of an incoming light ray.

For some embodiments of another additional example apparatus, the apparatus may generate a plurality of light beams via coordinated spatial-temporal altering of control inputs to the light emitting element array of the projector cell and to the controllable ray steering layer based on at least one of color, angle, focal depth, and intensity of a rendered image.

For some embodiments of another additional example apparatus, the ray steering layer may be configured to be calibrated using a calibration beam imaged through display optics of the apparatus and recorded by light sensor elements.

For some embodiments of another additional example apparatus, a steering angle of the ray steering layer may be configured to be calibrated continually using a calibration beam.

Some embodiments of another additional example apparatus may further include: a tracking beam generator configured to generate a tracking beam; and a sensor configured to detect an intensity level of a viewer, wherein at least one of the controllable light emitting element arrays may be configured to alter an intensity level of the light beam generated based on the intensity level detected during an active period for a respective projector cell.

For some embodiments of another additional example apparatus, at least one of the controllable light emitting element arrays may be configured to alter the intensity level of the light beam generated by an amount proportional to the intensity level detected during the active period for the respective projector cell.

For some embodiments of another additional example apparatus, the apparatus may be configured to be calibrated using a calibration beam projected on a target area of a viewer in coordination with movement of an eye location of the viewer relative to a display of the apparatus.

A further example apparatus in accordance with some embodiments may include: a tracking process configured to track viewer movement adjustments; and a light field image display structure configured to display a light field image using the viewer movement adjustments.

For some embodiments of a further example apparatus, the light field image display structure may include a plurality of beam-steering elements corresponding to respective light emitting elements.

Another further additional example apparatus in accordance with some embodiments may include: a plurality of display pixels; a beam collimator layer; a plurality of beam-steering elements; a tracking beam generator configured to generate a tracking beam; and a plurality of sensors configured to detect a reflection of the tracking beam.

An example apparatus in accordance with some embodiments may include: a plurality of individually-addressable light emitting elements; a beam-steering element; and a collimating optical element positioned between one or more of the light-emitting elements and the beam-steering element, wherein the plurality of light emitting elements and the beam-steering element may be configured to form a synchronous composite beam of light, the synchronous composite beam of light including light emitted from one or more of the plurality of light emitting elements, passing through the collimating optical element, and steered by the beam-steering element.

An example method in accordance with some embodiments may include: emitting a respective light beam from each of a plurality of individually-addressable light emitting elements of a projector cell; passing each of the respective light beams through a respective collimating optical element; steering each of the respective light beams with a respective beam-steering element; forming a synchronous composite beam of light, the synchronous composite beam of light including light emitted from one or more of the plurality of light emitting elements of the projector cell, such that the projector cell is part of a matrix including a plurality of projector cells, and such that each of the respective collimating optical elements is positioned between one or more of the plurality of light-emitting elements and the respective beam-steering element.

For some embodiments of the example method, such that the matrix of projector cells may include a matrix of display pixels, and such that each display pixel of the matrix of display pixels may include: one of the plurality of individually-addressable light emitting elements; and an illumination sensor configured to detect illumination levels of reflected light beams.

For some embodiments of the example method, such that steering at least two of the respective light beams may occur simultaneously with the same respective beam steering element.

Some embodiments of the example method may further include tracking an eye position of a viewer.

Some embodiments of the example method may further include generating a tracking beam used for adjusting image display parameters.

Some embodiments of the example method may further include measuring a reflected light beam using a plurality of light sensors, such that generating the tracking beam may include reflecting the tracking beam off a viewer to generate the reflected tracking beam.

For some embodiments of the example method, such that measuring the reflected tracking beam may include measuring at least one color, angle, focal depth, or intensity of the reflected tracking beam.

For some embodiments of the example method, such that generating the tracking beam may include: emitting a tracking light beam from one or more tracking beam light emitting elements; passing each tracking light beam through a tracking beam collimating optical element; and steering each tracking light beam with a tracking beam beam-steering element, such that the tracking beam collimating optical element may be positioned between the one or more tracking beam light-emitting elements and the tracking beam beam-steering element.

For some embodiments of the example method, such that generating the tracking beam generates a synchronous composite beam of light, the synchronous composite beam of light including the tracking light beam emitted from the one or more tracking beam light emitting elements, passing through the tracking beam collimating optical element, and steered by the tracking beam beam-steering element.

For some embodiments of the example method, such that generating the tracking beam generates a calibration spot on a viewer, the calibration spot including the tracking light beam emitted from the one or more tracking beam light emitting elements, passing through the tracking beam collimating optical element, and steered by the tracking beam beam-steering element.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A light field display apparatus, comprising:

a plurality of projector cells, each of the projector cells comprising:
- a plurality of light emitting elements,
- a collimating optical element, and
- a beam-steering element, wherein a projector cell of the plurality of projector cells is configured such that an outgoing light from at least one of the plurality of light emitting elements exits the projector cell after passing through the beam-steering element in a first direction; and a plurality of light sensing elements distributed relative to the plurality of light emitting elements, wherein an incoming light from a tracking beam reflected from a calibration spot created on a viewer of the light field display apparatus enters the projector cell, passes through the beam-steering element in a second direction opposite to the first direction, and wherein the incoming light is detected by at least one of the plurality of light sensing elements, the detection of the incoming light is used to adjust a steering of the beam-steering element.

2. The display apparatus of claim 1, wherein the calibration spot is a spot on a face of the viewer, and the outgoing light is steered towards eyes of the viewer.

3. The display apparatus of claim 1, wherein the adjustment of the steering of the beam-steering element is based on a comparison between:

a detected actual location of the incoming light, detected by at least one of the plurality of light sensing elements, and a computed estimated location of the incoming light, computed based on the calibration spot and a direction the beam-steering element is aimed at.

4. The display apparatus of any one of claim 1, further comprising a tracking beam generator configured to generate the tracking beam.

5. The display apparatus of claim 4, wherein the tracking beam generator comprises:

a tracking beam steering element, and at least one tracking beam light emitting element.

6. The display apparatus of claim 5, wherein the tracking beam generator is configured to generate the tracking beam to illuminate a spot on a face of the viewer.

7. The display apparatus of claim 5, wherein the display apparatus further comprises a camera, and wherein the apparatus is configured to use images captured by the camera to steer the tracking beam towards the viewer.

8. A method for calibrating a light field display, wherein the light field display comprising a plurality of projector cells, each comprising a plurality of light emitting elements, a collimating optical element, and a beam-steering element, and wherein a projector cell of the plurality of projector cells is configured such that an outgoing light from at least one of the plurality of light emitting elements exits the projector cell after passing through the beam-steering element in a first direction, the method comprising:

projecting a tracking beam onto a calibration spot created on a viewer of the light field display;

detecting, by at least one of a plurality of light sensing elements, an incoming light of the tracking beam reflected from the calibration spot, wherein the incoming light enters the projector cell passes through the beam-steering element in a second direction opposite to the first direction, and wherein the plurality of light sensing elements is distributed relative to the plurality of light emitting elements; and adjusting a steering of the beam-steering element based on the detection of the incoming light.

9. The method as claimed in claim 8, wherein the adjusting comprises:

computing an estimated location of the incoming light based on the calibration spot and a direction the beam-steering element is aimed at;

detecting an actual location of the incoming light by at least one of the plurality of light sensing elements; and correcting the steering of the beam-steering element based on a comparison between the estimated location and the actual location.

10. The method as claimed in claim 8, wherein the calibration spot is a spot on the face of the viewer, and the outgoing light is steered towards eyes of the viewer.

11. The method as claimed in any one of claim 8, comprising:

capturing images by a camera; and steering, based on the images, the tracking beam towards the calibration spot.

* * * * *